US007103604B2

(12) United States Patent
Maeda et al.

(10) Patent No.: US 7,103,604 B2
(45) Date of Patent: Sep. 5, 2006

(54) SCHEME FOR CONSTRUCTING DATABASE FOR USER SYSTEM FROM STRUCTURED DOCUMENTS USING TAGS

(75) Inventors: Seiji Maeda, Tokyo (JP); Tatsunori Kanai, Kanagawa (JP); Toshiki Kizu, Kanagawa (JP); Takeshi Yokokawa, Kanagawa (JP); Hiroshi Yao, Kanagawa (JP); Osamu Torii, Kanagawa (JP); Hisako Tanaka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 11/220,841

(22) Filed: Sep. 8, 2005

(65) Prior Publication Data

US 2006/0004780 A1 Jan. 5, 2006

Related U.S. Application Data

(63) Continuation of application No. 09/342,268, filed on Jun. 29, 1999, now Pat. No. 6,973,458.

(51) Int. Cl.
*G06F 17/00* (2006.01)

(52) U.S. Cl. .............................. 707/101; 707/2; 707/3; 707/102

(58) Field of Classification Search ..................... None
See application file for complete search history.

(56) References Cited

U.S. PATENT DOCUMENTS 5,193,058 A * 3/1993 Bassili et al. ............... 434/321
5,539,523 A * 7/1996 Nakai et al. ................ 358/296
5,933,832 A * 8/1999 Suzuoka et al. ............ 707/101
5,963,205 A * 10/1999 Sotomayor .................. 715/531
5,999,927 A * 12/1999 Tukey et al. .................... 707/5
6,003,046 A * 12/1999 Nielsen ...................... 715/513
6,026,397 A * 2/2000 Sheppard ....................... 707/5
6,044,375 A * 3/2000 Shmueli et al. ............. 707/101
6,076,924 A * 6/2000 Wysocki ...................... 351/50
6,078,924 A * 6/2000 Ainsbury et al. ........... 707/101
6,240,407 B1 * 5/2001 Chang et al. .................. 707/2
6,314,439 B1 * 11/2001 Bates et al. ................. 715/513

OTHER PUBLICATIONS

Ari Luotonen, Web Proxy Servers; Chapter 8; Published by Prentice Hall. 1998; pp. 157-180.
Robert E. Filman, et al., Searching The Internet; IEEE Internet Computing vol. 2, No. 4, Jul.-Aug. 1998; p. 21-23.

* cited by examiner

*Primary Examiner*—Sana Al-Hashemi
(74) *Attorney, Agent, or Firm*—Oblon, Spivak, McClelland, Maier & Neustadt, P.C.

(57) ABSTRACT

A scheme for constructing a database in a user system, which can automatically store those portions of the structured documents which contain important contents without exerting a burden on the user is disclosed. A structured document provided by a server device is obtained according to a document request made by the user system, where each structured document has a structure represented by tags in each structured document. Then, at least one important portion is automatically extracted from the structured document by utilizing the structure of the structured document according to prescribed extraction criteria specified in advance, and the extracted important portion is stored into the database, while the obtained structured document is transferred to the user system.

25 Claims, 35 Drawing Sheets

FIG.8A
801
```
<document>
 <title> NOTICE OF ××× MEETING </title>
 <intro> ××× MEETING WILL BE HELD AS FOLLOWS </intro>
 <meeting>
   <date> 1998/4/1 </date>
   <place> MEETING ROOM 101 </place>
 </meeting>
</document>
```
FIG.8B
802
```
<bargain sale>
 <goods> ULTIMATE RICE COOKER X </goods>
 <code> TOS980401X </code>
 <color> WHITE </color>
  <comment> SPECIAL OFFER OF ONLY ¥48,000! </comment>
 </bargain sale>
```
FIG.9A
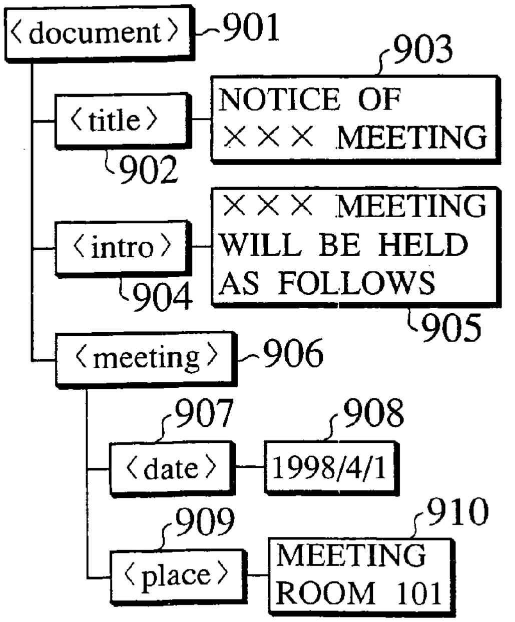
FIG.9B
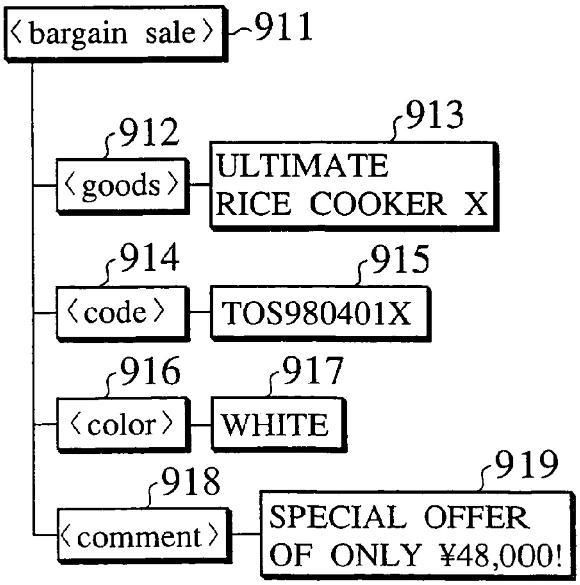

1001

EXTRACTION METHOD
 CLASSIFICATION:MEETING
 EXTRACTION:TAG NAME
  = ⟨meeting⟩

1002

EXTRACTION METHOD
 CLASSIFICATION:PRICE
 EXTRACTION:TAG NAME
  = ⟨price⟩
 EXTRACTION:WORD=PRICE

1101

SYNONYMS

PRICE  COST  LIST PRICE  SPECIAL PRICE  SPECIAL OFFER

⟨meeting⟩ — 1201
 ├─ ⟨date⟩ — 1998/4/1   (1202, 1203)
 └─ ⟨place⟩ — MEETING ROOM 101   (1204, 1205)

1206  1207

⟨comment⟩ — SPECIAL OFFER OF ONLY ¥48,000!

SCHEME FOR CONSTRUCTING DATABASE FOR USER SYSTEM FROM STRUCTURED DOCUMENTS USING TAGS

CROSS-REFERENCE TO RELATED APPLICATIONS

This application is a continuation of U.S. patent application No. 09/342,268, filed Jun. 29, 1999 now U.S. Pat. No. 6,973,458, which claims priority to Japan Patent 10-199584, filed Jun. 30, 1998 and Japan Patent 10-255411, filed Sep. 9, 1998, the entire contents of which are hereby incorporated herein by reference.

BACKGROUND OF THE INVENTION

1. Field of the Invention

The present invention relates to a scheme for constructing a database for a user system which handles structured documents such as WWW (World Wide Web) documents and e-mails, by automatically storing information extracted from the structured documents.

2. Description of the Background Art

A structured document is a document capable of expressing a document structure by using partitions called tags which are embedded in the document. There are also some structured documents which provide a way of defining a document structure called DTD (Document Type Definition). Such structured documents include SGML documents, XML documents, HTML documents, and documents transmitted as e-mails or e-news. In such a structured document, its document structure can be easily analyzed.

In the WWW, e-mails, e-news, etc., the structured documents are exchanged through a communication path such as the Internet or Intranet.

First, the WWW system will be described. In the WWW, structured documents are exchanged by connecting a WWW server which is a structured document delivery server and a browser which is a structured document display device, through a communication path. In the case of accessing a structured document, the browser requests a transmission of a desired structure document with respect to the WWW server, and the WWW server in response transmits the structured document. The structured document exchanged in the WWW is also sometimes referred to as a WWW page.

In the usual WWW, in order to suppress the increase of an amount of data to be transmitted through the communication path and the concentration of processing loads on the WWW server, a data relay device called proxy server is often provided between the WWW server and the browser. This proxy server is located in a middle of the browser and the WWW server, and has a function for relaying a request from the browser to the WWW server.

The proxy server receives a structured document transmission request from the browser, and transmits the structured document transmission request to the WWW server on behalf of the browser. Then, the structured document transmitted from the WWW server is transferred to the browser. It is possible to provide just one proxy server or a plurality of proxy servers between the WWW server and the browser.

Among such proxy servers, there can be a proxy server which has a function for temporarily storing a plurality of structured documents to be transferred in the proxy server. Such a data transfer device having a function for temporarily storing a plurality of structured documents is sometimes also referred to as a cache server.

In the proxy server which temporarily stores a plurality of structured documents, a structured document whose transmission was requested from the browser will be temporarily stored. Then, when there is a transmission request from the browser with respect to the same structured document, the structured document that has been temporarily stored will be transmitted to the browser instead of transferring the transmission request to the WWW server again.

There are also some proxy servers which have a function for checking with the WWW server as to whether the temporarily stored structured document is the latest one or not at a time of transferring the temporarily stored structured document.

Usually, in the proxy server, the structured documents are stored up to some prescribed amount. At a time of temporarily storing the structured document, the structured document is not discriminated according to a browser which had requested that structured document. In the case of storing the structured document in excess of the prescribed amount, the other structured documents which have been temporarily stored will be deleted according to some rule. As a rule to be used here, a simple rule such as that for sequentially deleting a structured document with the oldest last access time among the stored structured documents is often employed. As a memory device for temporarily storing the structured document, a device such as a magnetic disk device is used, for example.

There are also some display devices such as browsers which have a function for temporarily storing a certain amount of structured documents. In such a browser, when a structured document requested by a user is one that is temporarily stored in the browser, the structured document that has been temporarily stored will be displayed instead of requesting the structured document transmission to the www server again.

There are also some browsers which have a function for checking with the WWW server or the proxy server as to whether the temporarily stored structured document is the latest one or not at a time of displaying the temporarily stored structured document.

Usually, in such a browser, the structured documents are stored up to some prescribed amount. In the case of storing the structured document in excess of the prescribed amount, the other structured documents which have been temporarily stored will be deleted according to some rule. As a rule to be used here, a simple rule such as that for sequentially deleting a structured document with the oldest last access time among the stored structured documents is often employed. As a memory device for temporarily storing the structured document, a device such as a magnetic disk device is used, for example.

Conventionally, the WWW has been operated in one of the following three forms.

(1) A form in which the WWW server which is a structured document delivery server and the browser which is a structured document display device are connected through a communication path and structured documents are exchanged between them.

(2) A form in which one or a plurality of proxy servers for relaying structured document requests and responses are provided between the WWW server which is a structured document delivery server and the browser which is a structured document display device, and the WWW server and the browser are connected and structured documents are exchanged between them through these proxy servers.

(3) A form in which one or a plurality of proxy servers for temporarily storing structured documents are provided between the WWW server which is a structured document delivery server and the browser which is a structured document display device, and the WWW server and the browser are connected and structured documents are exchanged between them through these proxy servers.

However, in the case where there is no proxy server between the WWW server and the browser as in the above (1), the structured document will be directly transmitted to the browser so that there has been a problem that the user is required to judge whether it is a document containing important items at a time of receiving it, and store that document according to the need.

Also, in the case where there is a proxy server between the WWW server and the browser as in the above (2), if the proxy server only has a function for relaying requests and responses, the structured document will be directly transmitted to the browser so that there has been a problem that the user is required to judge whether it is a document containing important items at a time of receiving it, and store that document according to the need.

On the other hand, in the case where there is a proxy server having a function for temporarily storing structured documents between the WWW server and the browser as in the above (3) or in the case where the browser itself has a function for temporarily storing received structured documents, the structured documents that are temporarily stored in the proxy server or the browser will be deleted according to some rule. As a rule to be used here, a simple rule such as that for sequentially deleting a structured document with the oldest last access time among the stored structured documents is usually employed. For this reason, even when there is a structured document that contains important contents, that structured document will be deleted without judging whether that document is an important one or not, so that there has been a problem that it can become impossible to access the structured document that contains important contents.

In order to prevent the structured document that contains important contents from being deleted soon, it is possible to store many structured documents, but in this case, there has been a problem that a memory device having a large capacity is required. Also, in this case, because many structured documents are stored, there has been a problem that it requires a considerable amount of time at a time of accessing or searching the structured document that contains important contents.

Next, the e-mail system will be described. The e-mail system comprises an e-mail server and an e-mail transmission and reception device, which are connected through a communication path such as the Internet or Intranet.

A sender of an e-mail creates the e-mail by using the e-mail transmission and reception device, and transmits the e-mail by specifying an address of a receiver. The e-mail server which received the e-mail then transfers the e-mail according to the address of the receiver specified by the sender, either to a destination e-mail server or to an e-mail server for relaying this e-mail when a direct transmission is not possible.

The destination e-mail server stores the transferred e-mails by classifying them according to destination users. The receiver of the e-mail receives the e-mail received by the e-mail server by using the e-mail transmission and reception device, and reads the e-mail. Finally, the e-mail is stored in an e-mail storage server or the e-mail transmission and reception device, or both. There are cases where the structured documents are used as documents of such e-mails.

Usually, the e-mails can be stored up to a capacity of an e-mail storage device associated with the e-mail server, and the e-mail server cannot receive any e-mails beyond that capacity. If that happens, usually a user explicitly deletes e-mails destined to that user.

In this case of the e-mail system, similarly as in the case of the WWW, structured documents contained in e-mails can be stored up to a capacity of a memory device connected to the e-mail server or the e-mail transmission and reception device, but e-mails cannot be received beyond that capacity. For this reason, it is necessary for the user to explicitly delete e-mails, but at that point, there has been a problem that the user have to carry out the deletion while checking the importance of each structured document to be deleted.

Again, in order to prevent the structured document that contains important contents from being deleted soon, it is possible to store many structured documents, but in this case, there has been a problem that a memory device having a large capacity is required. Also, in this case, because many structured documents are stored, there has been a problem that it requires a considerable amount of time at a time of accessing or searching the structured document that contains important contents.

Next, the e-news system will be described. The e-news system comprises an e-news server and an e-news transmission and reception device, which are connected through a communication path such as the Internet or Intranet.

A contributor of an e-news article creates an e-news article by using the e-news transmission and reception device, and transmits it to the e-news server. The e-news server that received the e-news article then transmits the e-news article to the other e-news servers that are connected through communication paths sequentially. Here, the e-news server has a list of e-news articles that had been received, so that it will not receive the already received e-news article once again.

A subscriber of the e-news article receives the e-news article from the e-news server by using the e-news transmission and reception device.

Usually, the e-news articles can be stored up to a capacity of an e-news article storage device associated with the e-news server, and the e-news server cannot receive any e-news articles beyond that capacity. If that happens, the e-news articles are deleted either automatically by the e-news system that is operating on the e-news server, or by a manager of the e-news server explicitly.

In this case of the e-news system, similarly as in the case of the WWW, at a time of deleting the e-news articles, even when there is a structured document contained in the e-news article that contains important contents, that structured document will be deleted without judging whether that document is an important one or not, so that there has been a problem that it can become impossible to access the structured document that contains important contents.

Again, in order to prevent the structured document that contains important contents from being deleted soon, it is possible to store many structured documents, but in this case, there has been a problem that a memory device having a large capacity is required. Also, in this case, because many structured documents are stored, there has been a problem that it requires a considerable amount of time at a time of accessing or searching the structured document that contains important contents.

SUMMARY OF THE INVENTION

It is therefore an object of the present invention to provide a scheme for constructing a database for a user system, which can automatically store those portions of the structured documents which contain important contents without exerting a burden on the user.

According to one aspect of the present invention there is provided a method for constructing a database related to structured documents that are utilized by a user system, each structured document having a structure represented by tags and being provided from a server device, the method comprising the steps of: obtaining a structured document from the server device, the structured document being provided in response to a document request made by the user system and to be transferred to the user system; extracting at least one important portion of the structured document obtained from the server device, by using the structure of the structured document according to prescribed extraction criteria specified in advance, and storing said at least one important portion into the database, said at least one important portion stored in the database being accessible by the user system; and transferring the structured document obtained from the server device, to the user system.

According to another aspect of the present invention there is provided a data relay device, comprising: a document obtaining unit for obtaining a structured document provided by a server device according to a document request received from a client device through a communication path, the structured document having a structure represented by tags in the structured document; an extraction and storing unit for extracting at least one important portion from the structured document by utilizing the structure of the structured document according to prescribed extraction criteria specified in advance, and storing said at least one important portion into a database; and a transfer unit for transferring the structured document obtained by the document obtaining unit to the client device.

According to another aspect of the present invention there is provided a client device, comprising: a document obtaining unit for obtaining a structured document provided by a server device through a communication path, according to a document request made by a user, the structured document having a structure represented by tags in the structured document; an extraction and storing unit for extracting at least one important portion from the structured document by utilizing the structure of the structured document according to prescribed extraction criteria specified in advance, and storing said at least one important portion into a database; and a display unit for displaying the structured document obtained by the document obtaining unit to the user.

According to another aspect of the present invention there is provided a computer usable medium having computer readable program code means embodied therein for causing a computer to function as a device for constructing a database related to structured documents that are utilized by a user system, each structured document having a structure represented by tags and being provided from a server device, the computer readable program code means includes: first computer readable program code means for causing said computer to obtain a structured document from the server device, the structured document being provided in response to a document request made by the user system and to be transferred to the user system; second computer readable program code means for causing said computer to extract at least one important portion of the structured document obtained from the server device, by using the structure of the structured document according to prescribed extraction criteria specified in advance, and store said at least one important portion into the database, said at least one important portion stored in the database being accessible by the user system; and third computer readable program code means for causing said computer to transfer the structured document obtained from the server device, to the user system.

Other features and advantages of the present invention will become apparent from the following description taken in conjunction with the accompanying drawings.

BRIEF DESCRIPTION OF THE DRAWINGS

FIGS. 8A and 8B are diagrams showing exemplary structured documents used in the description of the important item extraction processing of FIG. 7.

FIGS. 9A and 9B are diagrams showing exemplary states of structured documents in a middle of the important item extraction processing of FIG. 7.

DETAILED DESCRIPTION OF THE PREFERRED EMBODIMENTS

Figure 1:
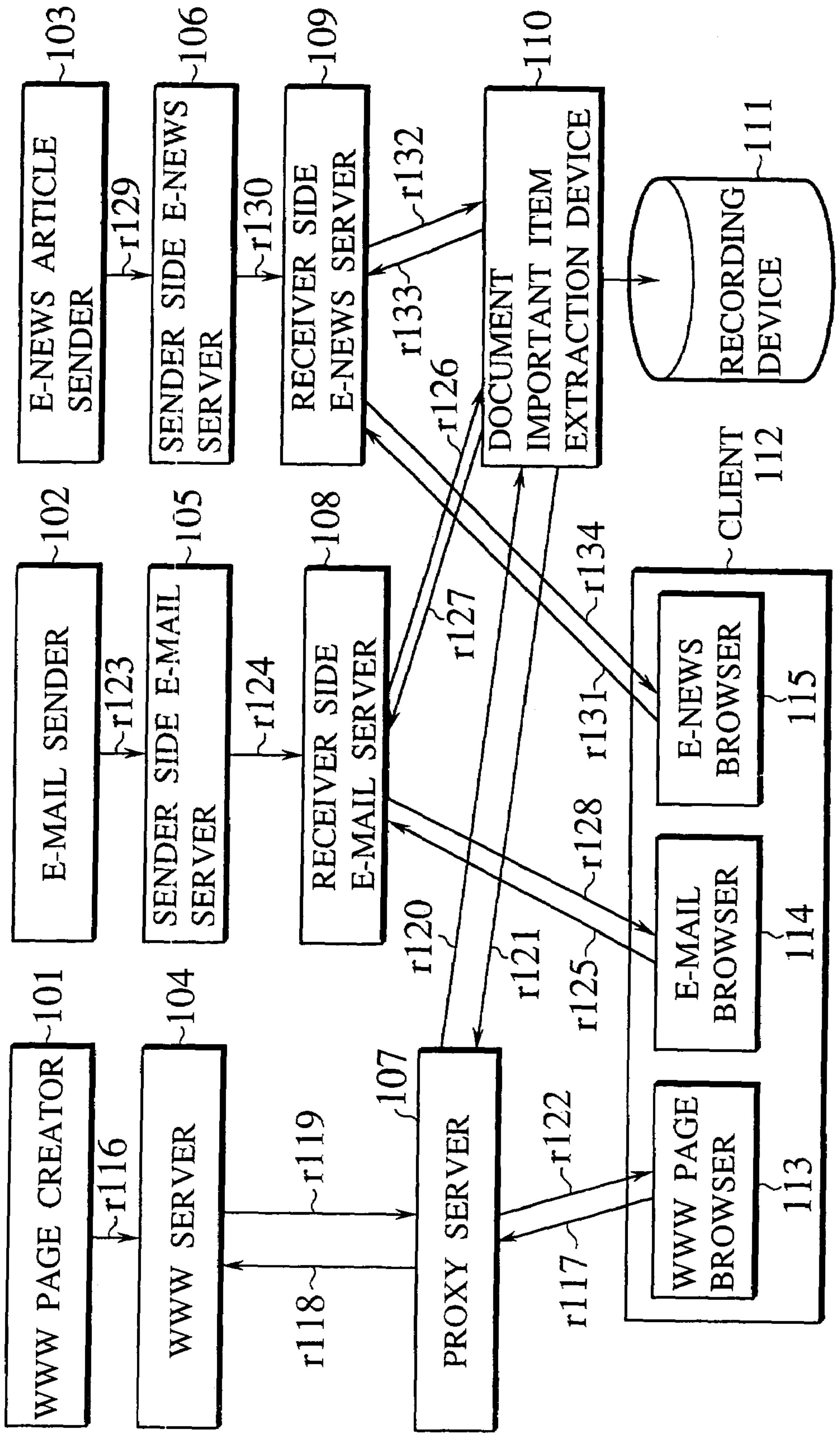
FIG. 1 is a block diagram showing of an exemplary network system using a document important item extraction device according to the first embodiment of the present invention.

Now the preferred embodiments of a database construction scheme according to the present invention will be described in detail with references to the drawings.

The present invention uses an important item extraction device which has basic functions including a function for specifying important items, and a function for automatically extracting and storing the specified important items from structured documents that are received through a communication path. It is also possible to provide a search function for the stored important items. It is also possible to provide a sharing function that enables the sharing of the stored important items by a plurality of users. It is also possible to provide a function for automatically generating attaching items related to the important items and storing the generated attaching items and the extracted important items in pair. In this case, it is also possible to provide a search function and a sharing function in addition.

Here, the structured document is a document in which text for expressing a document structure called tags and data other than tags are mixedly present. The structured document can be an SGML document, an XML document, an HTML document, or a structured document transmitted by the e-mail or e-news.

The structured document has its logical structure determined by the tags. Each tag starts with a specific code and ends with a specific code. The tags include a start tag, an end tag, an empty tag, etc. Also, each tag has a tag name, attribute names and attribute values. A region enclosed by the start tag and the end tag that have the same tag name will be referred to as an item. It is possible for one item to be contained within another item (that is, a hierarchical structure can be realized).

For example, in the structure document called XML document, a code representing a start of the tag is "<", a code representing an end of the tag is ">", a start tag is defined as:

<[tag name], [attribute name]=[attribute value], — >, an end tag is defined as:

</[tag name]>, and an empty tag is defined as:

<[tag name], [attribute name]=[attribute value], — />.

Also, there are some structured documents which are capable of being related to a document called DTD (Document Type Definition) that defines the document structure. The DTD defines types of tags that can be used in the structured document, a hierarchical relationship among these tags, etc., so as to clearly define the logical structure of the structured document.

First Embodiment

Referring now to FIG. 1 to FIG. 17, the first embodiment of the database construction scheme according to the present invention will be described in detail.

In this first embodiment, a document important item extraction device is provided with a function for specifying one or a plurality of "important items", and a function for identifying each important item by attaching arbitrary name and enabling specification of one or a plurality of extraction methods for each important item. Here, the specification of "important item extraction method" is made by specifying "tag name" or "word" of the structured document.

In the document important item extraction device of this first embodiment, when the specified tag name or word is contained in the structured document, the entire structured document or only the specified tag portion of the structured document is stored.

In the case of analyzing the structured document, the document structure is already structured by the tags, so that it can be analyzed easily by using the tags. Even in the case of determining a range of the extracted important items, it can be easily determined by setting the entire tags containing the important items as this range. For this reason, it can be said that the extraction processing load is very light.

In this way, it becomes possible to store only the important items or the structured documents that contain the important items from many structured documents effectively.

In addition, a data transmission and reception device (client device) is provided with a function for explicitly displaying portions extracted and stored by the document important item extraction device at a time of displaying the structured document.

In this way, it becomes possible for the user to easily identify the important items in the structured document. On the contrary, when some important item is not displayed as such, it can be confirmed by the user that the document important item extraction device has failed the extraction of that important item.

As a method for explicitly displaying the important items, there are various methods available, including that for displaying the important items in a color different from colors of other characters used in the document, or that for displaying the important items in a color different from colors of other backgrounds used in the document.

The data transmission and reception device of this first embodiment is provided with a function for explicitly specify, add, change or delete portions to be automatically extracted and stored by the document important item extraction device.

For example, a portion corresponding to the important item is specified to the document important item extraction device by specifying a region in the structured document using a position specifying device (pointing device) such as mouse. Also, when there is an item which has the same meaning as the other important item, this item is added as the important item. Else, when there is an item among those items which are specified as the important items which is later judged as not an important item, a change is made so as not to extract this item as the important item. Also, when a portion which is explicitly displayed as an important item by the data transmission and reception device is actually not an important item, the user can specify the deletion of the automatic extraction function for the corresponding portion.

In this way, the user can easily realize the specification, addition, change and deletion of the important items.

In the case of specifying the important item, a "telephone" tag in the structured document can be specified by the important item "telephone number", for example. In the case where a tag "TEL" is also an important item expressing the telephone number similarly, a tag "TEL" is added to the important item "telephone number". Also, in the case where the user judges that a tag "TEL" does not express the telephone number, a change is made such that a tag "TEL" is not to be extracted in the important item "telephone number". Also, in the case where the important item "telephone number" becomes unnecessary, this important item "telephone number" is deleted.

In the document important item extraction device of this first embodiment, the already extracted and stored important item will be maintained even when the setting for extracting this important item is deleted. Even if it is the important item that has become unnecessary at some point, the already stored item will be maintained so that it is possible to continue to use functions such as search function with respect to that item.

Now the specific examples of the first embodiment will be described.

Embodiment 1-1

FIG. 1 shows an exemplary network system using the document important item extraction device according to this first embodiment.

The exemplary system configuration shown in FIG. 1 comprises: (1) a WWW system formed by a WWW page creator 101, a WWW server 104, a proxy server 107 and a WWW page browser 113; (2) an e-mail system formed by an e-mail sender 102, a sender side e-mail server 105, a receiver side e-mail server 108 and an e-mail browser 114; (3) an e-news system formed by an e-news article sender 103, a sender side e-news server 106, a receiver side e-news server 109 and an e-news browser 115; and (4) a document important item extraction device 110 for automatically extracting important items from structured documents that are exchanged on the above systems.

In the example of FIG. 1, a user carries out the desired operations by using a client 112 on which the WWW page browser 113, the e-mail browser 114 and the e-news browser 115 are operating.

Figure 2:
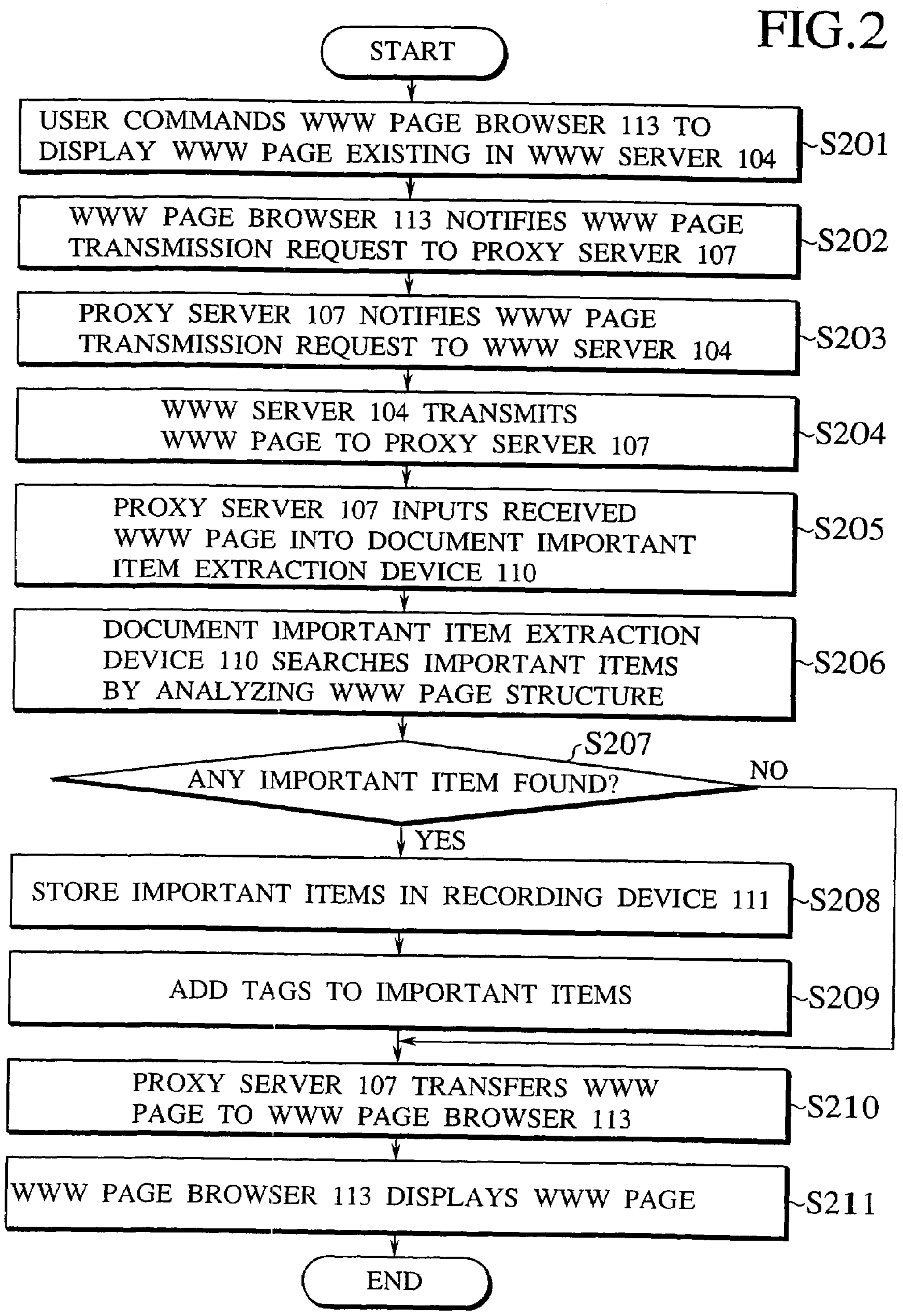
FIG. 2 is a flow chart for the operation related to a WWW system by the document important item extraction device according to the first embodiment of the present invention.

First, the operation related to the WWW system of FIG. 1 will be described with reference to FIG. 2.

Usually, the WWW page on the WWW server 104 is created by the WWW page creator 101 and stored in the WWW server 104.

At first, the user commands the display of the WWW page stored in the WWW server 104, with respect to the WWW page browser 111 which is an application on the client 112 (step S201). At this point, it is possible to directly specify the WWW server 104 in which the WWW page is stored, or specify a hyperlink contained in the WWW page that is already displayed on the WWW page browser 113.

Upon receiving the command from the user, the WWW page browser 113 notifies the transmission request for the WWW page specified by the user to the proxy server 107 (r117 of FIG. 1, step S202). The proxy server 107 then similarly notifies the transmission request for the WWW page to the WWW server 104 (r118 of FIG. 1, step S203). The WWW server 104 then transmits the requested WWW page to the proxy server 107 (r119 of FIG. 1, step S204).

The proxy server 107 inputs the received WWW page into the document important item extraction device 110 (r120 of FIG. 1, step S205). The document important item extraction device 110 analyzes the structure of the WWW page which is a structured document, and searches for the important items specified by the user therein (step S206). Then, whether any important item is found or not is judged (step S207). If the important item is found, the important item is extracted and stored into a recording device 111 (step S208), while a tag indicating that the important item has been extracted is added to the WWW page (step S209). Here, if no important item is contained in the WWW page, nothing is stored in the recording device 111. As the recording device 111, a hard disk device can be used, for example.

After the extraction of the important items is finished, the document important item extraction device 110 outputs the WWW page to the proxy server 107 (r121 of FIG. 1). The proxy server 107 then transfers the WWW page to the WWW page browser 113 (r122 of FIG. 1, step S210).

Upon receiving the WWW page, the WWW page browser 113 displays the WWW page (step S211). At this point, if the important items are contained in the WWW page, the tags indicating that they are extracted are attached by the document important item extraction device 110, so that their extracted regions are explicitly displayed by using the highlightened display, the reversed display, or the shaded display.

Figure 3:
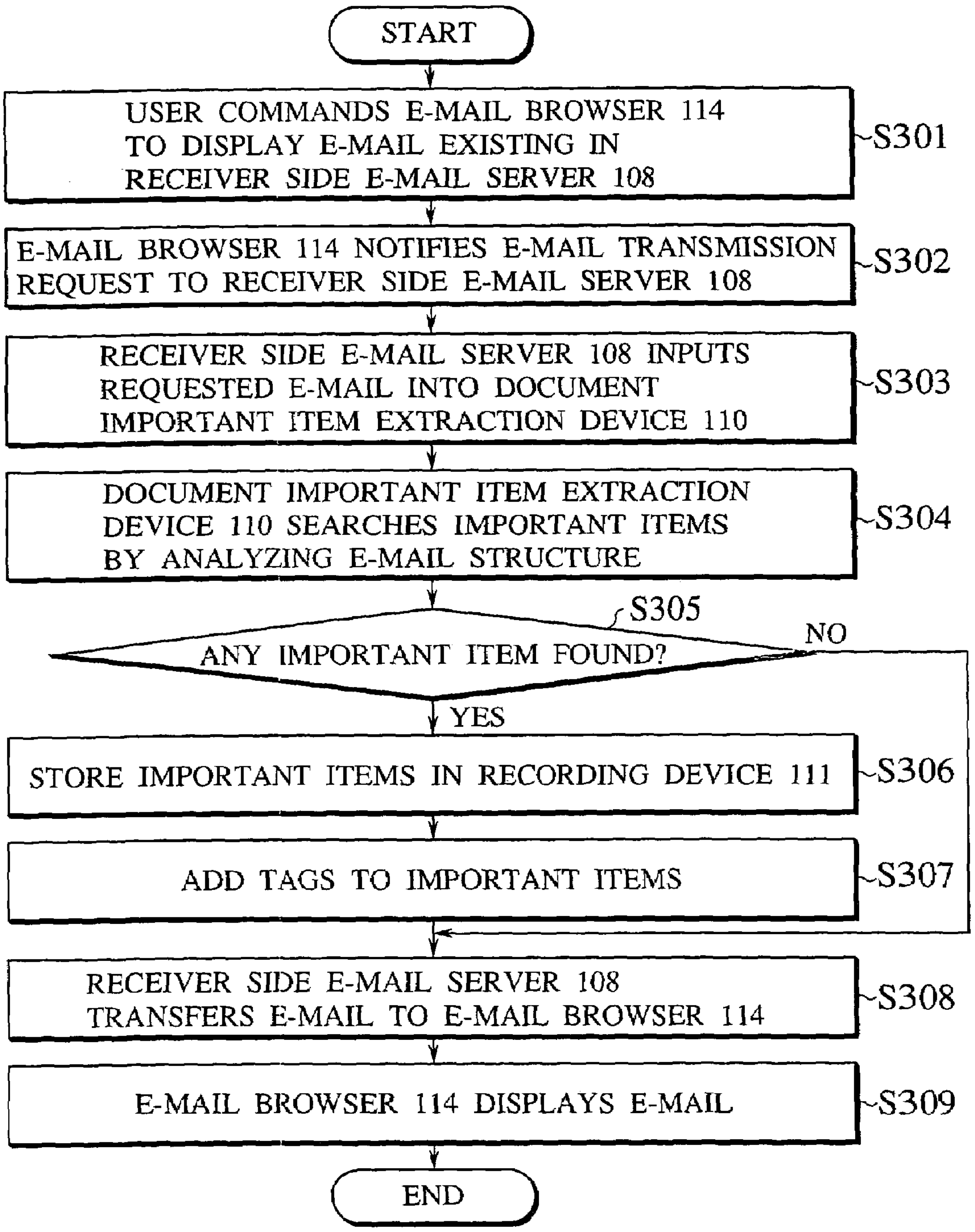
FIG. 3 is a flow chart for the operation related to an e-mail system by the document important item extraction device according to the first embodiment of the present invention.

Next, the operation related to the e-mail system will be described with reference to FIG. 3.

The e-mail is transmitted to the sender side e-mail server 105 by the e-mail sender 102 (r123 of FIG. 1), and the sender side e-mail server 105 transmits the e-mail to the receiver side e-mail server 108 of the user who is the receiver of the e-mail (r124 of FIG. 1).

The user then commands the display of the e-mail stored in the receiver side e-mail server 108, with respect to the e-mail browser 114 on the client 112 (step S301).

Upon receiving the command from the user, the e-mail browser 114 notifies the transmission request for the e-mail to the receiver side e-mail server 108 (r125 of FIG. 1, step S302).

The receiver side e-mail server 108 inputs the transmission requested e-mail into the document important item extraction device 110 (r126 of FIG. 1, step S303). The document important item extraction device 110 analyzes the structure of the e-mail which is a structured document, and searches for the important items specified by the user therein (step S304). Then, whether any important item is found or not is judged (step S305). If the important item is found, the important item is extracted and stored into the recording device 111 (step S306), while a tag indicating that the important item has been extracted is added to the e-mail (step S307). Here, if no important item is contained in the e-mail, nothing is stored in the recording device 111.

After the extraction of the important items is finished, the document important item extraction device 110 outputs the e-mail to the receiver side e-mail server 108 (r127 of FIG. 1). The receiver side e-mail server 108 then transfers the e-mail to the e-mail browser 114 (r128 of FIG. 1, step S308).

Upon receiving the e-mail, the e-mail browser 114 displays the e-mail (step S309). At this point, if the important items are contained in the e-mail, the tags indicating that they are extracted are attached by the document important item extraction device 110, so that their extracted regions are explicitly displayed by using the highlightened display, the reversed display, or the shaded display.

Figure 4:
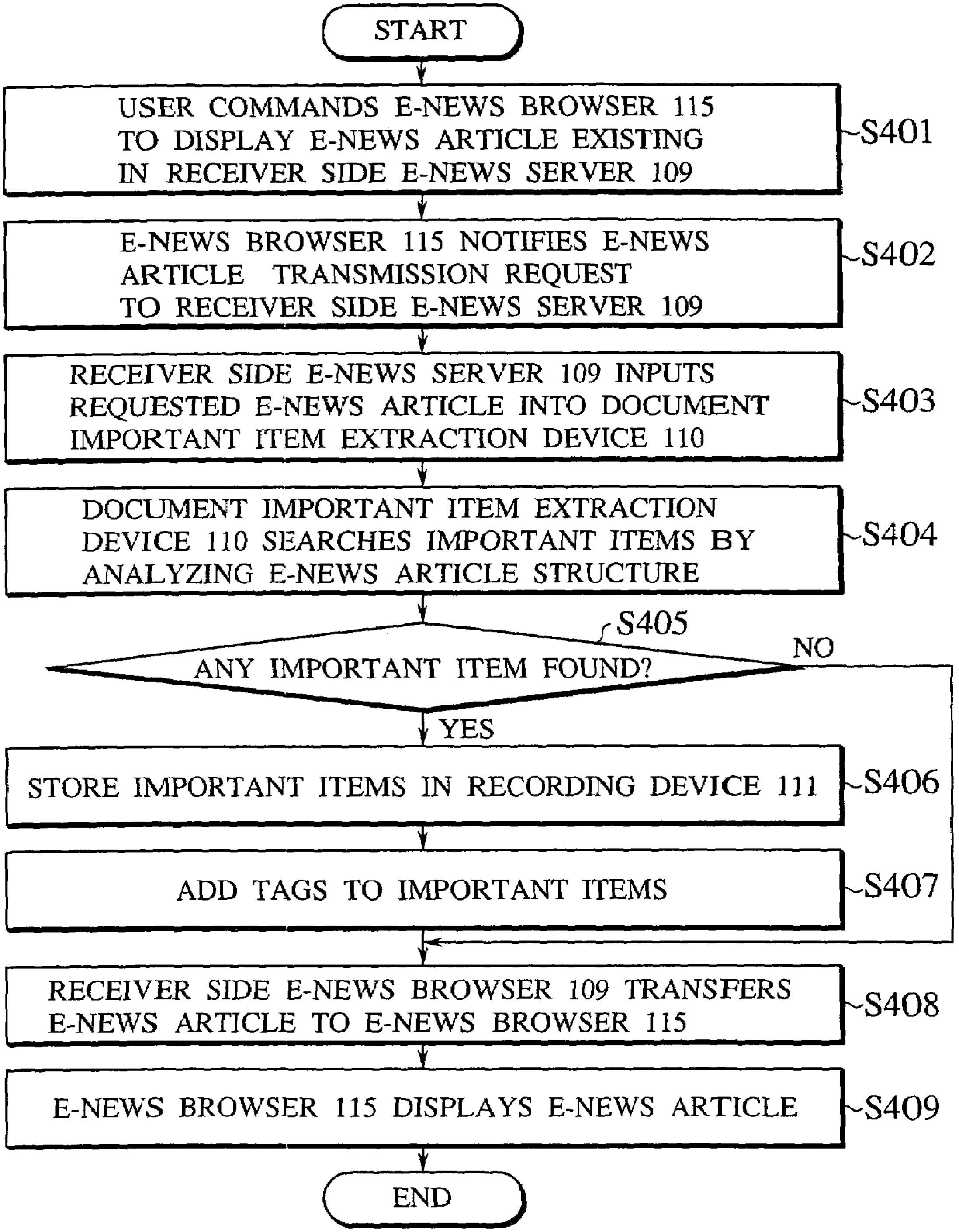
FIG. 4 is a flow chart for the operation related to an e-news system by the document important item extraction device according to the first embodiment of the present invention.

Next, the operation related to the e-news system will be described with reference to FIG. 4.

The e-news article is submitted to the sender side e-news server 106 by the e-news article sender 103 (r129 of FIG. 1), and the submitted e-news article is transferred from the sender side e-news server 106 to the receiver side e-news server 109 of the user (r130 of FIG. 1).

The user then commands the display of the e-news article stored in the receiver side e-news server 109, with respect to the e-news browser 115 on the client 112 (step S401).

Upon receiving the command from the user, the e-news browser 115 notifies the transmission request for the e-news article to the receiver side e-news server 109 (r131 of FIG. 1, step S402).

The receiver side e-mail server 109 inputs the transmission requested e-news article into the document important item extraction device 110 (r132 of FIG. 1, step S403). The document important item extraction device 110 analyzes the structure of the e-news article which is a structured document, and searches for the important items specified by the user therein (step S404). Then, whether any important item is found or not is judged (step S405). If the important item is found, the important item is extracted and stored into the recording device 111 (step S406), while a tag indicating that the important item has been extracted is added to the e-news article (step S407). Here, if no important item is contained in the e-news article, nothing is stored in the recording device 111.

After the extraction of the important items is finished, the document important item extraction device 110 outputs the e-news article to the receiver side e-news server 109 (r133 of FIG. 1). The receiver side e-news server 109 then transfers the e-news article to the e-news browser 115 (r134 of FIG. 1, step S408).

Upon receiving the e-news article, the e-news browser 115 displays the e-news article (step S409). At this point, if the important items are contained in the e-news article, the tags indicating that they are extracted are attached by the document important item extraction device 110, so that their extracted regions are explicitly displayed by using the highlightened display, the reversed display, or the shaded display.

In the above described manner, the structured document is transmitted from a server to a client used by the user, and in a middle of its course, the document important item extraction device is operated to automatically extract and store the desired important items.

Note that, in FIG. 1, the document important item extraction device 110 is shared by the proxy server 107, the receiver side e-mail server 108 and the receiver side e-news server 109, but it is also possible to provide a dedicated document important item extraction device 110 for each server separately.

It is also possible to connect the document important item extraction device 110 to the client 112 in the case of a system which does not use the proxy server 107, the receiver side e-mail server 108 and the receiver side e-news server 109. Also, when a plurality of clients 112 are present, the document important item extraction device 110 may be shared among them, or a dedicated document important item extraction device 110 for each client 112 may be provided separately.

Also, in FIG. 1, the document important item extraction device 110 is depicted as an independent device, but the document important item extraction device 110 may be implemented in each data relay server (each of the proxy server 107, the receiver side e-mail server 108 and the receiver side e-news server 109 in FIG. 1). In such a case, exchanges between the document important item extraction device 110 and the data relay server in the procedures of FIG. 2 to FIG. 4 become communications between the document important item extraction process and the data relay server process, for example.

It is also possible to implement the document important item extraction device 110 in the data transmission and reception device (the client 112 in FIG. 1). In such a case, exchanges between the document important item extraction device 110 and the data relay server in the procedures of FIG. 2 to FIG. 4 will be replaced by communications between the document important item extraction process and the browser process, for example. Also, in this case, it is possible to utilize the data relay devices (the proxy server 107, the receiver side e-mail server 108 and the receiver side e-news server 109 of FIG. 1) as in FIG. 1, or not to utilize the data relay devices.

Note that the above noted variations equally apply to the second and third embodiments to be described below.

Next, a configuration and a method for setting up the "important item extraction method" will be described with references to FIG. 5 and FIG. 6.

Figure 5:
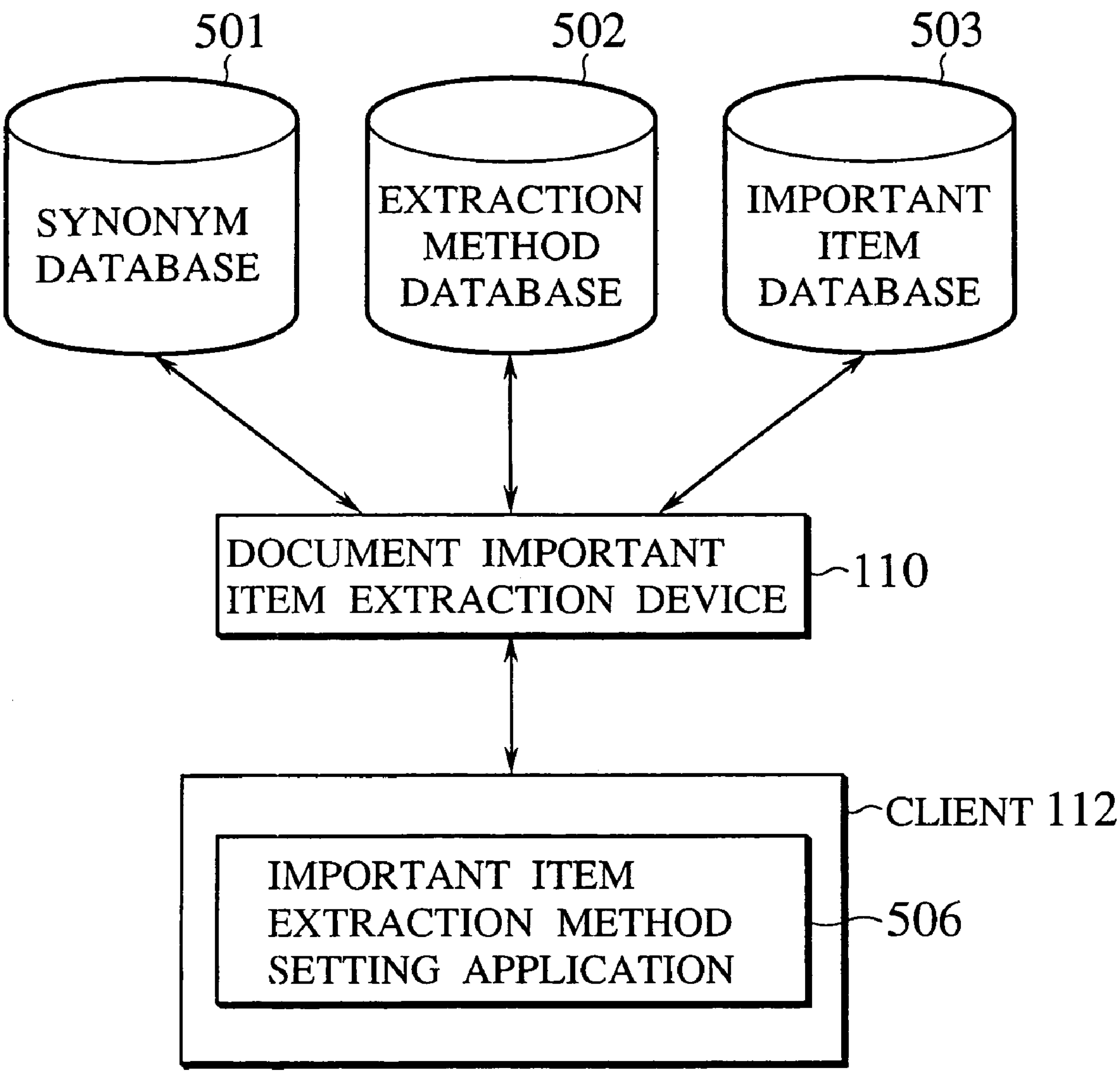
FIG. 5 is a schematic diagram showing a configuration for setting up an important item extraction method in the document important item extraction device of FIG. 1.
Figure 6:
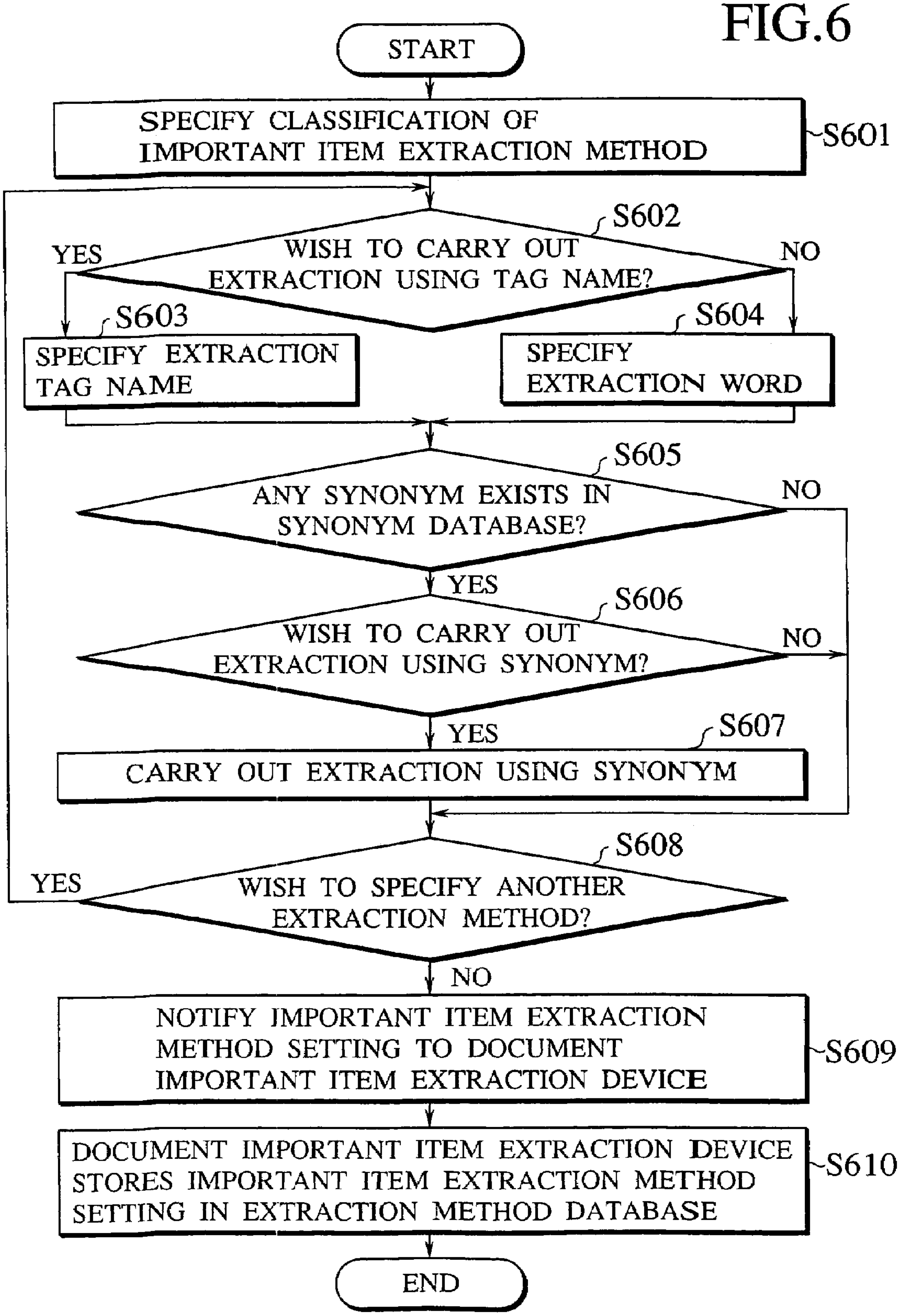
FIG. 6 is a flow chart of a method for setting up an important item extraction method in the document important item extraction device of FIG. 1.

First, FIG. 5 shows an exemplary configuration of an extraction function portion of the document important item extraction device 110 and the data transmission and reception device (client device), for the purpose of setting up the important item extraction method.

The document important item extraction device 110 has a synonym database 501, an extraction method database 502, and an important item database 503.

The synonym database 501 stores synonyms of general terms that are set as the important items. For example, as the synonyms of "conference", words such as "discussion" and "meeting" are stored.

The extraction method database 502 stores the "important item extraction method" set by the user, which will be referred to when the document important item extraction device 110 extracts the important items from the structured document.

The important item database 503 stores the important items that are automatically extracted by the document important item extraction device 110, in a structured format which enables the subsequent search.

The user sets up the important item extraction method by communicating with the document important item extraction device 110, using an important item extraction method setting application 506 in the client 112 which is the data transmission and reception device. For the extraction of the important items, a method using names of the tags that determine the structure of the structured document and a method for searching corresponding words from the full text of the structured document are available. The extraction can be carried out by using either one of these methods or both.

The "important item extraction method" comprises "classifications" of the important items and their "extraction methods". it is possible to specify a plurality of important item classifications, and it is possible to specify a plurality of extraction methods with respect to one important item classification.

Next, a procedure for setting up the "important item extraction method" will be described with reference to FIG. 6.

The user sets up the important item extraction method by using the important item extraction method setting application 506. In the procedure of FIG. 6, first, the "classification" of the important items is specified (step S601). It is possible to give a name such as "meeting notice" to the classification, for example. Then, one or a plurality of the extraction methods are set up.

The steps S602 to S608 constitute a loop processing for setting up the desired extraction method, which is to be executed as many times as the number of extraction methods to be set up.

First, the extraction method is specified (step S602). In the case of carrying out the extraction by a method using names of the tags that determine the structure of the structured document, the extraction tag name in the structured document is specified (step S603). At this point, when the synonyms of the extraction tag name exist in the synonym database 501 (step S605), it is possible to specify a method which extracts all the synonyms as the extraction tag name (step S606). When the use of the synonyms is specified, the search using all the synonyms as the extraction tag name is carried out at a time of extracting the important items in the structured document at the document important item extraction device 110 (step S607).

In the case of carrying out the extraction by a method for searching a corresponding word from the full text of the structured document, the extraction word is specified (step S604). At this point, when the synonyms of the extraction word exist in the synonym database 501 (step S605), it is possible to specify all the synonyms as the extraction word to be searched (step S606). When the use of the synonyms is specified, the search using all the synonyms as the extraction word is carried out at a time of extracting the important items in the structured document at the document important item extraction device 110 (step S607).

Also, at a time of specifying the extraction tag name of the structured document, if the DTD referred by the structured document is specified, types of the tag names that can be contained in the structured document can be determined from the DTD, so that it is preferable to be able to specify only those tags which are potentially contained in the structured document as the extraction tag name. In this way, it is possible to prevent an error in the setting of the important item tag name. It is also possible to specify the other extraction method repeatedly (step S608).

When the classification of the important items and one or a plurality of the extraction methods for that classification are set up as in the above, the important item extraction method setting application 506 notifies this setting to the document important item extraction device 110 (step S609). The document important item extraction device 110 then stores this setting in the extraction method database 502 (step S610).

It is also possible to set up a plurality of classifications by repeating the step S601 and the subsequent steps.

Next, a procedure for extracting the important items at the document important item extraction device 110 will be described with references to FIG. 5 and FIG. 7.

Figure 7:
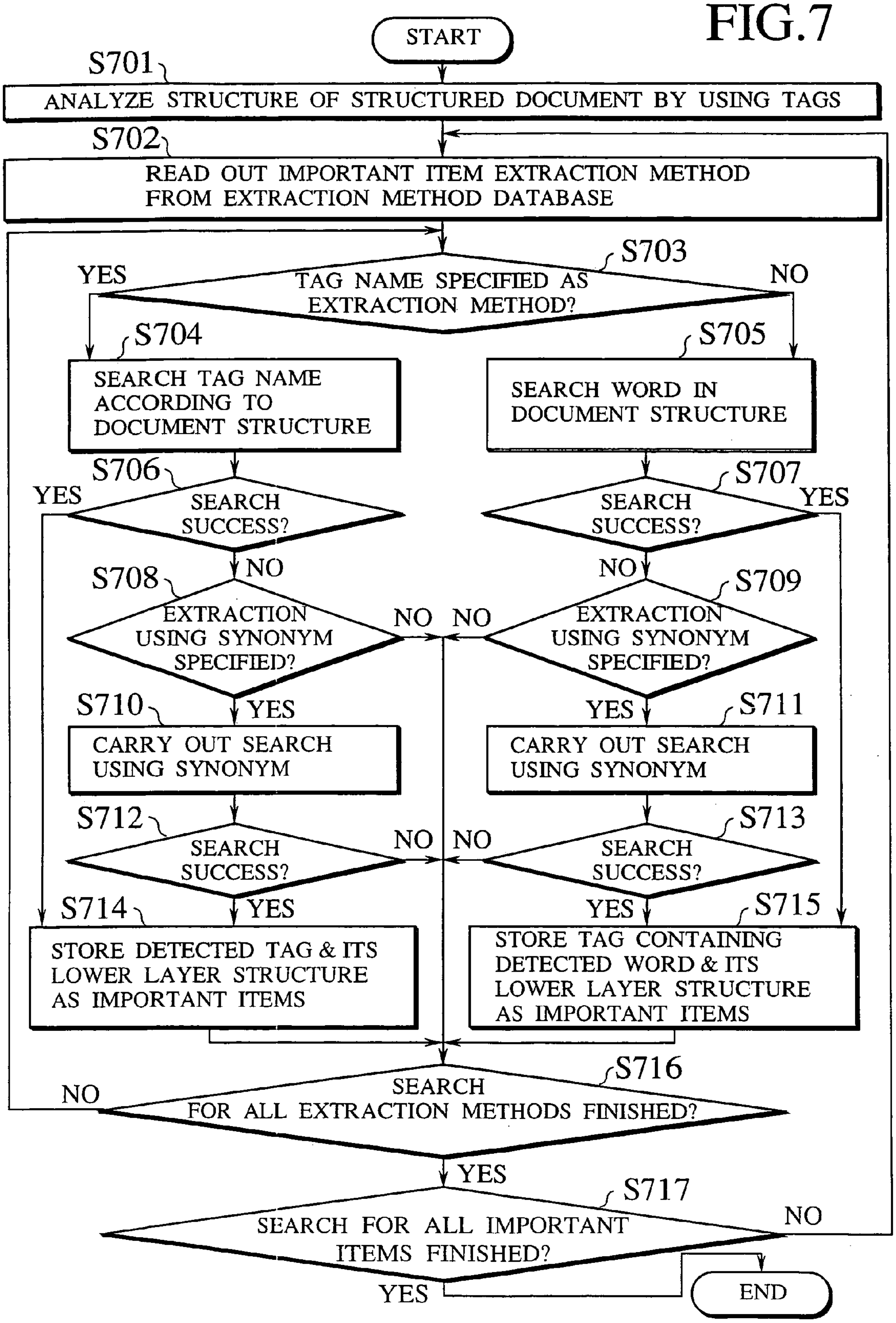
FIG. 7 is a flow chart of an important item extraction processing by the document important item extraction device according to the first embodiment of the present invention.
Figure 10A:
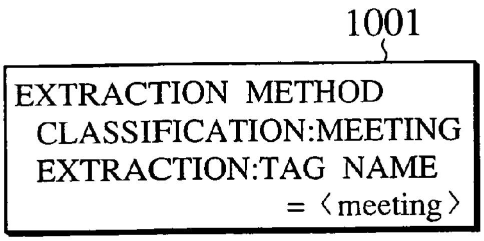
FIGS. 10A and 10B are diagrams showing exemplary settings of extraction method in the important item extraction processing of FIG. 7.
Figure 10B:
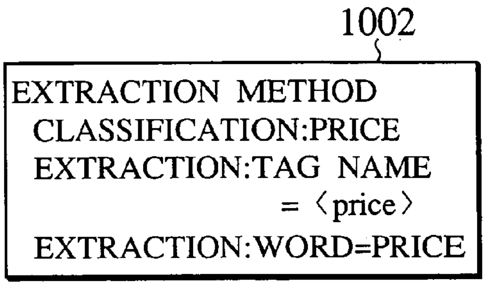
Figure 11:
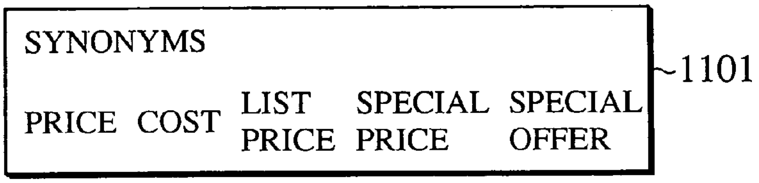
FIG. 11 is a diagram showing an exemplary synonym database used in the important item extraction processing of FIG. 7.
Figure 12A:
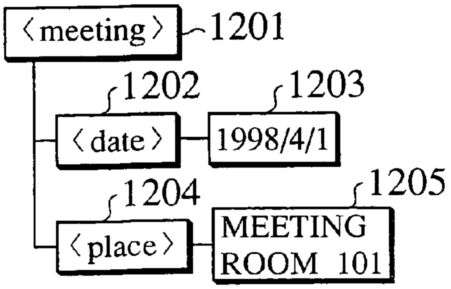
FIGS. 12A and 12B are exemplary extraction results obtained by the important item extraction processing of FIG. 7.
Figure 12B:
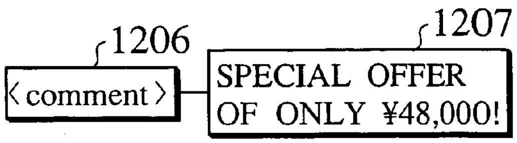

FIG. 7 shows the important item extraction procedure of the document important item extraction device 110. Note that the following description of the extraction procedure also utilizes exemplary structured documents shown in FIGS. 8A and 8B, exemplary states of the structured document in a middle of the extraction processing as shown in FIGS. 9A and 9B, exemplary settings of the extraction method as shown in FIGS. 10A and 10B, an exemplary synonym database shown in FIG. 11, and exemplary extraction results shown in FIGS. 12A and 12B. Among them, FIGS. 8A, 9A, 10A and 12A correspond to one example, while FIGS. 8B, 9B, 10B and 12B correspond to another example.

Since the WWW page, e-mail, and e-news article are in forms of text files, the text files or a memory storing the text will be used for the input to the document important item extraction device 110.

The input text is usually structured by tags as in a structured document 801 shown in FIG. 8A or a structured document 802 shown in FIG. 8B. Consequently, the document structure is analyzed by using tags, as in a document structure 901 shown in FIG. 9A or a document structure 902 shown in FIG. 9B (step S701).

Then, the document important item extraction device 110 reads out the important item extraction method set by the user such as an important item extraction method 1001 shown in FIG. 10A or an important item extraction method 1002 shown in FIG. 10B, from the extraction method database 502 (step S702), and the extraction of the important items is carried out. At this point, when a plurality of important item extraction methods are specified as in the important item extraction method 1002, the extraction is carried out repeatedly for all the important item extraction methods (step S716).

Then, whether a method using names of the tags of the structured document is specified as the extraction method or not is judged (step S703). When the method using names of the tags that determine the structure of the structured document is specified as the extraction method as in the important item extraction method 1001, the extraction tag name is searched in the analyzed document structure (step S704). In this example, the extraction tag name <meeting> which is specified in the extraction method is contained in the document structure 901 (step S706) so that the extraction tag <meeting> and its lower layer structure 1201 are extracted as the important items, and stored into the important item database 503 (step S714).

When the method for searching a corresponding word from the full text of the structured document is specified as the extraction method as in the important item extraction method 1002, the extraction word is searched in the analyzed document structure (step S705). In this example, the extraction word "price" which is specified in the extraction method is not contained in the document structure 902, so that nothing is stored into important item database 503 (step S707). However, in this example, the use of synonyms is specified in the extraction method (step S709) so that the search using the synonyms is carried out (step S711). By referring to the synonym database 1101 shown in FIG. 11, the document structure 902 contains a synonym "special offer" among the synonyms 1101 of the specified extraction word, so that a tag <comment> that contains the "special offer" that is the extraction word and its lower layer structure 1202 are extracted as the important items, and stored into the important item database 503 (step S715).

The above processing is repeatedly executed until the searches for all the important items are finished (step S717).

Next, a procedure for storing the important items in the document important item extraction device 110 will be described with references to FIG. 5, FIG. 10, FIG. 13 and FIG. 14.

For the important item database 503 into which the important items are stored by the document important item extraction device 110, a database capable of storing structured data is used. For example, the object-oriented database can be used.

Figure 13:
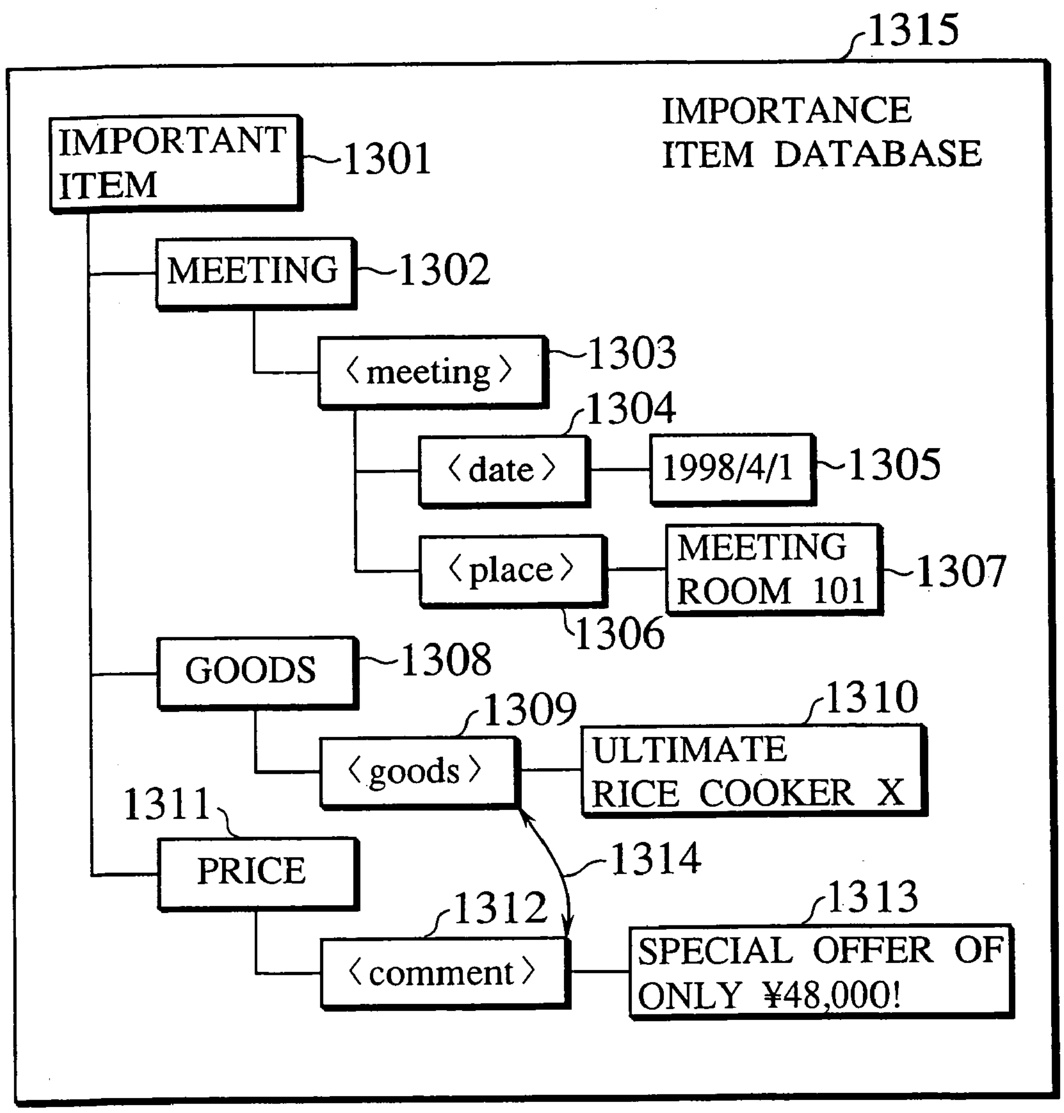
FIG. 13 is a diagram showing one exemplary internal structure of an important item database according to the first embodiment of the present invention.

FIG. 13 shows an exemplary internal structure of the important item database 503. Note that the content shown in FIG. 13 corresponds to the extraction result in the case of extracting the important items for the classification "meeting" and the classification "price" in the extraction method settings shown in FIGS. 10A and 10B, from the two structured documents shown in FIGS. 8A and 8B, and also extracting the important items using a tag name =<goods> for the classification "goods".

In the important item database 1315, the classifications of the important items, i.e., "meeting" 1302, "goods" 1308, and "price" 1311, that are used at a time of setting the important item extraction method are stored in advance.

The important items that are extracted by the document important item extraction device 110 using the important item extraction method stored in the extraction method database 502 can be stored effectively under the "classification" of the important item extraction method used in the extraction. By storing in this way, it becomes possible to distinguish the extracted important items according to the respective important item extraction methods. For example, the important items extracted by the extraction method 1001 shown in FIG. 10A are stored under the classification "meeting" 1302.

It is also preferable to attach links for relating the important items to each other, for the important items that are extracted from the identical structured document. For example, when the important item 1309 which is classified into the classification "goods" 1308 and the important item 1312 which is classified into the classification "price" 1311 are extracted from the identical structured document, the important item 1309 and the important item 1312 can be related by a link 1314. By relating the important items by links in this way, it is possible to preserve the relationship among the important items that are stored by the different important item extraction methods from the same structured document, so that the relationship that a plurality of the important items are contained in the same structured document can be utilized at a time of searching the important item.

Figure 14:
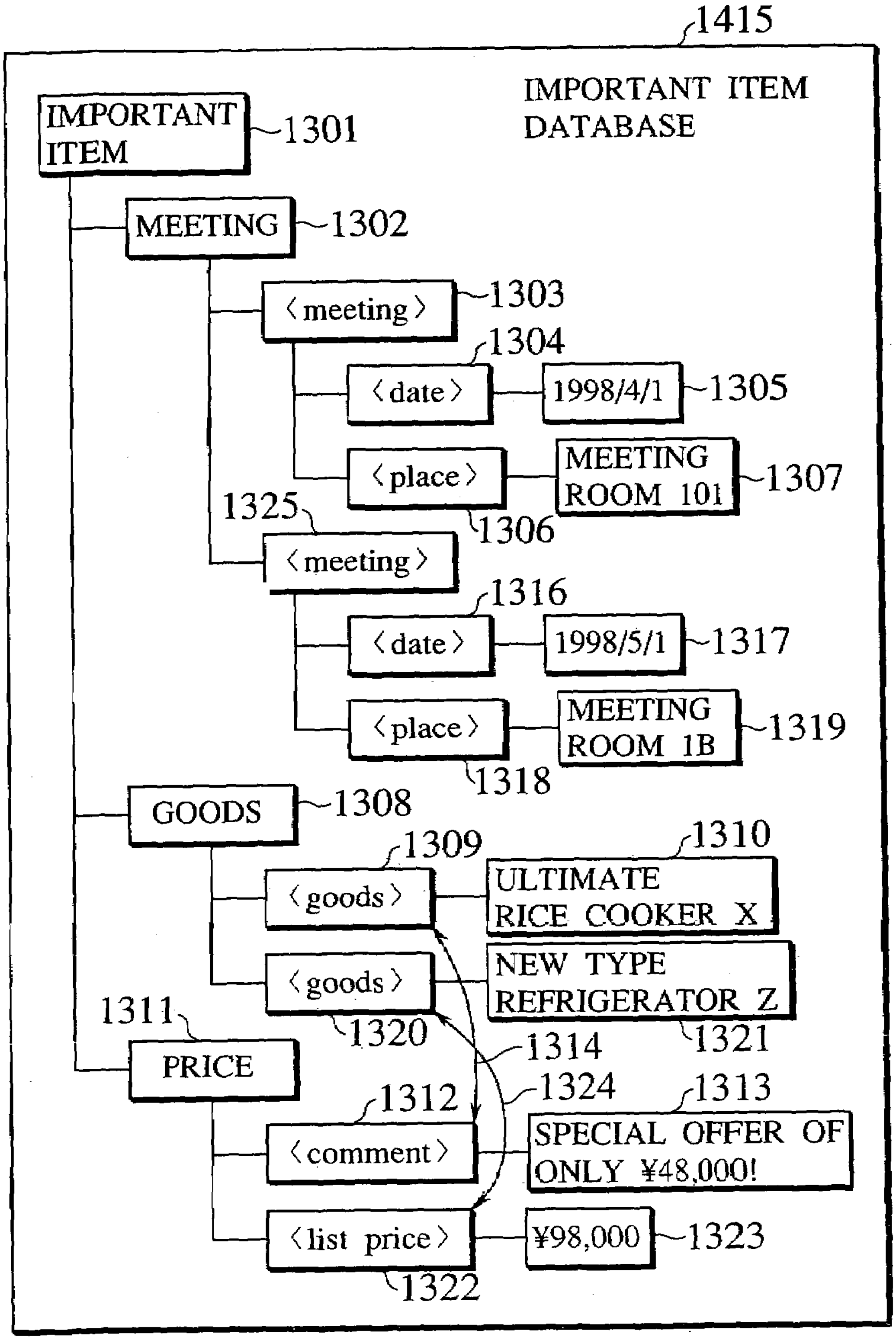
FIG. 14 is a diagram showing another exemplary internal structure of an important item database according to the first embodiment of the present invention.

FIG. 14 shows another exemplary internal structure of the important item database 503. An example of FIG. 14 is directed to the case where the extracted important items are added further to the example of FIG. 13.

This example of FIG. 14 shows that the important item 1325 that is related to the classification "meeting" 1302 is extracted from the other structured document and this important item 1325 is added under the classification "meeting" 1302. It also shows the important item 1320 that is related to the classification "goods" 1308 and the important item 1322 that is related to the classification "price" 1311 are extracted from the other structured document, and respectively added under the classification "meeting" 1302 and the classification "price" 1311. It also shows that the important item 1320 that is classified into the classification "goods" 1308 and the important item 1322 that is classified into the classification "price" 1311 are extracted from the identical structured document so that the important item 1320 and the important item 1322 are related by a link 1324.

Embodiment 1-2

Next, a method for displaying the structured document and a method for specifying, adding, changing, or deleting the important item extraction method at the browser (the WWW page browser 113, the e-mail browser 114 and the e-news browser 115 of FIG. 1) in the data transmission and reception device (the client 112 of FIG. 1) will be described.

Here, the operations are the same for the WWW page browser 113, the e-mail browser 114, and the e-news browser 115, so that the operations on the WWW page browser 113 will be described as an example.

First, an exemplary operation for newly specifying the important item will be described with references to FIG. 15, FIG. 16 and FIG. 17.

Figure 15:
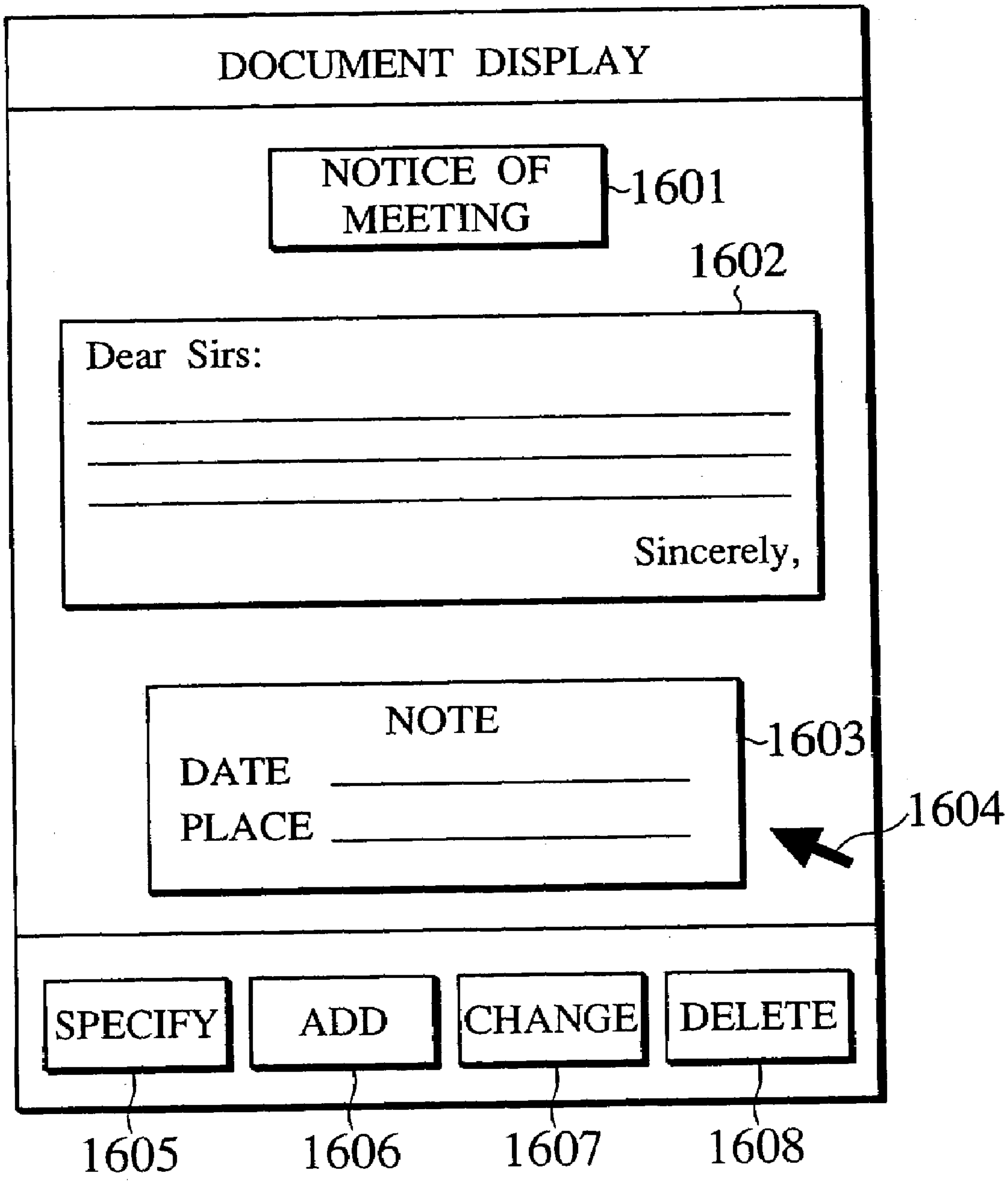
FIG. 15 is a diagram showing an exemplary display of a structured document in one state in the first embodiment of the present invention.

FIG. 15 shows an exemplary display of the structured document that contains no important item at the WWW page server 113. In FIG. 15, none of a title 1601 of the structured document, a content 1602 of the structured document, and a note section 1603 of the structured document contains the important item, so that the structured document is displayed in its original state of creation.

At this point, suppose that the note section 1603 of the structured document is to be newly specified as the important item on the WWW page browser 113.

The user specifies a region of the note section 1603 of the structured document by using a mouse pointer 1604 which is the position specifying device, and presses an important item specify button 1605, for example. FIG. 16 shows a situation where a region of the note section 1603 is specified.

Figure 17:
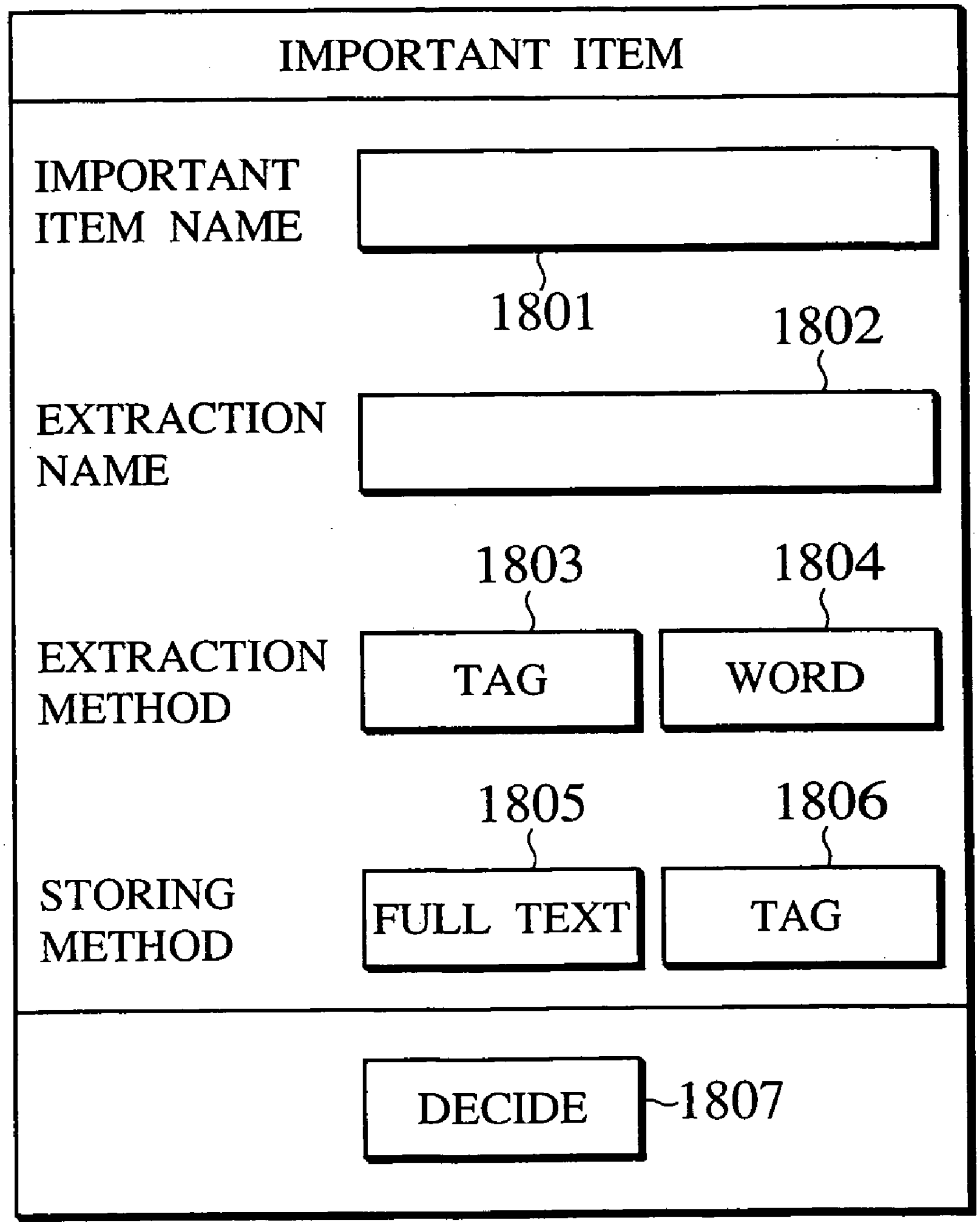
FIG. 17 is a diagram showing an exemplary screen display used in the first embodiment of the present invention.

When the region is specified and the important item specify button 1605 is pressed, the WWW page browser 113 displays an important item specifying screen as shown in FIG. 17, and sets up an extraction name input portion 1802 by searching a tag of the portion at the region specified by user from the structured document. The user then enters the important item name into an important item name input portion 1801. Similarly, the user presses a tag extraction specify button 1803 in the case of using a tag name as the extraction method, or a word extraction specify button 1804 in the case of using a word as the extraction method. Also, the user presses a full text store specify button 1805 in the case of storing the entire structured document containing the important item, or a tag store specify button 1806 in the case of storing only tags which are the important items. Finally, the user presses an input content decide button 1807 so as to decide on the input content and specify the extraction of the important item to the document important item extraction device 110.

Next, with reference to FIG. 16 and FIG. 17, an exemplary operation for adding the note section 1603 of the structured document to the existing important items will be described.

Figure 16:
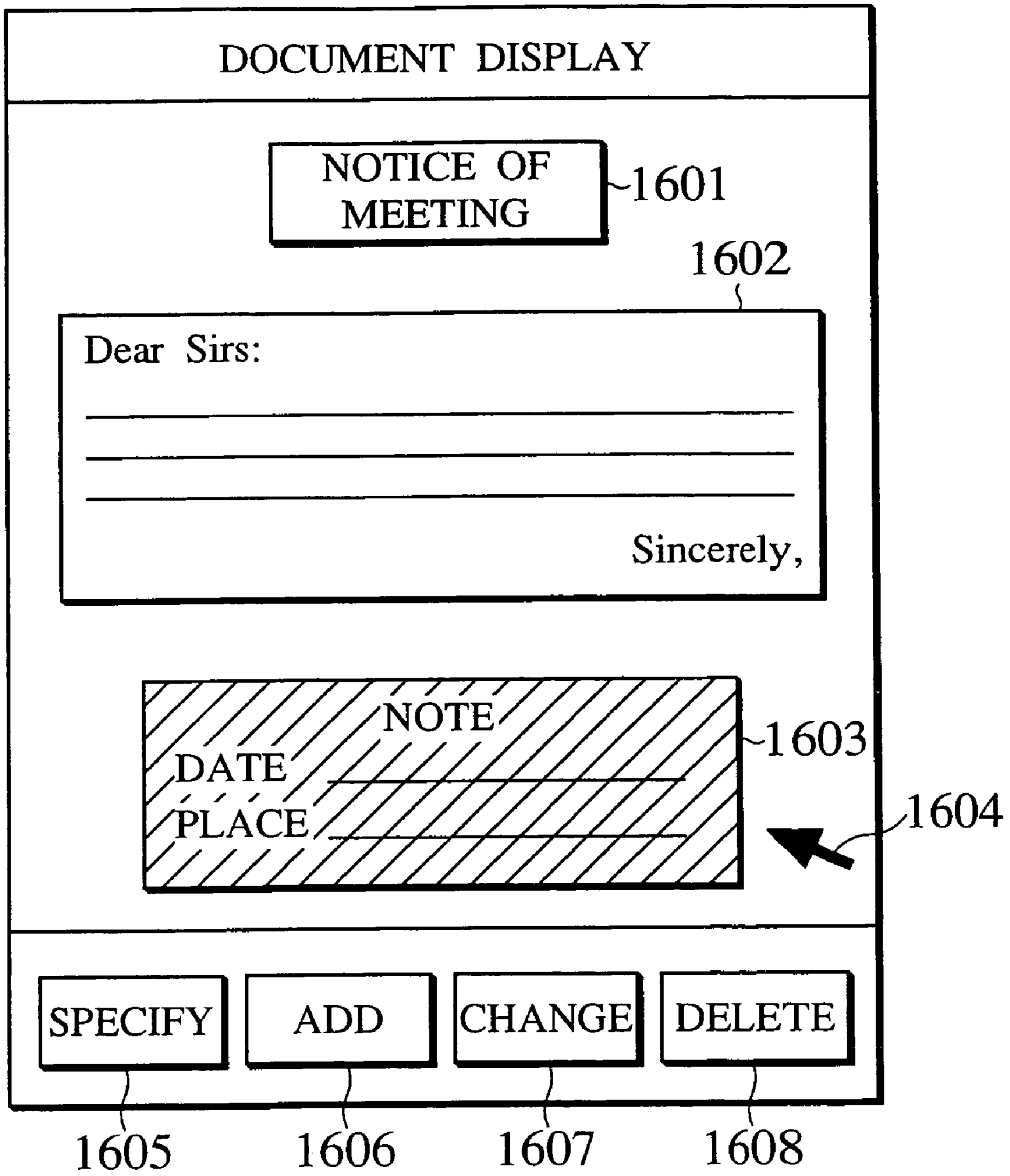
FIG. 16 is a diagram showing an exemplary display of a structured document in another state in the first embodiment of the present invention.

Starting from a display state of FIG. 15, the user specifies a region of the note section 1603 of the structured document by using the mouse pointer 1604 which is the position specifying device as shown in FIG. 16, for example, and presses an important item add button 1606.

When the region is specified and the important item add button 1606 is pressed, the WWW page browser 113 displays an important item adding screen as shown in FIG. 17, and sets up the extraction name input portion 1802 by searching a tag of the portion at the region specified by user from the structured document. The user then enters the important item name into an important item name input portion 1801. Similarly, the user presses the tag extraction specify button 1803 in the case of using a tag name as the extraction method, or the word extraction specify button 1804 in the case of using a word as the extraction method. Also, the user presses the full text store specify button 1805 in the case of storing the entire structured document containing the important item, or the tag store specify button 1806 in the case of storing only tags which are the important items. Finally, the user presses the input content decide button 1807 so as to decide on the input content and specify the addition of the important item to the document important item extraction device 110.

Next, with reference to FIG. 16 and FIG. 17, an exemplary operation for changing the important item when the note section 1603 of the structured document is the existing important item will be described.

Starting from a display state of FIG. 15, the user specifies a region of the note section 1603 of the structured document by using the mouse pointer 1604 which is the position specifying device as shown in FIG. 16, for example, and presses an important item change button 1607.

When the region is specified and the important item change button 1607 is pressed, the WWW page browser 113 displays an important item changing screen as shown in FIG. 17, and sets up the corresponding important item name into the important item name input portion 1801, and sets up the extraction name into the extraction name input portion 1802 similarly. Also, the user presses the tag extraction specify button 1803 in the case of using a tag name as the extraction method, or the word extraction specify button 1804 in the case of using a word as the extraction method. Also, the user presses the full text store specify button 1805 in the case of storing the entire structured document containing the important item, or the tag store specify button 1806 in the case of storing only tags which are the important items.

The user then changes the setting content of that important item, presses the input content decide button 1807 so as to decide on the input content and specify the change of the important item extraction method to the document important item extraction device 110.

Next, with reference to FIG. 16 and FIG. 17, an exemplary operation for deleting the important item when the note section 1603 of the structured document is the existing important item will be described.

Starting from a display state of FIG. 15, the user specifies a region of the note section 1603 of the structured document by using the mouse pointer 1604 which is the position specifying device as shown in FIG. 16, for example, and presses an important item delete button 1608.

When the region is specified and the important item change button 1608 is pressed, the WWW page browser 113 displays an important item deleting screen as shown in FIG. 17, and sets up the corresponding important item name into the important item name input portion 1801, and sets up the extraction name into the extraction name input portion 1802 similarly. Also, the user presses the tag extraction specify button 1803 in the case of using a tag name as the extraction method, or the word extraction specify button 1804 in the case of using a word as the extraction method. Also, the user presses the full text store specify button 1805 in the case of storing the entire structured document containing the important item, or the tag store specify button 1806 in the case of storing only tags which are the important items.

In the case of carrying out the deletion, after confirming the setting content of that important item, the user presses the input content decide button 1807 so as to specify the deletion of the important item to the document important item extraction device 110.

According to this first embodiment, when the document important item extraction device is used at a time of viewing the structured document that is delivered from the structured document delivery device such as WWW server, the document important item extraction device automatically extracts those items which are important for the user from the received structured document and store them in a memory device, on behalf of the user. The operation to extract and store the important items from the structured document is carried out automatically by the document important item extraction device, so that the user can be relieved from the tedious task of extracting and storing the important items from each received structured document by himself/herself, and it is possible to eliminate a situation where the extracting and storing operation is forgotten.

Also, when the document important item extraction device of this first embodiment is used at a time of viewing the structured document that is delivered from the structured document delivery device such as WWW server, the extracted important items can be checked at the data transmission reception device such as browser that is used by the user, so that it becomes possible to check if the extraction and storing of the important items has been carried out as intended by the user or not. Also, by using the important item extraction method setting application at the data transmission and reception device, it is possible to specify, add, change, or delete the important items to be extracted, so that it becomes possible for the user to automatically extract appropriate important items according to the need.

Second Embodiment

Referring now to FIG. 18 to FIG. 22, the second embodiment of the database construction scheme according to the present invention will be described in detail.

In the first embodiment described above, the basic function of the document important item extraction device, that is, the function for extracting and storing important items from structured documents, has been described. In this second embodiment, in addition to the function for storing the important items extracted from the structured documents, a function for newly generating attaching items related to the extracted important items and storing the extracted important items and the generated attaching items are stored either in correspondence to each other or as a set. As the attaching items related to the important items, various information can be generated. For instance, by generating and storing the data at which the important item is extracted from the structured document, it becomes possible to ascertain how fresh that information is later on.

Also, in this second embodiment, a retrieval function that can be provided in the document important item extraction device will be described. When the retrieval function is provided, it becomes possible for the user to efficiently search out the necessary information from the stored important items and attaching items. Note that the retrieval function will be described as the second embodiment here, but it is also possible to provide the retrieval function (for retrieving the important items) in the document important item extraction device of the first embodiment.

As described in the first embodiment, the document important item extraction device can be realized either by a data transmission and reception device (client 112 of FIG. 1) for transmitting and receiving structured documents, or by a data relay device (proxy server 107, receiver side e-mail server 108 and receiver side e-news server 109 of FIG. 1) for transmitting and receiving structured documents. Moreover, instead of the latter, it is also possible to provide the document important item extraction device as an independent device external to the data relay device and carry out information exchanges between the data relay device and the document important item extraction device, and furthermore the document important item extraction device that is provided as an independent device external to the data relay device can be shared among a plurality of data relay devices.

Now, the document important item extraction device has the basic function of receiving structured documents delivered via a communication path from the structured document delivery device (WWW server 104, sender side e-mail server 105 and sender side e-news server 106 of FIG. 1), and automatically extracting important items from the received structured documents and storing them into a recording device.

Conditions to be satisfied by those items that are important for the user of the document important item extraction device among items contained in the structured documents are commanded to the document important item extraction device by the user. Once the command from the user is made, thereafter the document important item extraction device carries out the extraction of the important items from the structured documents and the storing into the recording device according to the command content.

A method for specifying the conditions to be satisfied by the important items in the structured documents to the document important item extraction device can be any of the following, for example:

(1) a method for specifying "a tag name" used in the structured document;

(2) a method for specifying "a tag attribute name" used in the structured document;

(3) a method for specifying "a tag attribute value" used in the structured document;

(4) a method for specifying "a keyword contained in text other than tags" used in the structured document; and (5) a method which is a combination of a part or whole of the above (1) to (4).

An information summarizing the conditions to be satisfied by those items that are important to the user among items contained in the structured document is stored in the memory device within the document important item extraction device in a table form, and this table can be referred by reading it out from the memory device whenever necessary. Hereafter this table will be referred to as "structured document important item condition table".

In the case where the important item in the structured document is specified by a tag name as in the above method (1), the document important item extraction device extracts the item that has the specified tag name from the structured document and stores it in the recording device.

In the case where the important item in the structured document is specified by a tag attribute name as in the above method (2), the document important item extraction device extracts the item that has the specified tag attribute name from the structured document and stores it in the recording device.

In the case where the important item in the structured document is specified by a tag attribute value as in the above method (3), the document important item extraction device extracts the item that has the specified tag attribute value from the structured document and stores it in the recording device.

In the case where the important item in the structured document is specified by a keyword contained in text other than tags as in the above method (4), the document important item extraction device extracts the item that contains the specified keyword from the structured document and stores it in the recording device.

Now, the document important item extraction device having the function for generating and storing attaching items receives the structured document delivered via a communication path from the structured document delivery device, automatically extracts the important items from the received structured document, automatically generates attaching items related to the extracted important items, and stores both of them either in correspondence to each other or in set.

Conditions to be satisfied by attaching items to be generated are commanded to the document important item extraction device by the user (using an attaching item command function). Once the command from the user is made, thereafter the document important item extraction device carries out the generation of attaching items from the structured document and storing into the recording device according to the command content.

A method for specifying the attaching item related to the extracted important item in the structured document from the user to the document important item extraction device can be any of the following, for example:

(1) a method for specifying the attaching item as "date and time at which the important item is extracted";

(2) a method for specifying the attaching item as "a location at which the structured document exists";

(3) a method for specifying the attaching item as "locations at which items other than the extracted important items exist"; and (4) a method which is a combination of a part or whole of the above (1) to (3).

An information summarizing the conditions to be satisfied by the attaching items related to the important items in the structured document is stored in the memory device within the document important item extraction device in a table form, and this table can be referred by reading it out from the memory device whenever necessary. Hereafter this table will be referred to as "structured document important item related attaching item condition table".

In the case where the attaching item related to the important item in the structured document is specified as date and time at which the structured document is extracted as in the above method (1), the document important item extraction device generates the date and time as data in a format of an item to be stored in the recording device, that is, in a data format using a tag, and store that data into the recording device.

In the case where the attaching item related to the important item in the structured document is specified as a location at which the structured document exists as in the above method (2), the document important item extraction device checks which structured document of which structured document delivery device is the target structured document, generates data in a format of an item to be stored in the recording device, that is, in a data format using a tag, and store that data into the recording device.

In the case where the attaching item related to the important item in the structured document is specified as locations at which items other than the extracted important items exist as in the above method (3), the document important item extraction device checks which items of which structured document of which structured document delivery device are the target structured document items, generates data in a format of an item to be stored in the recording device, that is, in a data format using a tag, and store that data into the recording device.

Now, the document important item extraction device having the retrieval function is capable of carrying out the retrieval of the important items stored in the recording device (in the case of not having the function for generating and storing the attaching items) or the retrieval of the important items and the attaching items (in the case of having the function for generating and storing the attaching items).

When the user specifies conditions to be satisfied by the important items to be retrieved to the document important item extraction device, the document important item extraction device retrieves those important items which match the retrieval conditions from all the important items already stored in the recording device. If the matching important item is found, that important item is displayed, whereas if the matching important item is not found, the fact that it is not found is displayed.

The items stored in the recording device of the document important item extraction device include the following two types.

(1) The important items extracted from the received structured documents.

(2) The attaching items related to the extracted important items.

The retrieval target items include both of the above two types of items.

A method for specifying an item to be retrieved from the user to the document important item extraction device can be any of the following:

(1) a method for specifying an item by "a tag name";

(2) a method for specifying an item by "a tag attribute name";

(3) a method for specifying an item by "a tag attribute value";

(4) a method for specifying an item by "a keyword contained in text other than tags"; and (5) a method which is a combination of a part or whole of the above (1) to (4).

In the case where the desired retrieval target item of the user is specified by a tag name as in the above method (1), the item that has the specified tag name among the items stored in the recording device is searched and read out.

In the case where the desired retrieval target item of the user is specified by a tag attribute name as in the above method (2), the item that has the specified tag attribute name among the items stored in the recording 25, device is searched and read out.

In the case where the desired retrieval target item of the user is specified by a tag attribute value as in the above method (3), the item that has the specified tag attribute value among the items stored in the recording device is searched and read out.

In the case where the desired retrieval target item of the user is specified by a keyword contained in text other than tags as in the above method (4), the item that contains the specified keyword among the items stored in the recording device is searched and read out.

Next, the data format used at a time of storing the important items and the attaching items into the recording device will be described.

Figure 18:
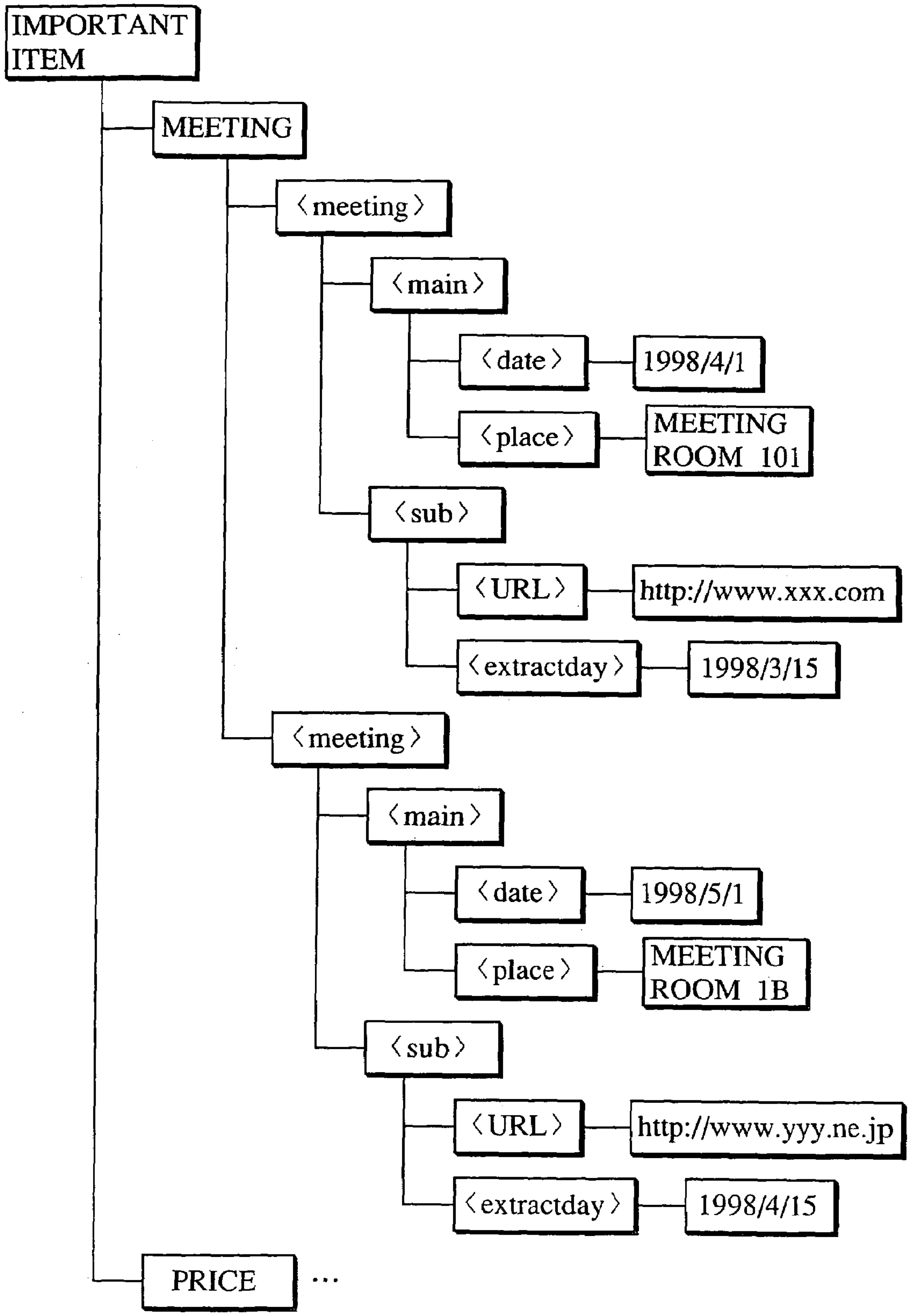
FIG. 18 is a diagram showing an exemplary important item and attaching item database according to the second embodiment of the present invention.

FIG. 18 shows an exemplary important item and attaching item database which stores the important items and the attaching items.

In this example, the meeting date enclosed by the <date> tags and the meeting place enclosed by <place> tags are extracted from the structured document as the important items. Also, a URL indicating a location where this structured document was originally located and a date on which the important items are extracted are generated as the attaching items related to the extracted important items, and respectively enclosed by <URL> tags and <extractday> tags. The extracted important items are enclosed by <main> tags, while the generated attaching items are enclosed by <sub> tags so that they constitute a single structured document as a whole.

At a time of carrying out the retrieval, any of the following three retrieval methods can be used appropriately.

(1) A retrieval of the extracted important items only.

(2) A retrieval of the generated attaching items only.

(3) A retrieval without distinguishing the extracted important items and the generated attaching items.

Figure 19:
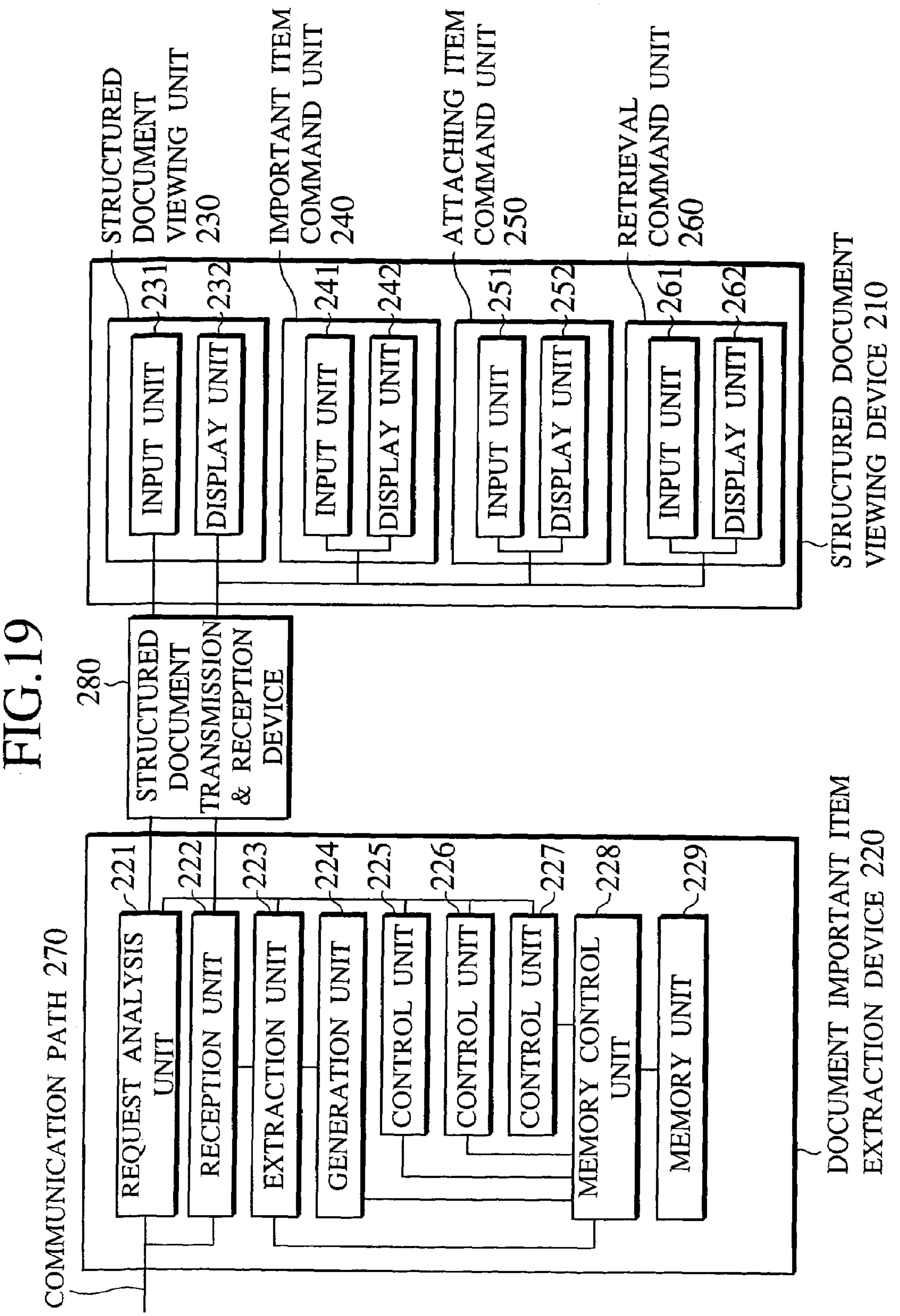
FIG. 19 is a block diagram of an exemplary configuration of a structured document storage and retrieval system according to the second embodiment of the present invention.

In the following, the configuration and the operation of the document important item extraction device of this second embodiment will be described in further detail. FIG. 19 shows an exemplary configuration of the structured document storage and retrieval system containing the document important item extraction device of this second embodiment which has the function for extracting and storing the important items, the function for generating and storing the attaching items, and the retrieval function. In this exemplary configuration, the document important item extraction device is realized as the data relay device.

As shown in FIG. 19, this structured document storage and retrieval system comprises a document important item extraction device 220, a structured document viewing device 210, a communication path 270, and a structured document transmission and reception device 280.

The document important item extraction device 220 further comprises a structured document viewing device request analysis unit 221, a structured document reception unit 222, a structured document important item extraction unit 223, a structured document important item related attaching item generation unit 224, a structured document important item command control unit 225, a structured document important item related attaching item command control unit 226, a retrieval command control unit 227, a memory control unit 228, and a memory unit 229.

[Structured Document Viewing Device 210]

The structured document viewing device 210 comprises a structured document viewing unit 230, an important item command unit 240, an attaching item command unit 250, and a retrieval command unit 260. The structured document viewing unit 230 has a structured document request input unit 231 and a structured document display unit 232. The important item command unit 240 has an important item command input unit 241 and an important item command execution result display unit 242. The attaching item command unit 250 has an attaching item command input unit 251 and an attaching item command execution result display unit 252. The retrieval command unit 260 has a retrieval command input unit 261 and a retrieval result display unit 262.

<Structured Document Viewing Unit 230>

The structured document viewing unit 230 receives a structured document viewing request from the user and transmits a structured document delivery request to the structured document transmission and reception device 280, or receives and displays the structured document transmitted from the structured document transmission and reception device 280.

The structured document request input unit 231 is a unit where the user enters the structured document viewing request. A method by which the user makes the structured document viewing request can be a method for specifying a URL.

The structured document display unit 232 is a unit for displaying the structured document transmitted from the structured document transmission and reception device 280 to the structured document viewing unit 230.

<Important Item Command Unit 240>

The important item command unit 240 is a unit for specifying conditions to be satisfied by items that are important to the user of the document important item extraction device 220 among the items contained in the structured document received by the document important item extraction device 220, from the user to the document important item extraction device 220.

The user enters conditions to be satisfied by items that are important to the user among the items contained in the structured document received by the document important item extraction device 220, at the important item command input unit 241.

The important item command execution result display unit 242 displays data transmitted from the structured document transmission and reception device 280 to the important item command unit 240.

<Attaching Item Command Unit 250>

The attaching item command unit 250 is a unit for specifying conditions to be satisfied by attaching items related to the important items extracted from the structured document by the document important item extraction device 220, from the user to the document important item extraction device 220.

The user enters conditions to be satisfied by attaching items related to the important items extracted from the structured document by the document important item extraction device 220, at the attaching item command input unit 251.

The attaching item command execution result display unit 252 displays data transmitted from the structured document transmission and reception device 280 to the attaching item command unit 250.

<Retrieval Command Unit 260>

The retrieval command unit 260 is a unit for specifying conditions to be satisfied by a desired retrieval target item of the user, from the user to the document important item extraction device 220.

The user enters conditions to be satisfied by the own desired retrieval target item among the items stored in the document important item extraction device 220, at the retrieval command input unit 261.

The retrieval result display unit 262 displays data transmitted from the structured document transmission and reception device 280 to the retrieval command unit 260.

The communication path 270 relays the structured document delivery request transmitted from the structured document viewing unit 230 with respect to the document important item extraction device 220, and transmits it to the structured document delivery device such as WWW server or e-mail server. The communication path 270 also relays the structured document transmitted from the structured document delivery device such as WWW server or e-mail server, and transmits it to the document important item extraction device 220.

[Structured Document Transmission and Reception Device 280]

The structured document transmission and reception device 280 is located in a middle of the document important item extraction device 220 and the structured document viewing device 210, and relates data transmitted and received between the document important item extraction device 220 and the structured document viewing device 210.

[Document Important Item Extraction Device 220]

The document important item extraction device 220 receives the structured document transmitted from the structured document delivery device such as WWW server or e-mail server and transfers the received structured document to the structured document viewing device 210 through the structured document transmission and reception device 280, while extracting the important items from the received structured document, generating the attaching items related to the extracted important items, and storing them in set into the memory unit 229. In the case where the structured document with the same document title has been received before, there is a need to check whether there is a need to carry out the extraction and the generation again or not.

Also, the document important item extraction device 220 carries out the addition, change, or deletion of the important items and the attaching items according to a method specified by the user using the important item command unit 240 and the attaching item command unit 250. In addition, when the user notifies the desired retrieval target item to the document important item extraction device 220 by using the retrieval command unit 260, the document important item extraction device 220 searches and reads out the item matching the user's request among the items stored in the memory unit 229, and transfers it to the retrieval command unit 260 through the structured document transmission and reception device 280.

<<Structured Document Viewing Device Request Analysis Unit 221>>

The structured document viewing device request analysis unit 221 receives a content transmitted from the structured document viewing unit 230 to the document important item extraction device 220 through the structured document transmission and reception device 280, analyzes the received content, and transfers it to appropriate place.

Specifically, the content transmitted from the structured document viewing unit 230 to the document important item extraction device 220 can be any of the following four.

(1) A structured document delivery request transmitted from the structured document viewing unit 230.

(2) An important item command transmitted from the important item command unit 240.

(3) An attaching item command transmitted from the attaching item command unit 250.

(4) A retrieval command transmitted from the retrieval command unit 260.

In the case where the content transmitted from the structured document viewing unit 230 to the document important item extraction device 220 is the structured document delivery request transmitted from the structured document viewing unit 230, the structured document delivery device on which the requested structured document is located is analyzed, and the structured document delivery request is transmitted via the communication path 270, either to the structured document delivery device such as WWW server or e-mail server on which the requested structured document exists, or to the structured document transmission and reception device located between the structured document delivery device on which the requested structured document exists and the document important item extraction device 220.

In the case where the content transmitted from the structured document viewing unit 230 to the document important item extraction device 220 is the important item command transmitted from the important item command unit 240, it is transferred to the structured document important item command control unit 225.

In the case where the content transmitted from the structured document viewing unit 230 to the document important item extraction device 220 is the attaching item command transmitted from the attaching item command unit 250, it is transferred to the structured document important item related attaching item command control unit 226.

In the case where the content transmitted from the structured document viewing unit 230 to the document important item extraction device 220 is the retrieval command transmitted from the retrieval command unit 260, it is transferred to the retrieval command control unit 227.

<<Structured Document Reception unit 222>>

The structured document reception unit 222 receives the structured document transmitted from the structured document delivery device such as WWW server or e-mail server to the document important item extraction device 220 via the communication path 270, and makes two copies of the received structured document. One of the copied structured document is transferred to the structured document viewing device 210 through the structured document transmission and reception device 280, while the other one of the copied structured document is transferred to the structured document important item extraction unit 223.

<<Structured Document Important Item Extraction Unit 223>>

The structured document important item extraction unit 223 receives the structured document transmitted from the structured document reception unit 222, and carries out the extraction of the important items from the structured document according to the content of the structured document important item condition table.

In the case where the received structured document has the same document title as the previously received structured document, whether there is a need to carry out the extraction of the important items again or not is checked. When it is judged that there is a need to carry out the extraction of the important items again as a result of this check, the structured document important item extraction unit 223 extracts all the items that are important to the user from the structured document according to the latest content of the structured document important item condition table.

When the extraction operation is finished, the structured document important item extraction unit 223 transmits the structured document in a state before the extraction is carried out and all the extracted important items to the structured document important item related attaching item generation unit 224.

<<Structured Document Important Item Related Attaching Item Generation Unit 224>>

The structured document important item related attaching item generation unit 224 receives the structured document and the important items extracted from the structured document which are transmitted from the structured document important item extraction unit 223, and carries out the generation of the attaching items according to the content of the structured document important item related attaching item condition table.

In the case where the received structured document has the same document title as the previously received structured document, whether there is a need to carry out the generation of the attaching items again or not is checked. When it is judged that there is a need to carry out the generation of the attaching items again as a result of this check, the structured document important item related attaching item generation unit 224 generates the attaching items related to the important items extracted by the structured document important item extraction unit 223 according to the latest content of the structured document important item related attaching item condition table.

When the generation operation is finished, the structured document important item related attaching item generation unit 224 transmits the structured document important items extracted by the structured document important item extraction unit 223 and the structured document important item related attaching items generated by the structured document important item related attaching item generation unit 224 together to the memory control unit 228, and commands the memory control unit 228 to store these extracted and generated items into the memory unit 229.

<<Structured Document Important Item Command Control Unit 225>>

The structured document important item command control unit 225 receives the command content transmitted from the structured document viewing device request analysis unit 221, and carries out the operation on the structured document important item condition table according to the received content.

<<Structured Document Important Item Related Attaching Item Command Control Unit 226>>

The structured document important item related attaching item command control unit 226 receives the command content transmitted from the structured document viewing device request analysis unit 221, and carries out the operation on the structured document important item related attaching item condition table according to the received content.

<<Retrieval Command Control Unit 227>>

The retrieval command control unit 227 receives the command content transmitted from the structured document viewing device request analysis unit 221, and analyzes the retrieval condition. The retrieval command control unit 227 then commands the memory control unit 228 to read out the item matching the retrieval condition from the memory unit 229, and transmits the information transmitted from the memory control unit 228 in response to the command, the retrieval command unit 260 through the structured document transmission and reception device 280.

<<Memory Control Unit 228>>

The memory control unit 228 receives a request for reading out and transferring data from the memory unit 229 or a request for writing data into the memory unit 229 which is transmitted from the structured document important item related attaching item generation unit 224, the structured document important item command control unit 225, the structured document important item related attaching item command control unit 226, or the retrieval command control unit 227, and executes that request.

<<Memory Unit 229>>

The memory unit 229 carries out the data storing. Specifically, data to be stored here include the following.

(1) The important items extracted from the structured documents.

(2) The attaching items related to the important items extracted from the structured documents.

(3) The structured document important item condition table.

(4) The structured document important item related attaching item condition table.

Figure 20:
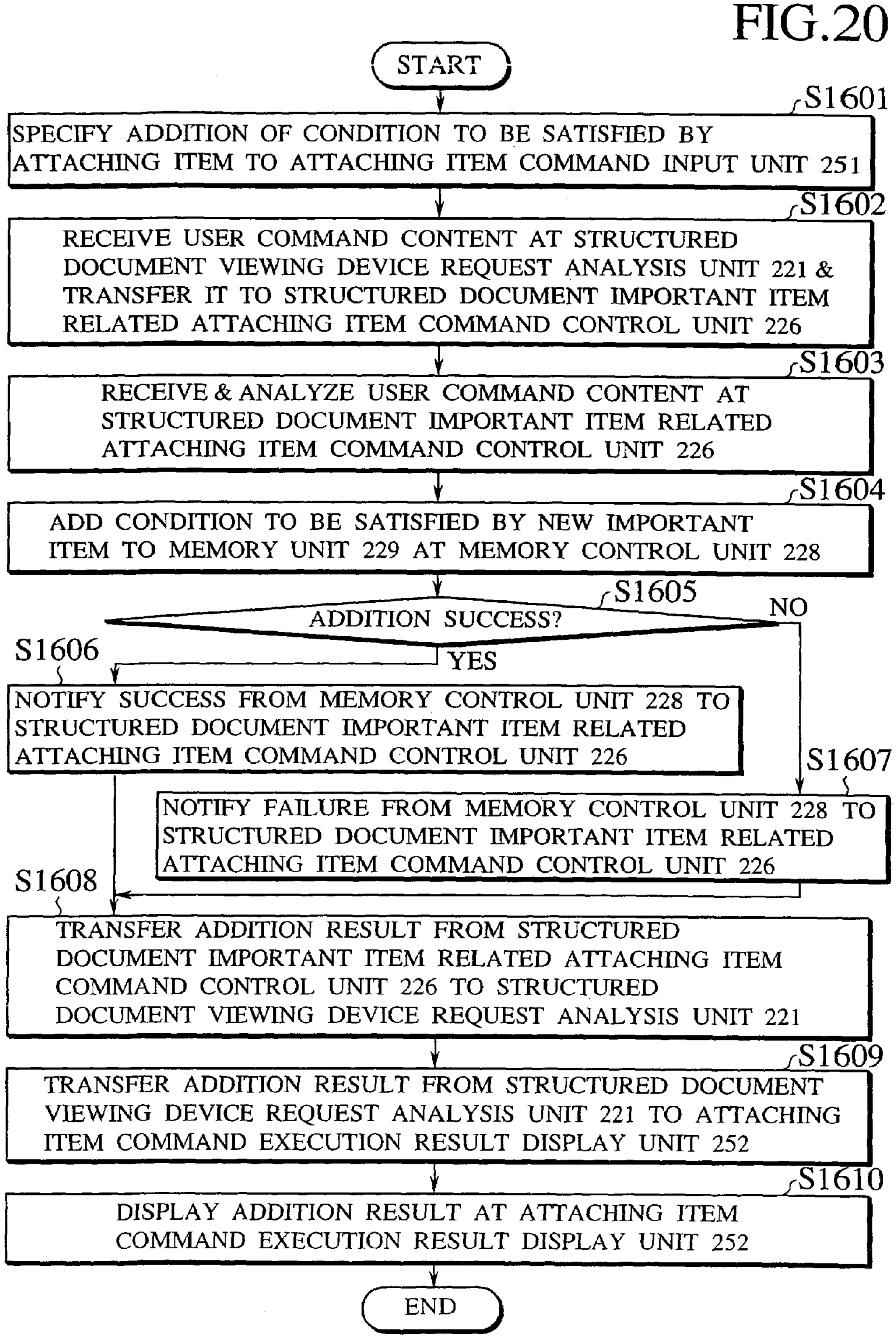
FIG. 20 is a flow chart for one exemplary operation of the structured document storage and retrieval system according to the second embodiment of the present invention.

Next, the operation to be carried out in the case where it is desired to add a condition to be satisfied by the attaching items related to the important items extracted from the structured document newly to the structured document important item related attaching item condition table will be described. FIG. 20 shows an exemplary procedure for this operation.

The user enters a condition to be satisfied by the attaching items related to the important items extracted from the structured document and the fact that it is desired to add this condition newly to the structured document important item related attaching item condition table, at the attaching item command input unit 251 of the attaching item command unit 250. The entered command content is transferred from the attaching item command unit 250 to the document important item extraction device 220 through the structured document transmission and reception device 280 (step S1601).

The structured document viewing device request analysis unit 221 of the document important item extraction device 220 receives the command content transmitted from the attaching item command unit 250. The structured document viewing device request analysis unit 221 then analyzes the received command content, and transfers it to the structured document important item related attaching item command control unit 226 (step S1602).

The structured document important item related attaching item command control unit 226 receives the command content transferred from the structured document viewing device request analysis unit 221, analyzes the command content, and learns that the command content is an addition of a new condition to the structured document important item related attaching item condition table (step S1603).

The attaching item command unit 250 then commands the addition of a new condition to the structured document important item related attaching item condition table, with respect to the memory control unit 228 (step S1604).

The memory control unit 228 carries out the addition of the new condition to the structured document important item related attaching item condition table. Then, an indication of a success/failure is transmitted to the structured document important item related attaching item command control unit 226 when the addition is successful/failure (steps S1605, S1606, S1607).

The structured document important item related attaching item command control unit 226 transfers the content received from the memory control unit 228 to the structured document viewing device request analysis unit 221 (step S1608).

The structured document viewing device request analysis unit 221 transmits the content received from the structured document important item related attaching item command control unit 226 to the attaching item command unit 250 through the structured document transmission and reception unit 280 (step S1609).

The attaching item command unit 250 receives the content transmitted from the structured document viewing device request analysis unit 221, and displays it at the attaching item command execution result display unit 252 (step S1610).

Here, the description of the change or the deletion of the condition in the structured document important item related attaching item condition table and the display of the structured document important item related attaching item condition table will be omitted.

Figure 21:
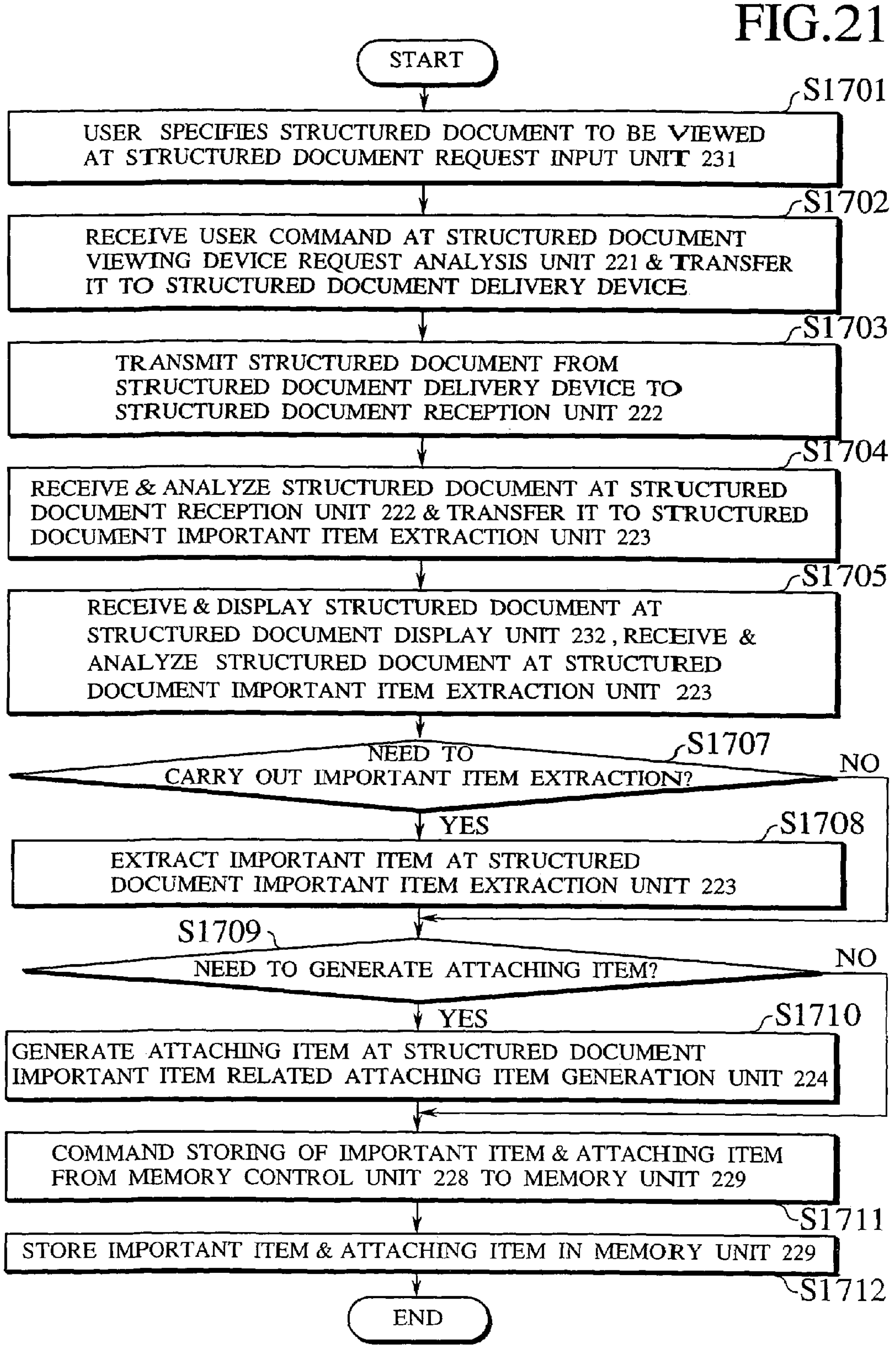
FIG. 21 is a flow chart for another exemplary operation of the structured document storage and retrieval system according to the second embodiment of the present invention.

Next, the operation carried out since the user issues the structured document viewing request until the important items and the attaching items are stored into the structured document important item device 220 will be described. FIG. 21 shows an exemplary procedure for this operation.

The user of the structured document viewing unit 230 enters a viewing request for a structured document that he/she wishes to view to the structured document request input unit 231. The structured document viewing unit 230 receives the user inputs, and transmit the structured document delivery request to the document important item extraction device 220 (step S1701).

The structured document viewing device request analysis unit 221 of the document important item extraction device 220 receives the structured document delivery request transmitted from the structured document viewing unit 230, analyzes the structured document delivery device on which the requested structured document exists, and transmits the structured document delivery request via the communication path 270, either to the structured document delivery device such as WWW server or e-mail server on which the requested structured document exists, or to the structured document transmission and reception device located between the structured document delivery device on which the requested structured document exists and the document important item extraction device 220 (step S1702).

The structured document delivery device that received the structured document delivery request then transmits the requested structured document to the document important item extraction device 220 via the communication path 270 (step 1703).

The structured document reception unit 222 of the document important item extraction device 220 receives the structured document transmitted from the structured document delivery device such as WWW server or e-mail server via the communication path 270 to the document important item extraction device 220, and makes copies of the received structured document. One copy of the structured document is transferred to the structured document viewing device 210 through the structured document transmission and reception device 280 while the other copy is transmitted to the structured document important item extraction unit 223 (step S1704).

The structured document viewing unit 230 receives the structured document transmitted from the document important item extraction device 220 through the structured document transmission and reception device 280, and displays it at the structured document display unit 232. Also, the structured document important item extraction unit 223 receives the structured document transmitted from the structured document reception unit 222 (step S1705).

Next, the latest structured document important item condition table is prepared in the structured document important item extraction unit 223, and whether there is a need to carry out the extraction of the important items from the received structured document or not is checked (step S1707).

When there is a need to carry out the extraction of the important items, all the important items are extracted from the structured document according to the latest content of the structured document important item condition table. When the extraction operation is finished, the structured document in a state before the extraction and all the extracted important items are transmitted to the structured document important item related attaching item generation unit 224 (step S1708).

The structured document important item related attaching item generation unit 224 receives the structured document and all the extracted important items which are transmitted from the structured document important item extraction unit 223. Then, the latest structured document important item related attaching item condition table is prepared in the structured document important item related attaching item generation unit 224, and whether there is a need to carry out the generation of the attaching items or not is checked (step S1709).

When there is a need to carry out the generation of the attaching items, all the attaching items related to the important items are generated according to the latest content of the structured document important item related attaching item condition table (step S1710).

When the generation operation is finished, the structured document important item related attaching item generation unit 224 transmits the structured document important items extracted by the structured document important item extraction unit 223 and the structured document important item related attaching items generated by the structured document important item related attaching item generation unit 224 together, to the memory control unit 228, and command the storing of these items into the memory unit 229 with respect to the memory control unit 228 (step S1711).

The memory control unit 228 receives the structured document important items extracted by the structured document important item extraction unit 223 and the structured document important item related attaching items generated by the structured document important item related attaching item generation unit 224, and stores the received items into the memory unit 229 (step S1712).

Figure 22:
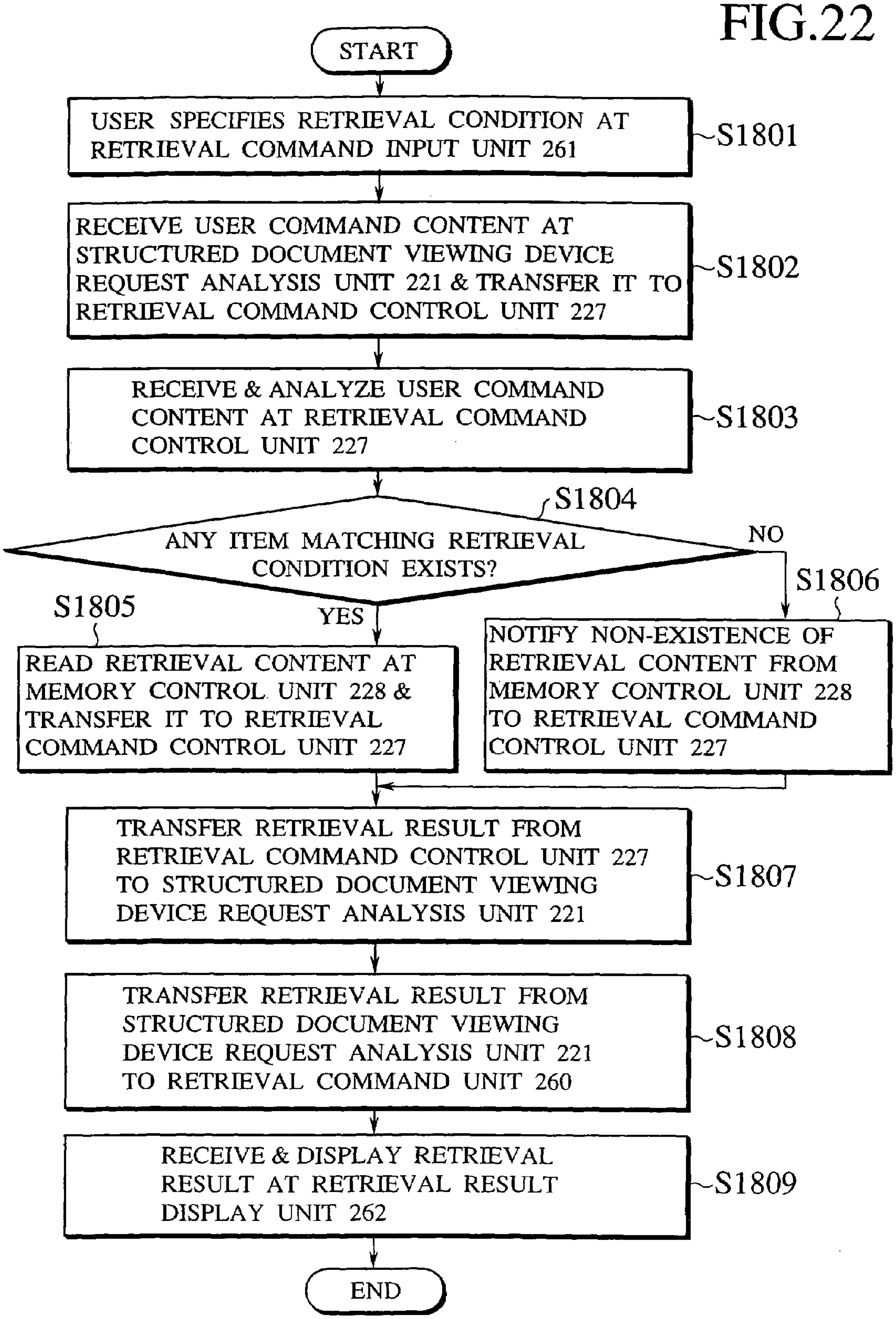
FIG. 22 is a flow chart for still another exemplary operation of the structured document storage and retrieval system according to the second embodiment of the present invention.

Next, the operation to be carried out in the case where the user wishes to retrieve the items stored in the document important item extraction device 220 will be described. FIG. 22 shows an exemplary procedure for this operation.

The user enters the conditions to be satisfied by the items he/she wishes to retrieve among the items stored in the document important item extraction device 220 into the retrieval command input unit 261 of the retrieval command unit 260. The retrieval command unit 260 transmits the content entered by the user to the document important item extraction device 220 through the structured document transmission and reception device 280 (step S1801).

The structured document viewing device request analysis unit 221 of the document important item extraction device 220 receives the command content transmitted from the retrieval command unit 260, analyzes the received command content, and transfers it to the retrieval command control unit 227 (step S1802).

The retrieval command control unit 227 receives the command content transferred from the structured document viewing device request analysis unit 221, and analyzes the received command content to obtain the retrieval condition (step S1803).

Then, the retrieval command control unit 227 judges whether any item matching the retrieval condition is stored or not (step S1804).

When the item matching the retrieval condition is stored, the reading of this item from the memory unit 229 is commanded to the memory control unit 228. The memory control unit 228 then reads out the item whose reading is commanded from the retrieval command control unit 227, from the memory unit 229 and transmits it to the retrieval command control unit 227 (step S1805).

When the item matching the retrieval condition does not exist, this fact is notified to the retrieval command control unit 227 (step S1806).

The retrieval command control unit 227 transfers the content received from the memory control unit 228 to the structured document viewing device request analysis unit 221 (step S1807).

The structured document viewing device request analysis unit 221 transmits the content received from the retrieval command control unit 227 to the retrieval command unit 260 through the structured document transmission and reception device 280 (step S1808).

The retrieval command unit 260 receives the transmitted content and displays it at the retrieval result display unit 262 (step S1809).

According to this second embodiment, when the document important item extraction device is used at a time of viewing the structured document that is delivered from the structured document delivery device such as WWW server, the document important item extraction device automatically extracts those items which are important for the user from the received structured document, generates the attaching items related to the extracted items (date and time at which the important items of the structured document are extracted, a location at which the structured document exists, locations at which items other than the important items of the structured document exist, etc.) and stores both of them as a set in a memory device, on behalf of the user. The operation to extract, generate and store these items is carried out automatically by the document important item extraction device, so that the user can be relieved from the tedious task of extracting and storing the important items from each received structured document by himself/herself, and it is possible to eliminate a situation where the extracting and storing operation is forgotten.

Also, by retrieving the important items of the structured document by the method described above at the document important item extraction device, it becomes possible to obtain the desired information from the important items of the structured document and the attaching items related to the important items of the structured document which are stored in advance. At a time of specifying items that are important for the user to the document important item extraction device, when the items that are important for the user cannot be extracted from the structured document because the items are specified inappropriately, if the location at which the structured document exists is maintained as the attaching item related to the important items of the structured document, it becomes possible to obtain the desired information by requesting the transfer of the entire structured document again to the structured document delivery device.

Third Embodiment

Referring now to FIG. 23 to FIG. 38, the third embodiment of the database construction scheme according to the present invention will be described in detail.

In this third embodiment, at a time of storing the important items extracted at the document important item extraction device, the important items are stored separately for the user who extracted these important items. In this way, it becomes easier to take out the important items at a time of reading or retrieving the important items set by the user later on.

Such a document important item extraction device will be described in the embodiments 3-1 and 3-2 described below. The embodiment 3-1 is directed to the case of realizing the document important item extraction device on a data transmission and reception device (a configuration in which it is operated on the client utilized by the user), and the embodiment 3-2 is directed to the case of realizing the document important item extraction device on the data relay device (a configuration in which it is independent from the client utilized by the user).

Also, in this third embodiment, in addition to storing the important items extracted by the document important items extraction device for each user separately, a function for adding and changing an access permission list corresponding to these important items is provided, In this way, the important items extracted and stored for a particular user can be shared among other users.

Such a document important item extraction device will be described in the embodiment 3-3 described below. The embodiment 3-3 is directed to the case where the document important item extraction device is realized on the data transmission and reception device.

Also, in this third embodiment, a function for enabling the sharing of common important items among users in the case where the identical important items are extracted from the identical structured document by a plurality of user requests. Such a document important item extraction device will be described in the embodiment 3-4. The embodiment 3-4 is directed to the case where the document important item extraction device is realized on the data relay device.

Embodiment 3-1

Figure 23:
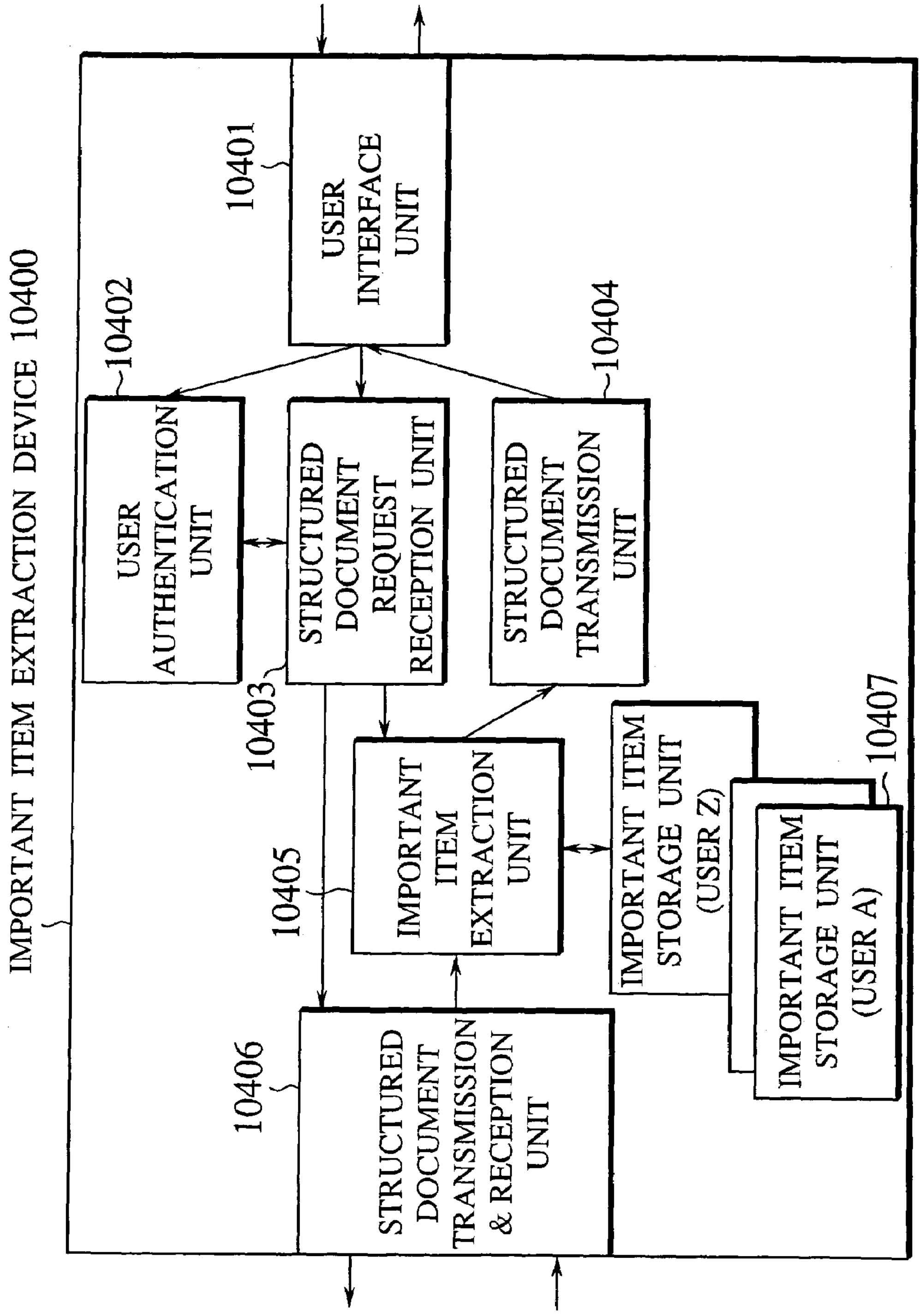
FIG. 23 is a block diagram showing an exemplary configuration of a document important item extraction device according to the embodiment 3-1 of the present invention.

FIG. 23 shows an exemplary configuration of a document important item extraction device 10400 according to this embodiment 3-1, which comprises a user interface unit 10401, a user authentication unit 10402, a structured document request reception unit 10403, a structured document transmission unit 10404, an important item extraction unit 10405, a structured document transmission and reception unit 10406, and an important item storage units 10407.

The user interface unit 10401 is a unit for providing interface with respect to the user, and has input devices such as keyboard and mouse and output devices such as display and speaker in order to enable information input/output with respect to the user.

The user authentication unit 10402 is a unit for authenticating the user who makes access to the document important item extraction device 10400. For the user authentication, the authentication scheme using a password can be utilized, for example. The information necessary for the authentication is given through the user interface unit 10401.

The structured document request reception unit 10403 is a unit which gives the request from the user to the structured document transmission and reception unit 10406 along with the user information, via the user interface unit 10401.

The structured document transmission and reception unit 10406 is a unit for requesting the necessary structured document to the external and receiving the corresponding structured document according to the user request given from the structured document request reception unit 10403.

The important item extraction unit 10405 is a unit which receives the received structured document and the user information of the user who requested that structured document from the structured document transmission and reception unit 10406, extracts the important items from the structured documents, and stores them in the important item storage units 10407, while sending the structured document to the structured document transmission unit 10404. Also, when there is a request for the important items from the structured document request reception unit 10403, the requested important items are sent from the important item storage units 10407 to the structured document transmission unit 10404.

For the extraction the important items, a method based on a keyword or a tag that is associated with the structured document, which is specified by the user in advance, can be used. For example, when a portion containing a tag that is specified by the user and a portion containing a keyword specified by the user exist, these portions will be extracted. Else, the entire structured document that contains these tag and keyword may be set as the extraction target. For the extracted information, not only the important items but also an information regarding date and time at which the structured document is created, date and time at which the structured document is received, and a location indicating a place from which the structured document is received, may be stored in addition in order to enable the subsequent retrieval.

The important item storage unit 10407 is a unit for storing the important items extracted for each user and their related information, and reading them out, according to the command of the important item extraction unit 10405. The important item storage unit 10407 is associated with a medium for recording these information. For a medium, any of magnetic disk, optical disk, magneto-optical disk, phase-change optical disk, CD-R, DVD-RAM, or magnetic tape can be used.

The structured document transmission unit 10404 is a unit for transmitting the structured document transmitted from the important item extraction unit 10405 to the user via the user interface unit 10401.

Figure 24:
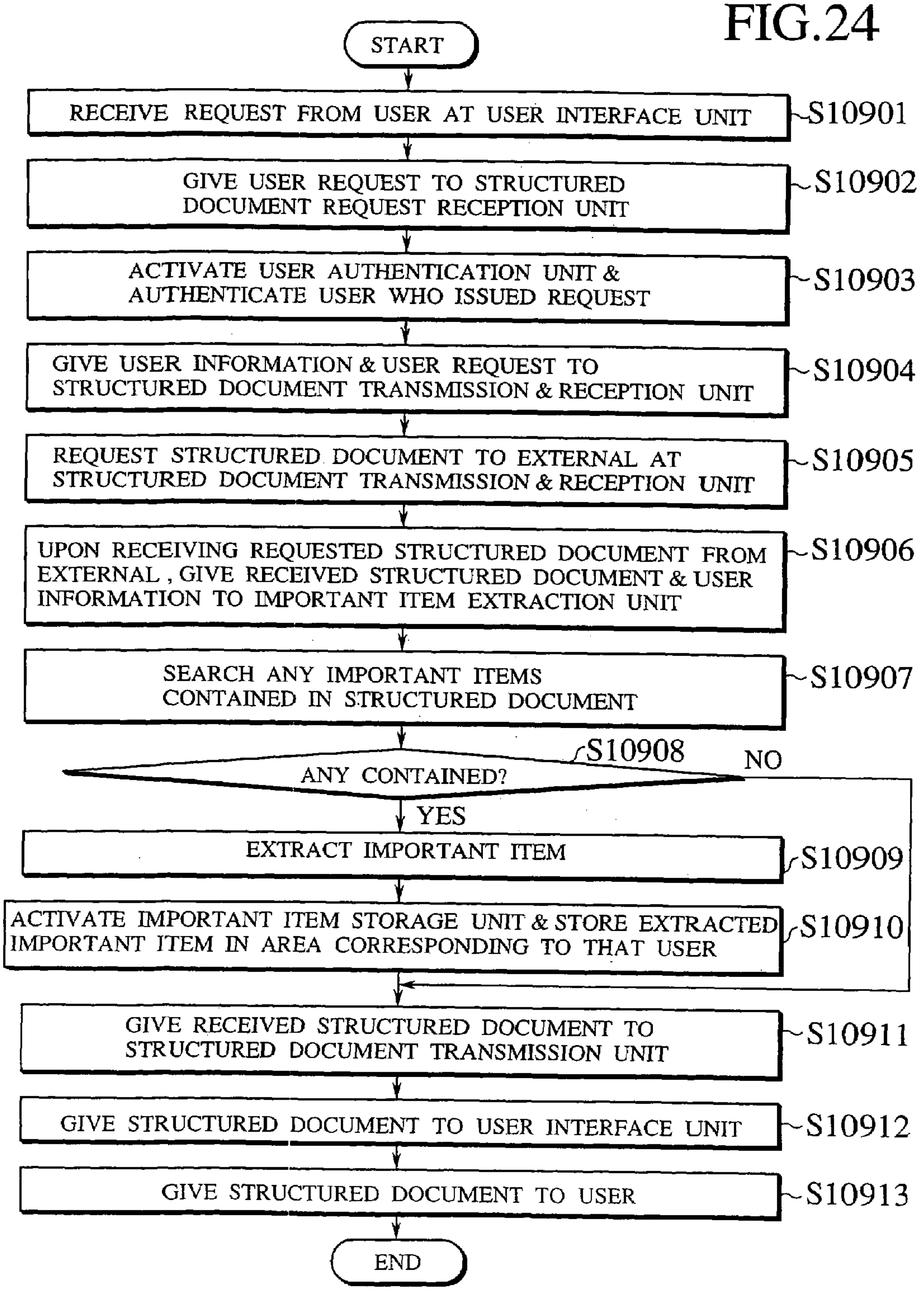
FIG. 24 is a flow chart for the operation of a document important item extraction device according to the embodiment 3-1 of the present invention.

Next, the operation of the document important item extraction device 10400 will be described. FIG. 24 shows an exemplary procedure for this operation of the document important item extraction device 10400.

The user interface unit 10401 receives the request from the user (step S10901). Then, the user interface unit 10401 gives the received request to the structured document request reception unit 10403 (step S10902).

The structured document request reception unit 10403 activates the user authentication unit 10402 and authenticates the user who issued the request by activating the user interface unit 10401 (step S10903). The structured document request reception unit 10403 gives the user information and the user request to the structured document transmission and reception unit 10406 (step S10904).

The structured document transmission and reception unit 10406 requests the structured document requested by the user with respect to the external (step S10905). Upon receiving the requested structured document from the external, the structured document transmission and reception unit 10406 gives the received structured document and the user information to the important item extraction unit 10405 (step S10906).

The important item extraction unit 10405 searches any important items contained in the received structured document (step S10907). If the important item is contained, the important item is extracted (step S10909), the important item storage unit 10407 is activated and the extracted important item is stored in area corresponding to that user (step S10910). If no important item is contained, nothing is done. The important item extraction unit 10405 gives the received structured document to the structured document transmission unit 10404 (step S10911).

The structured document transmission unit 10404 gives the received structured document to the user interface unit 10401 (step S10912), and the user interface unit 10401 gives the received structured document to the user (step S10913).

The document important item extraction device 10400 can be formed by a CPU, a memory device, and a communication device similarly as the computer, for example, and its functions can be realized by executing the programs describing the operations of the elements 10401 to 10407 that constitute the document important item extraction device 10400 on the CPU.

Also, each one or a part of the elements 10401 to 10407 that constitute the document important item extraction device 10400 can be formed by a CPU, a memory device and a communication device, and its functions can be realized by executing the programs describing its operations on the CPU, such that the document important item extraction device 10400 is constructed as a collection of these constituent elements.

As described, according to this embodiment 3-1, by specifying keywords or tags of the structured document that are considered important by the user in advance, it is possible for the document important item extraction device to extract the important items from the received structured document on behalf of the user, so that time and effort required for the user can be reduced considerably.

Embodiment 3-2

Figure 25:
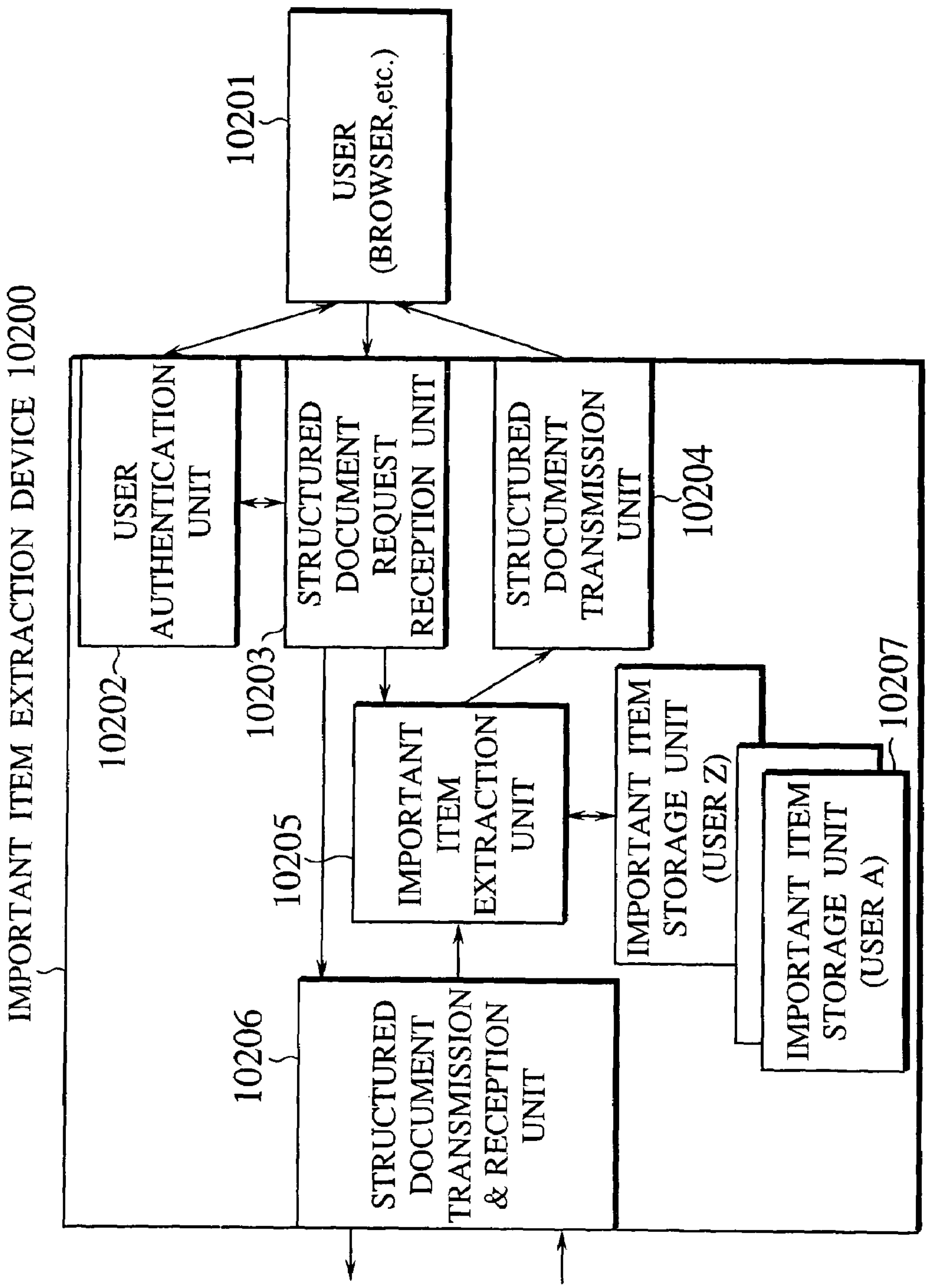
FIG. 25 is a block diagram showing an exemplary configuration of a document important item extraction device according to the embodiment 3-2 of the present invention.

FIG. 25 shows an exemplary configuration of a document important item extraction device 10200 according to this embodiment 3-2, which comprises a user authentication unit 10202, a structured document request reception unit 10203, a structured document transmission unit 10204, an important item extraction unit 10205, a structured document transmission and reception unit 10206, and an important item storage units 10207.

The user authentication unit 10202 is a unit for authenticating the user 10201 who makes access to the document important item extraction device 10200 by using a browser or the like. For the user authentication, the authentication scheme using a password can be utilized, for example.

The structured document request reception unit 10203 is a unit which gives the request from the user 10201 to the structured document transmission and reception unit 10206 along with the user information.

The structured document transmission and reception unit 10206 is a unit for requesting the necessary structured document to the external and receiving the corresponding structured document according to the request of the user 10201 given from the structured document request reception unit 10203.

The important item extraction unit 10205 is a unit which receives the received structured document and the user information of the user who requested that structured document from the structured document transmission and reception unit 10206, extracts the important items from the structured documents, and stores them in the important item storage units 10207, while sending the structured document to the structured document transmission unit 10204. Also, when there is a request for the important items from the structured document request reception unit 10203, the requested important items are sent from the important item storage units 10207 to the structured document transmission unit 10204.

For the extraction the important items, a method based on a keyword or a tag that is associated with the structured document, which is specified by the user 10201 in advance, can be used. For example, when a portion containing a tag that is specified by the user 10201 and a portion containing a keyword specified by the user exist, these portions will be extracted. Else, the entire structured document that contains these tag and keyword may be set as the extraction target. For the extracted information, not only the important items but also an information regarding date and time at which the structured document is created, date and time at which the structured document is received, and a location indicating a place from which the structured document is received, may be stored in addition in order to enable the subsequent retrieval.

The important item storage unit 10207 is a unit for storing the important items extracted for each user and their related information, and reading them out, according to the command of the important item extraction unit 10205. The important item storage unit 10207 is associated with a medium for recording these information. For a medium, any of magnetic disk, optical disk, magneto-optical disk, phase-change optical disk, CD-R, DVD-RAM, or magnetic tape can be used.

The structured document transmission unit 10204 is a unit for transmitting the structured document transmitted from the important item extraction unit 10205 to the user 10201.

Figure 26:
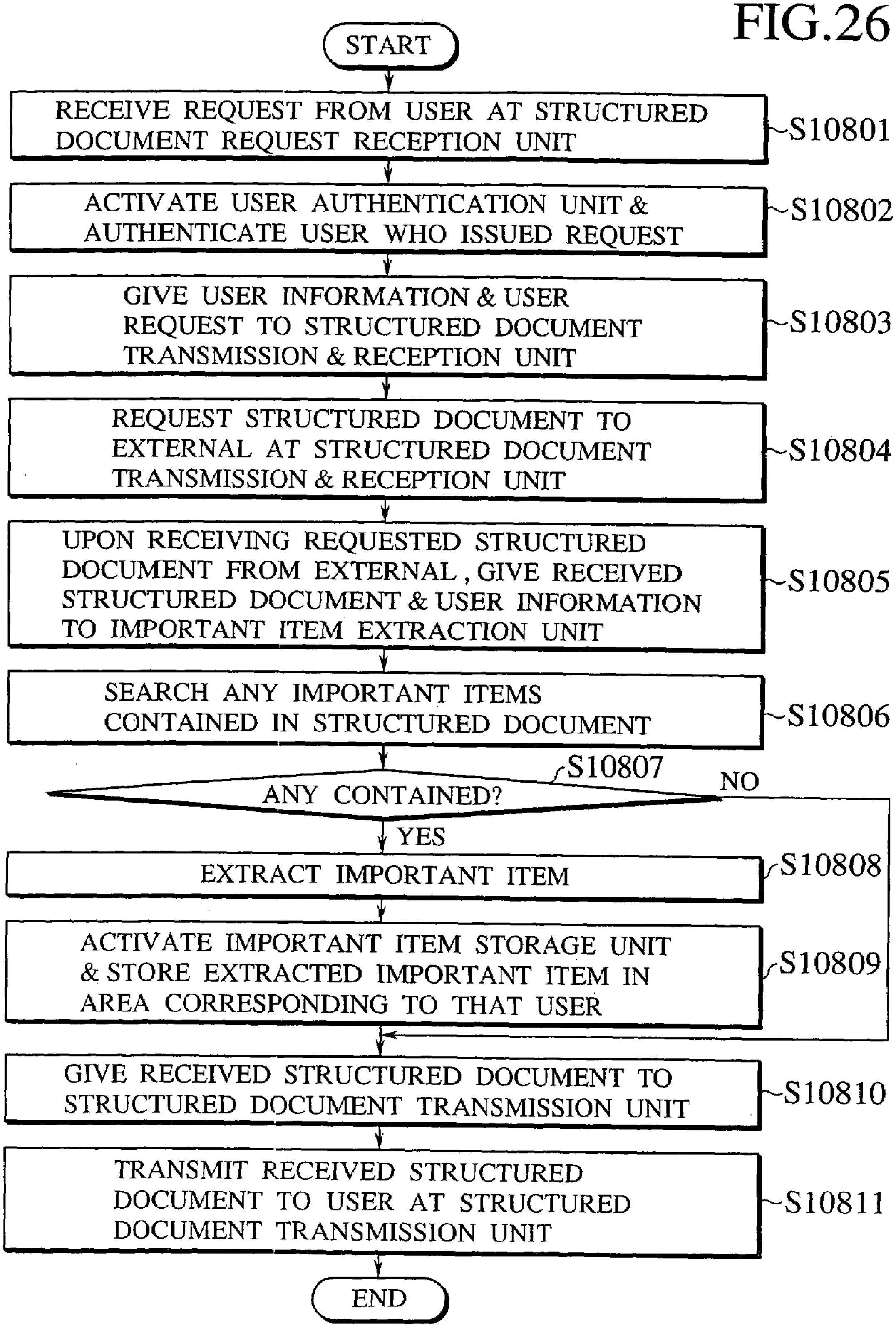
FIG. 26 is a flow chart for the operation of a document important item extraction device according to the embodiment 3-2 of the present invention.

Next, the operation of the document important item extraction device 10200 will be described. FIG. 26 shows an exemplary procedure for this operation of the document important item extraction device 10200.

The structured document request reception unit 10203 receives the request from the user 10201 (step S10801). Upon receiving the request, the structured document request reception unit 10203 activates the user authentication unit 10202 and authenticates the user 10201 who issued the request (step S10802). The structured document request reception unit 10203 gives the user information and the user request of the authenticated user 10201 to the structured document transmission and reception unit 10206 (step S10803).

The structured document transmission and reception unit 10206 requests the structured document requested by the user 10201 with respect to the external (step S10804). Upon receiving the requested structured document from the external, the structured document transmission and reception unit 10206 gives the received structured document and the user information to the important item extraction unit 10205 (step S10805).

The important item extraction unit 10205 searches any important items contained in the received structured document (step S10806). If the important item is contained, the important item is extracted (step S10808), the important item storage unit 10207 is activated and the extracted important item is stored in area corresponding to that user (step S10809). If no important item is contained, nothing is done. The important item extraction unit 10205 gives the received structured document to the structured document transmission unit 10204 (step S10810).

The structured document transmission unit 10204 gives the structured document given from the important item extraction unit 10205 to the user 10201 (step S10811).

The document important item extraction device 10200 can be formed by a CPU, a memory device, and a communication device similarly as the computer, for example, and its functions can be realized by executing the programs describing the operations of the elements 10201 to 10207 that constitute the document important item extraction device 10200 on the CPU.

Also, each one or a part of the elements 10201 to 10207 that constitute the document important item extraction device 10200 can be formed by a CPU, a memory device and a communication device, and its functions can be realized by executing the programs describing its operations on the CPU, such that the document important item extraction device 10200 is constructed as a collection of these constituent elements.

As described, according to this embodiment 3-2, by specifying keywords or tags of the structured document that are considered important by the user in advance, for each user who utilizes the document important item extraction device, it is possible for the document important item extraction device to extract the important items from the received structured document on behalf of the user, so that time and effort required for the user can be reduced considerably.

Embodiment 3-3

Figure 28:
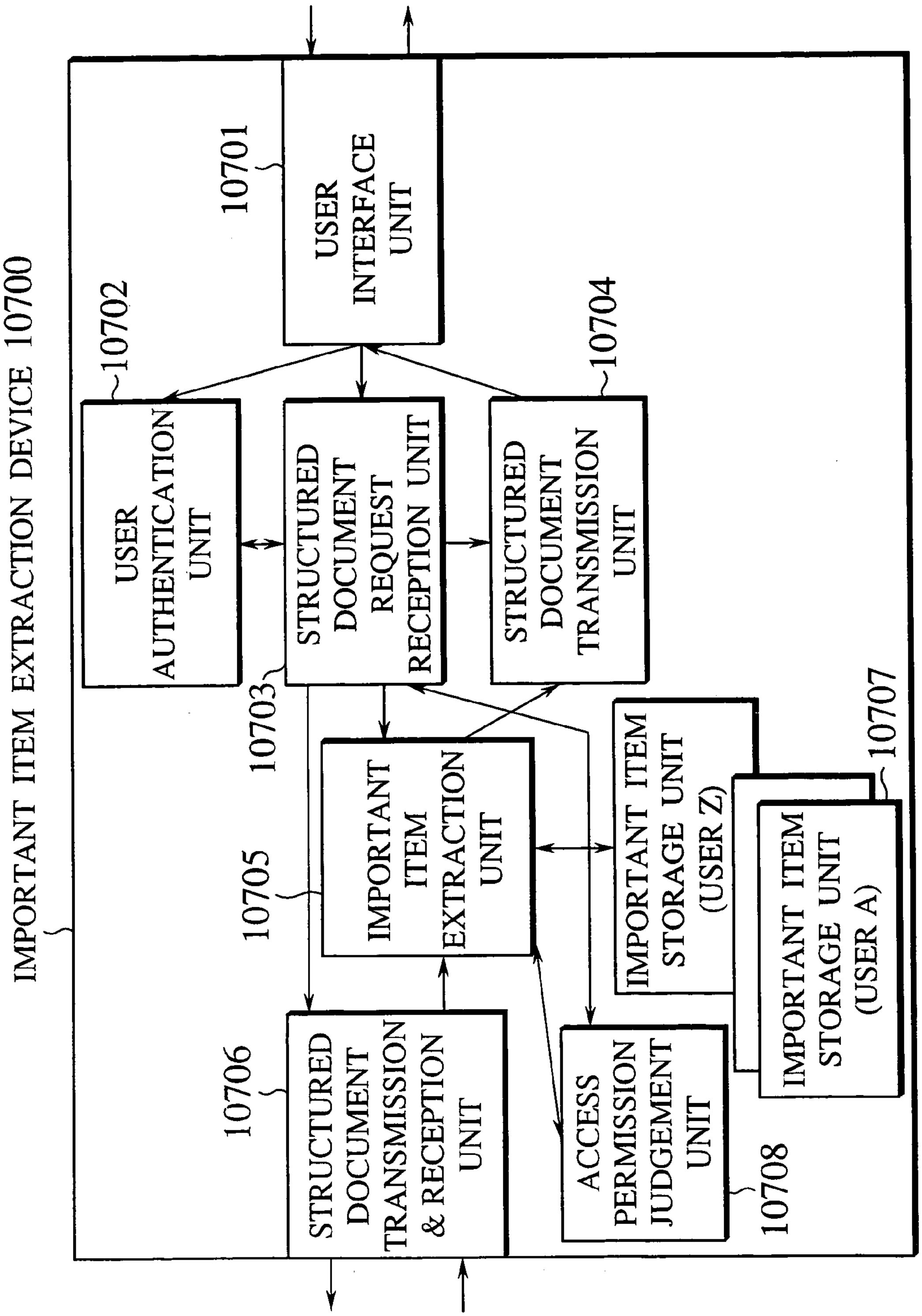
FIG. 28 is a block diagram showing an exemplary configuration of a document important item extraction device according to the embodiment 3-3 of the present invention.

FIG. 28 shows an exemplary configuration of a document important item extraction device 10700 according to this embodiment 3-3, which comprises a user interface unit 10701, a user authentication unit 10702, a structured document request reception unit 10703, a structured document transmission unit 10704, an important item extraction unit 10705, a structured document transmission and reception unit 10706, an important item storage units 10707, and an access permission judgement unit 10708.

The user interface unit 10701 is a unit for providing interface with respect to the user, and has input devices such as keyboard and mouse and output devices such as display and speaker in order to enable information input/output with respect to the user.

The user authentication unit 10702 is a unit for authenticating the user who makes access to the document important item extraction device 10700. For the user authentication, the authentication scheme using a password can be utilized, for example.

The structured document request reception unit 10703 is a unit which gives the request from the user to the structured document transmission and reception unit 10706 along with the user information. Also, when the user requests the addition, deletion, or change of the access permission information for the important item, this request is given to the access permission judgement unit 10708 along with the user information and the updating of the access permission information is carried out.

The structured document transmission and reception unit 10706 is a unit for requesting the necessary structured document to the external and receiving the corresponding structured document according to the user request given from the structured document request reception unit 10703.

The important item extraction unit 10705 is a unit which receives the received structured document and the user information of the user who requested that structured document from the structured document transmission and reception unit 10706, extracts the important items from the structured documents, and stores them in the important item storage units 10707, while sending the structured document to the structured document transmission unit 10704. Also, when there is a request for the important items from the structured document request reception unit 10703, the requested important items are sent from the important item storage units 16707 to the structured document transmission unit 10704.

For the extraction the important items, a method based on a keyword or a tag that is associated with the structured document, which is specified by the user in advance, can be used. For example, when a portion containing a tag that is specified by the user and a portion containing a keyword specified by the user exist, these portions will be extracted. Else, the entire structured document that contains these tag and keyword may be set as the extraction target. For the extracted information, not only the important items but also an information regarding date and time at which the structured document is created, date and time at which the structured document is received, and a location indicating a place from which the structured document is received, may be stored in addition in order to enable the subsequent retrieval.

The important item storage unit 10707 is a unit for storing the important items extracted for each user and their related information, and reading them out, according to the command of the important item extraction unit 10705. The important item storage unit 10707 is associated with a medium for recording these information. For a medium, any of magnetic disk, optical disk, magneto-optical disk, phase-change optical disk, CD-R, DVD-RAM, or magnetic tape can be used.

The structured document transmission unit 10704 is a unit for transmitting the structured document transmitted from the important item extraction unit 10705 to the user.

The access permission judgement unit 10708 is a unit for judging the access permission at a time of reading out the important item by the important item extraction unit 10705. When the reading request for some important item and the user information of the user who issued that reading request are given from the important item extraction unit 10705, the access permission judgement unit 10708 judges whether the reading is permitted or not according to the access permission list provided therein, and returns the judgement result to the important item extraction unit 10705.

Figure 27:
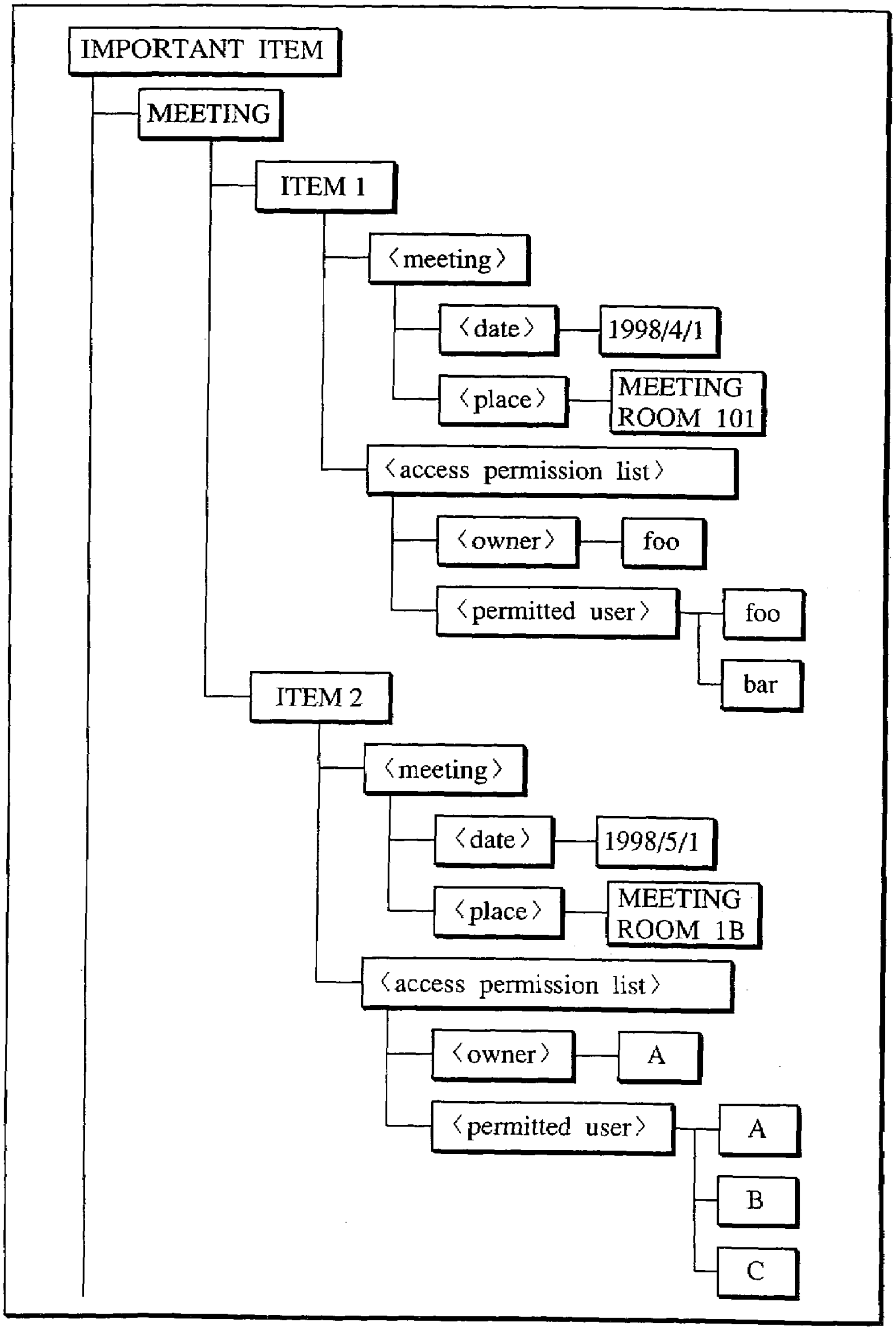
FIG. 27 is a diagram showing one exemplary format of extracted important items and access permission lists according to the present invention.

Here, the extracted important items and their corresponding access permission lists are stored as shown in FIG. 27, for example. This example is for the case of extracting the important item “meeting”. The keyword corresponding to this important item is “meeting”, so that the document important item extraction device 10700 checks whether this keyword is contained in the structured document or not, extracts the important item when this keyword is contained, and stores it in a form shown in FIG. 27. At this point, in addition to the important item, the access permission list regarding the extracted important item is also produced, and stored such that its correspondence to the extracted important item becomes apparent. In this example, in the important item 1 extracted for “meeting”, the owner of this important item is a user “foo”, and those who are permitted to access this important item are users “foo” and “bar”. Similarly, in the extracted important item 2, the owner is a user “A”, and those who are permitted to access this important item are users “A”, “B” and “C”.

Figure 29:
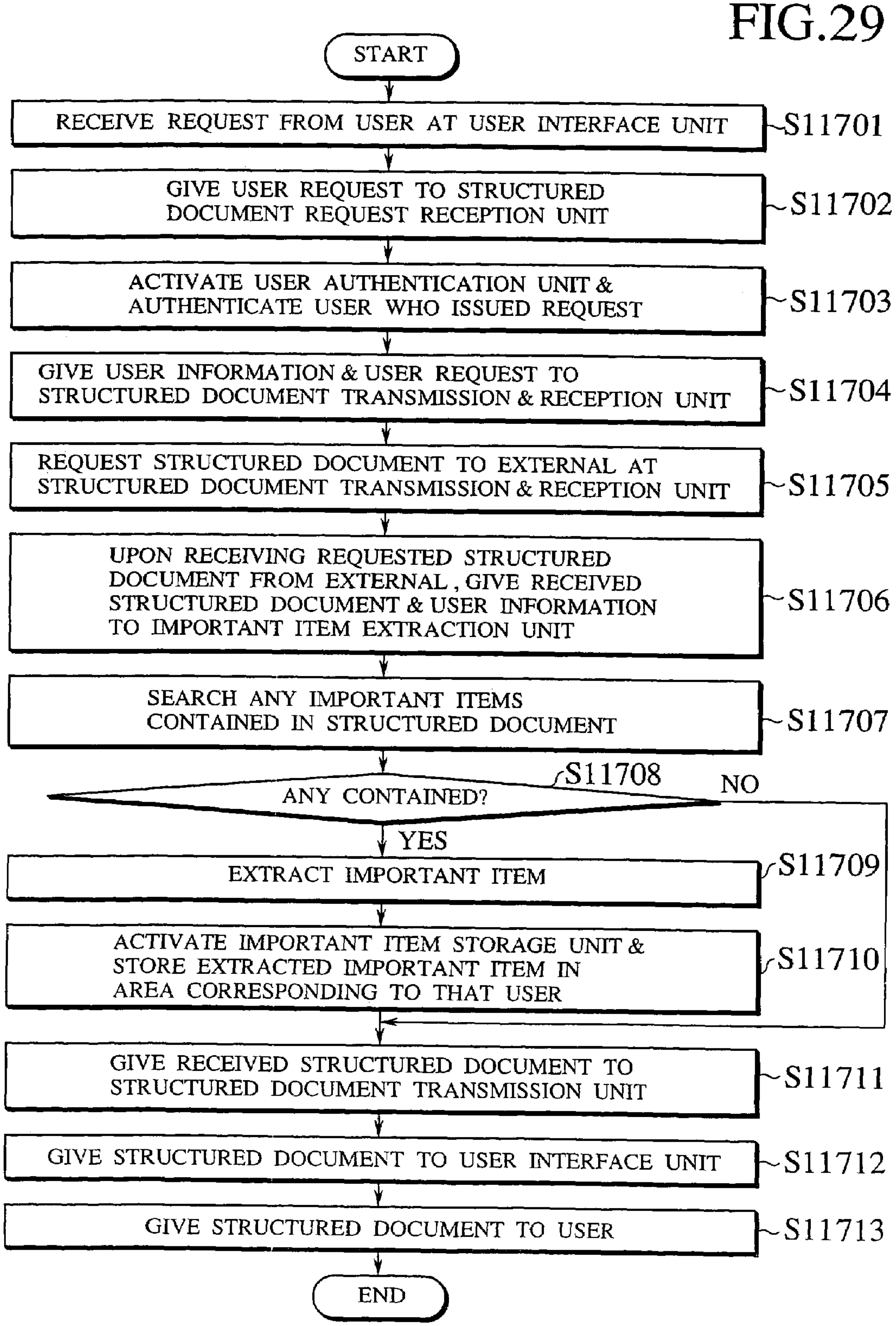
FIG. 29 is a flow chart for one exemplary operation of a document important item extraction device according to the embodiment 3-3 of the present invention.

Next, the operation of the document important item extraction device 10700 in the case where the user issued the request for the structured document with respect to the external will be described. FIG. 29 shows an exemplary procedure for this operation of the document important item extraction device 10700.

The user interface unit 10701 receives the request from the user (step S11701). Then, the user interface unit 10701 gives the received request to the structured document request reception unit 10703 (step S11702).

The structured document request reception unit 10703 activates the user authentication unit 10702 and authenticates the user who issued the request by activating the user interface unit 10701 (step S11703). The structured document request reception unit 10703 gives the user information and the user request to the structured document transmission and reception unit 10706 (step S11704).

The structured document transmission and reception unit 10706 requests the structured document requested by the user with respect to the external (step S11705). Upon receiving the requested structured document from the external, the structured document transmission and reception unit 10706 gives the received structured document and the user information to the important item extraction unit 10705 (step S11706).

The important item extraction unit 10705 searches any important items contained in the received structured document (step S11707). If the important item is contained, the important item is extracted (step S11709), the important item storage unit 10707 is activated and the extracted important item is stored in area corresponding to that user (step S11710). If no important item is contained, nothing is done. The important item extraction unit 10705 gives the received structured document to the structured document transmission unit 10704 (step S11711).

The structured document transmission unit 10704 gives the received structured document to the user interface unit 10701 (step S11712), and the user interface unit 10701 gives the received structured document to the user (step S11713).

Figure 30:
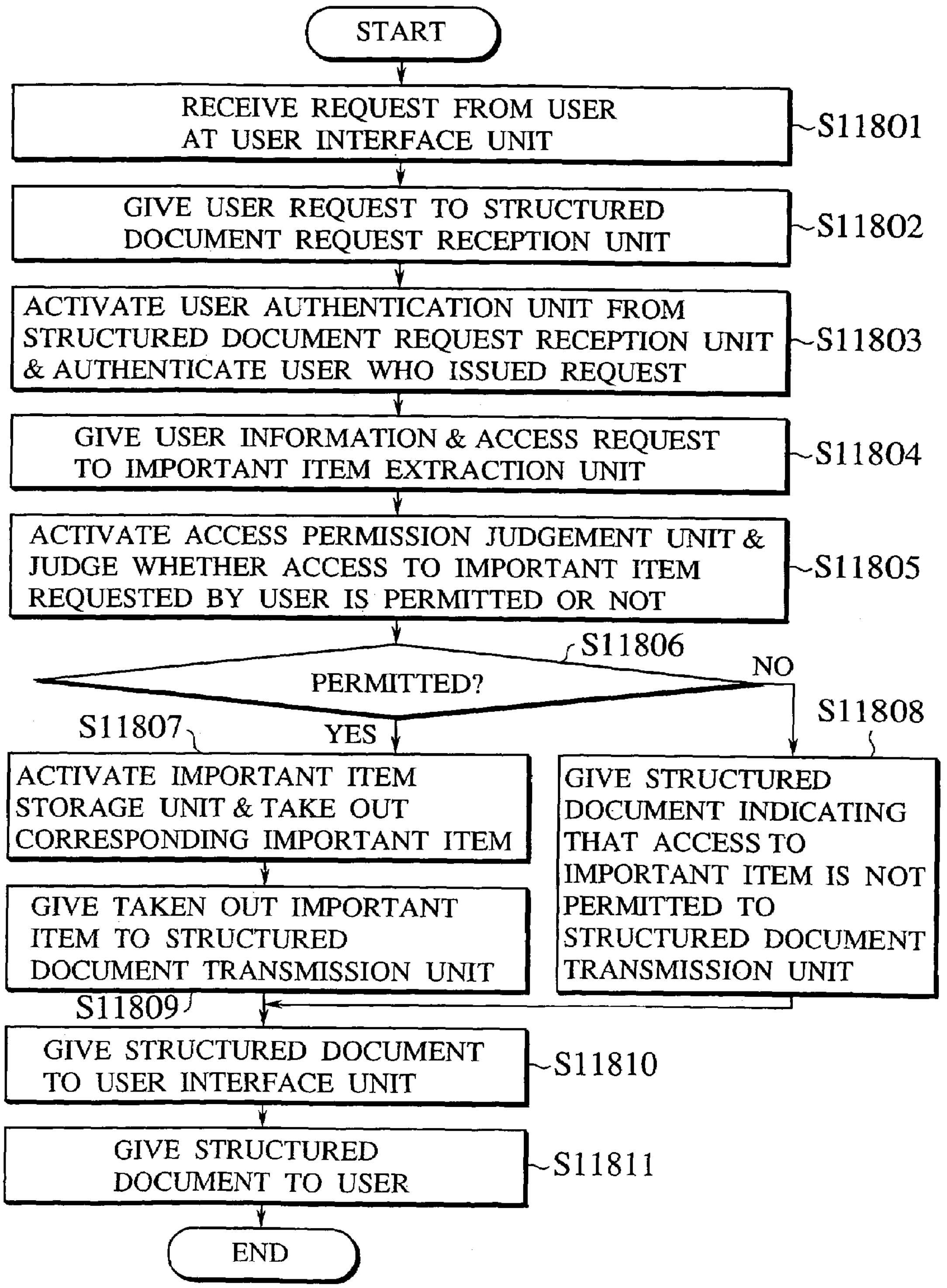
FIG. 30 is a flow chart for another exemplary operation of a document important item extraction device according to the embodiment 3-3 of the present invention.

Next, the operation of the document important item extraction device 10700 in the case where the user issues the access request with respect to the stored important item will be described. FIG. 30 shows an exemplary procedure for this operation of the document important item extraction device 10700.

The user interface unit 10701 receives the request from the user (step S11801). Then, the user interface unit 10701 gives the received request to the structured document request reception unit 10703 (step S11802).

The structured document request reception unit 10703 activates the user authentication unit 10702 and authenticates the user who issued the request (step S11803). The structured document request reception unit 10703 gives the user information and the access request to the important item extraction unit 10705 (step S11804).

The important item extraction unit 10705 activates the access permission judgement unit 10708, and judges whether or not to permit an access to the important item requested by the user (step S11805). If the access is permitted, the important item extraction unit 10705 activates the important item storage unit 10707 and takes out the corresponding important item (step S11807). The important item extraction unit 10705 gives the taken out important item to the structured document transmission unit 10704 (step S11809). Note that this taken out important item is also a structured document if the access is not permitted, a structured document indicating that the access to the important item is not permitted is given to the structured document transmission unit 10704 (step S11808).

The structured document transmission unit 10704 gives the received structured document (either the taken out important item or one that indicates that the access is not permitted) to the user interface unit 10701 (step S11810), and the user interface unit 10701 gives the received structured document to the user (step S11811).

Note that, in the above, an information indicating that the access is not permitted is given to the user as a structured document, but the information indicating that the access is not permitted can be given to the user as an information which is not a structured document, such as a usual message, for example.

It is also possible to define the access request with respect to the important item more minutely such as a request for viewing alone, a request for editing as well, and so on, so as to carry out more refined access control such as that in which the editing is permitted only to the user who is registered as <owner> in that access permission list while only the viewing is permitted to the users who are registered as <permitted users>.

Figure 31:
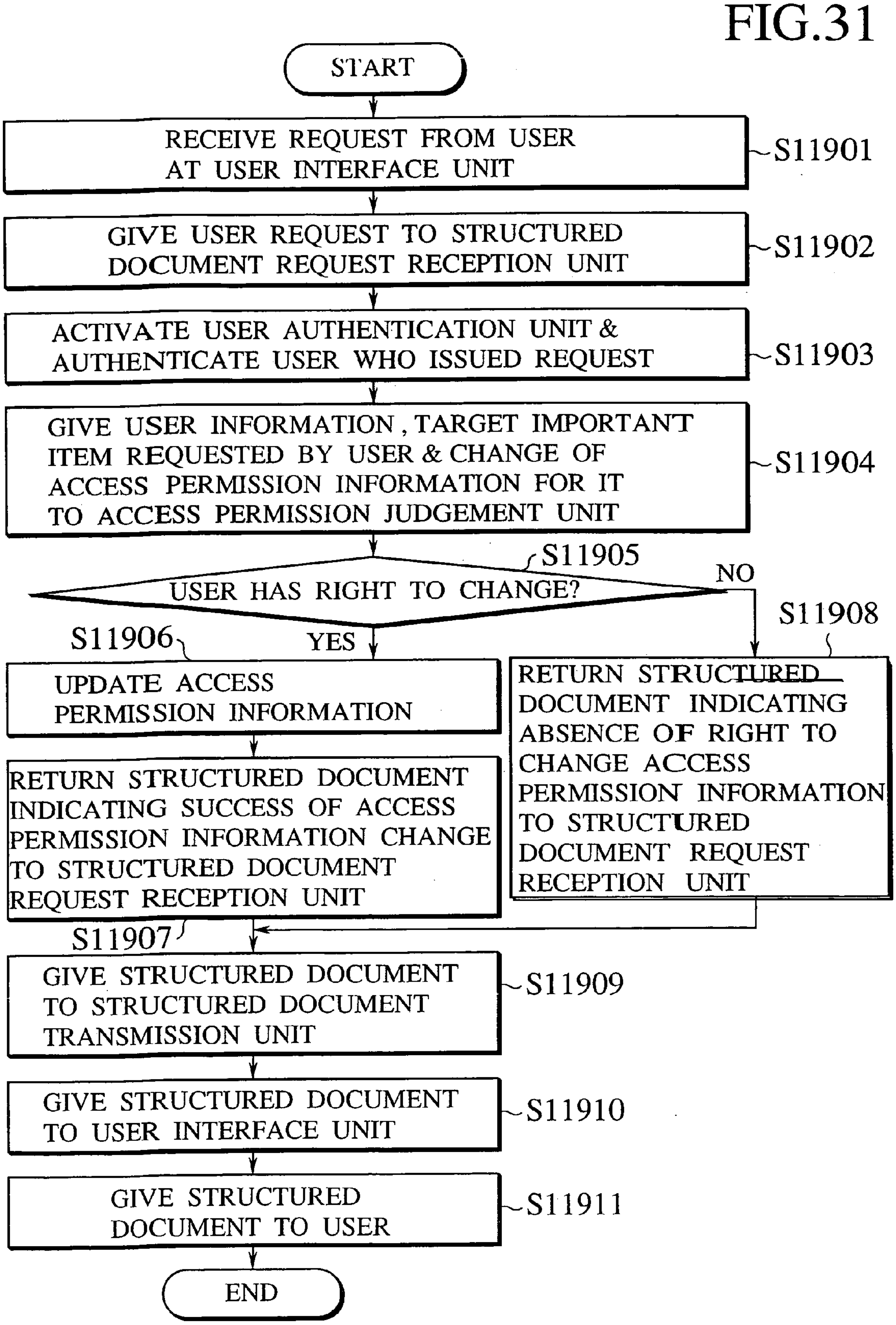
FIG. 31 is a flow chart for still another exemplary operation of a document important item extraction device according to the embodiment 3–3 of the present invention.

Next, the operation of the document important item extraction device 10700 in the case where the user requests the addition, deletion, or change of the access permission information regarding the important item will be described. FIG. 31 shows an exemplary procedure for this operation of the document important item extraction device 10700.

The user interface unit 10701 receives the request from the user (step S11901). Then, the user interface unit 10701 gives the received request to the structured document request reception unit 10703 (step S11902).

The structured document request reception unit 10703 activates the user authentication unit 10702 and authenticates the user who issued the request (step S11903). The structured document request reception unit 10703 gives the user information, a target important item, and the request for changing the access permission information for the target important item which is the request from the user, to the access permission judgement unit 10708 (step S11904).

The access permission judgement unit 10708 judges whether this user has a right to change the access permission information (step S11905). If this user has the right to change, the access permission information is updated (step S11906), and a structured document indicating the success of the access permission information change is returned to the structured document request reception unit 10703 (step S11907). If this user does not have the right to change, a structured document indicating the absence of the right to change the access permission information is returned to the structured document request reception unit 10703 (step S11908).

The structured document request reception unit 10703 gives the received structured document (either one that indicates the success of the access permission information change or one that indicates that the absence of the right to change the access permission information) to the structured document transmission unit 10704 (step S11909). The structured document transmission unit 10704 gives the received structured document to the user interface unit 10701 (step S11910), and the user interface unit 10701 gives the received structured document to the user (step S11911).

Note that, in the above, an information indicating the success of the access permission information change or an information indicating the absence of the right to change the access permission information is given to the user as a structured document, but such information can be given to the user as an information which is not a structured document, such as a usual message, for example.

Note also that the right to change the access permission list may be given either to the user who is registered as <owner> in that access permission list alone, or to all the users who are registered as <owner> or <permitted users> in that access permission list.

Also, in the change of the access permission list, the addition of the other users may be permitted only to <permitted users> of that access permission list, or to both <permitted users> and <owner> of that access permission list.

It is also possible to eliminate the distinction between <owner> and <permitted users> in the access permission list, such that the user who issued the request for the structured document which resulted in the extraction of that important item and the users who are permitted later on can be registered collectively. In such a case, the right to change can be given to all the users who are registered in the access permission list.

It is also noted that the format of the access permission list is not limited to that shown in FIG. 27 and there can be many variations in this regard.

The document important item extraction device 10700 can be formed by a CPU, a memory device, and a communication device similarly as the computer, for example, and its functions can be realized by executing the programs describing the operations of the elements 10701 to 10708 that constitute the document important item extraction device 10700 on the CPU.

Also, each one or a part of the elements 10701 to 10708 that constitute the document important item extraction device 10700 can be formed by a CPU, a memory device and a communication device, and its functions can be realized by executing the programs describing its operations on the CPU, such that the document important item extraction device 10700 is constructed as a collection of these constituent elements.

Note also that this embodiment 3-3 is directed to the case of realizing the document important item extraction device on the data transmission and reception device, but it is also realize the document important item extraction device on the data relay device.

In such a alternative realization, the document important item extraction device has a configuration similar to that of FIG. 28 except that the user interface unit 10701 of FIG. 28 is omitted, and its operations are similar to those described above except that the step for receiving the request from the user at the user interface unit and the step for giving the received structured document to the user at the user interface unit are omitted.

As described, according to this embodiment 3-3, by specifying keywords or tags of the structured document that are considered important by the user in advance for each user who utilizes the document important item extraction device, it is possible for the document important item extraction device to extract the important items from the received structured document on behalf of the user, so that time and effort required for the user can be reduced considerably.

Also, by attaching the access permission information to the extracted important item, it becomes possible to share just necessary and sufficient amounts of the important items among the users.

Also, by providing a function for enabling the user to add, delete or change the access permission information of the stored important item in response to the request of the user, it becomes possible to appropriately share the different important items among the users easily, so that time and effort required for the user in order to share the important items can be reduced considerably.

Also, by sharing the important items, an efficient utilization of the memory device provided in the document important item extraction device becomes possible.

Embodiment 3-4

Figure 32:
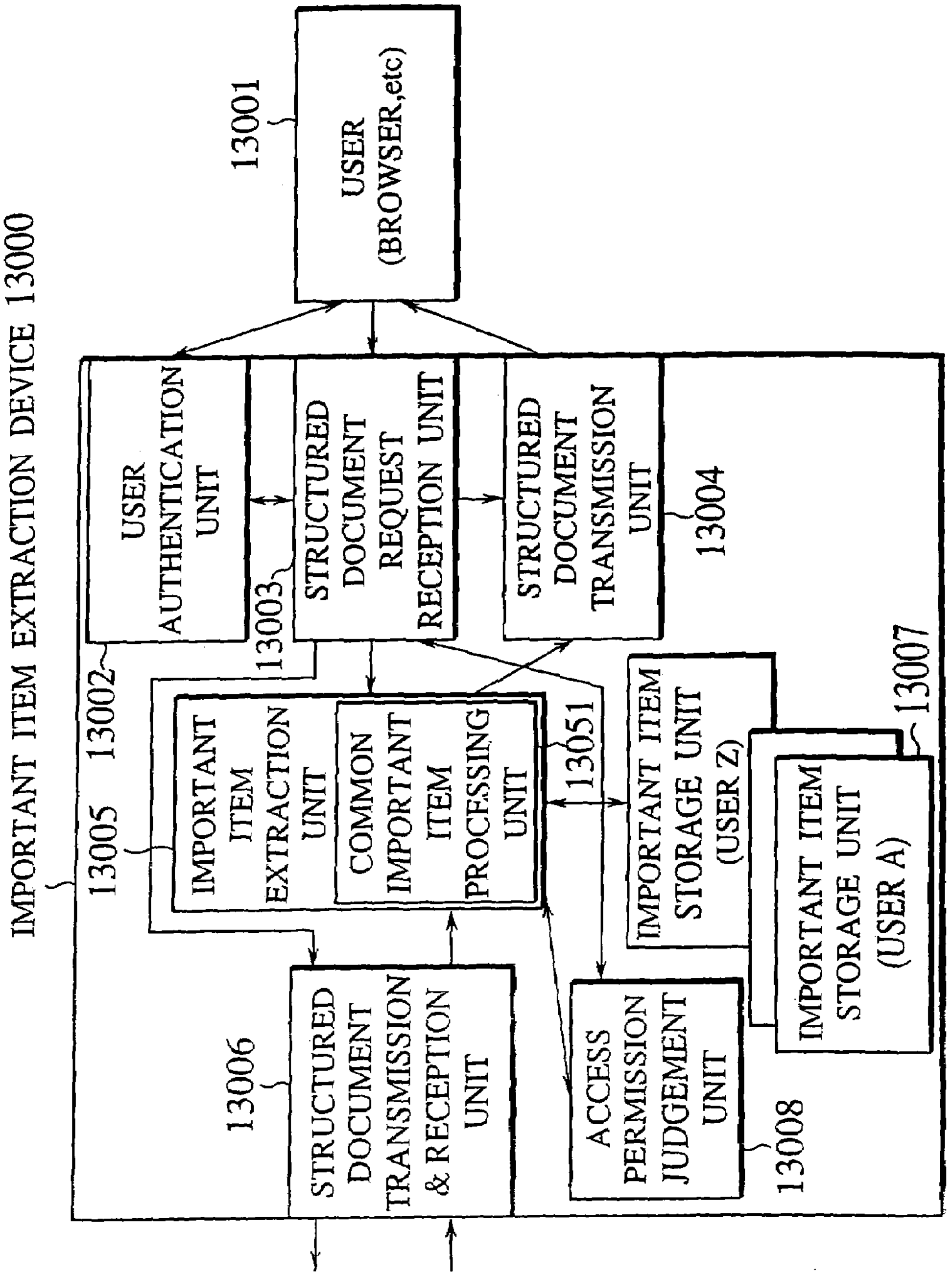
FIG. 32 is a block diagram showing an exemplary configuration of a document important item extraction device according to the embodiment 3-4 of the present invention.

FIG. 32 shows an exemplary configuration of a document important item extraction device according to this embodiment 3-4.

In the configuration of the above embodiment 3-3, for example, when a plurality of users set the identical important item extraction condition (or at least a part of the important item extraction conditions set by them is common), and these plurality of users request the identical structured document, the common important items will be extracted among these users, so that the document important item extraction device of this embodiment 3-4 is made such that those important items which are common to the users among the important items extracted from the received structured document can be stored in a form which can be shared among the users.

Note that such a document important item extraction device can be realized either in a form of being incorporated in the data transmission and reception device as in the above embodiment 3-3 or in a form of being incorporated in the data relay device, but a difference between these realizations is only whether the user interface unit is provided or not, and the function for storing the common extracted important items in a form which can be shared among the users which is specific to this embodiment 3-4 is the same in both realizations, so that this embodiment 3-4 will be described only for the case of incorporating the document important item extraction device into the data relay device, and the case of incorporating it into the data transmission and reception device will not be described.

Now, the document important item extraction device 13000 of FIG. 32 comprises a user authentication unit 13002, a structured document request reception unit 13003, a structured document transmission unit 13004, an important item extraction unit 13005, a structured document transmission and reception unit 13006, an important item storage units 13007, and an access permission judgement unit 13008. Moreover, the important item extraction unit 13005 has a common important item processing unit 13051 for carrying out the processing regarding the common important items, in addition to the function for carrying out the processing regarding the extraction of the important items and the storing of the (non-common) important items similar to that of the embodiment 3-3.

The user authentication unit 13002 is a unit for authenticating the user 13001 who makes access to the document important item extraction device 13000 by using the browser or the like. For the user authentication, the authentication scheme using a password can be utilized, for example.

The structured document request reception unit 13003 is a unit which gives the request from the user 13001 to the structured document transmission and reception unit 13006 along with the user information. Also, when the user 13001 requests the addition, deletion, or change of the access permission information for the important item, this request is given to the access permission judgement unit 13008 along with the user information and the updating of the access permission information is carried out.

The structured document transmission and reception unit 13006 is a unit for requesting the necessary structured document to the external and receiving the corresponding structured document according to the request of the user 13001 given from the structured document request reception unit 13003.

The important item extraction unit 13005 is a unit which receives the received structured document and the user information of the user who requested that structured document from the structured document transmission and reception unit 13006, extracts the important items from the structured documents, and stores them in the important item storage units 13007, while sending the structured document to the structured document transmission unit 13004. Also, when there is a request for the important items from the structured document request reception unit 13003, the requested important items are sent from the important item storage units 13007 to the structured document transmission unit 13004. This is also a unit for carrying out the common important item processing (at the common important item processing unit 13051).

For the extraction the important items, a method based on a keyword or a tag that is associated with the structured document, which is specified by the user 13001 in advance, can be used. For example, when a portion containing a tag that is specified by the user 13001 and a portion containing a keyword specified by the user 13001 exist, these portions will be extracted. Else, the entire structured document that contains these tag and keyword may be set as the extraction target. For the extracted information, not only the important items but also an information regarding date and time at which the structured document is created, date and time at which the structured document is received, and a location indicating a place from which the structured document is received, may be stored in addition in order to enable the subsequent retrieval.

Note that, in this embodiment 3-4, when the identical important item is already extracted from the identical structured document in the past, the important item extracted in response to the new request is not stored separately, and the necessary correction is applied to the information (which is assumed to be the access permission list in this embodiment) associated with the stored important item (although there are also cases where no correction is necessary).

The important item storage unit 13007 is a unit for storing the important items extracted for each user and their related information, and reading them out, according to the command of the important item extraction unit 13005. The important item storage unit 13007 is associated with a medium for recording these information. For a medium, any of magnetic disk, optical disk, magneto-optical disk, phase-change optical disk, CD-R, DVD-RAM, or magnetic tape can be used.

The structured document transmission unit 13004 is a unit for transmitting the structured document transmitted from the important item extraction unit 13005 to the user 13001.

The access permission judgement unit 13008 is a unit for judging the access permission at a time of reading out the important item by the important item extraction unit 13005. When the reading request for some important item and the user information of the user who issued that reading request are given from the important item extraction unit 13005, the access permission judgement unit 13008 judges whether the reading is permitted or not according to the access permission list provided therein, and returns the judgement result to the important item extraction unit 13005.

Here, the extracted important items and their corresponding access permission lists can be stored in a format shown in FIG. 27 similarly as in the embodiment 3-3, but there are various other formats that can be used for the access permission list, and some other formats for the access permission list will be described below.

Figure 33:
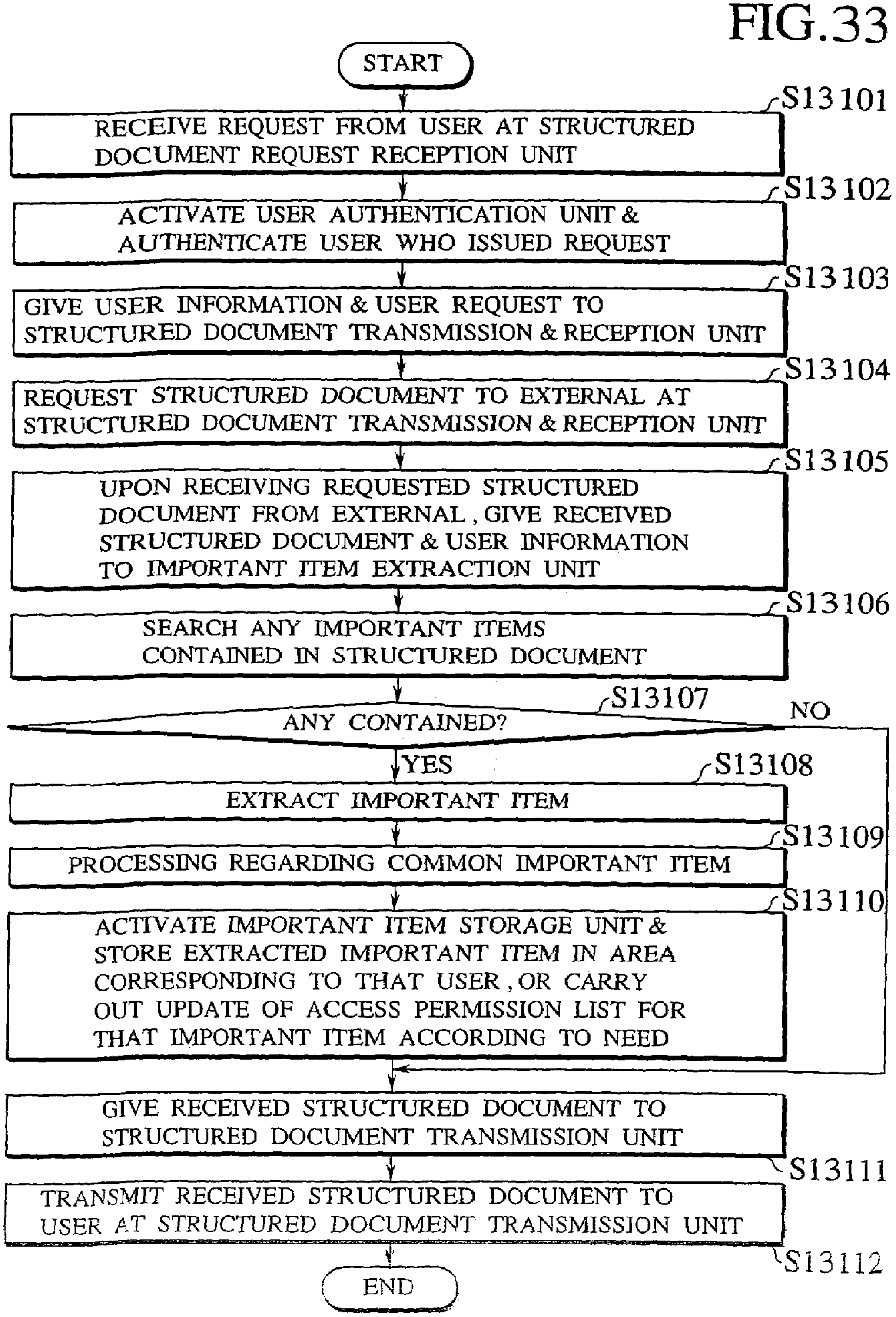
FIG. 33 is a flow chart for one exemplary operation of a document important item extraction device according to the embodiment 3-4 of the present invention.

Next, the operation of the document important item extraction device 13000 in the case where the user issued the request for the structured document with respect to the external will be described. FIG. 33 shows an exemplary procedure for this operation of the document important item extraction device 13000.

The structured document request reception unit 13003 receives the request from the user (step S13101). Upon receiving the request, the structured document request reception unit 13003 activates the user authentication unit 13002 and authenticates the user who issued the request (step S13102). The structured document request reception unit 13003 gives the user information and the user request of the authenticated user 13001 to the structured document transmission and reception unit 13006 (step S13103).

The structured document transmission and reception unit 13006 requests the structured document requested by the user 13001 with respect to the external (step S13104). Upon receiving the requested structured document from the external, the structured document transmission and reception unit 13006 gives the received structured document and the user information to the important item extraction unit 13005 (step S13105).

The important item extraction unit 13005 searches any important items contained in the received structured document (step S13106). If the important item is contained, the important item is extracted (step S13108).

At this point, in this embodiment 3-4, instead of storing the extracted important item immediately, the common important item processing is carried out by the common important item processing unit 13051 (step S13109). As described in further detail below, this common important item processing checks whether that important item has been extracted from the identical structured document and stored in the past or not, and in the case where that important item has been stored, determines a manner of updating the access permission list or that the access permission list is not to be updated.

Then, the important item storage unit 13007 is activated and the extracted important item is stored in area corresponding to that user (in the case it has not been stored), or the access permission list for that important item is updated according to the need (in the case it has been stored) (step S13110).

On the other hand, if no important item is contained, nothing is done. The important item extraction unit 13005 gives the received structured document to the structured document transmission unit 13004 (step S13111).

The structured document transmission unit 13004 gives the structured document given from the important item extraction unit 13005 to the user 13001 (step S13112).

Figure 34:
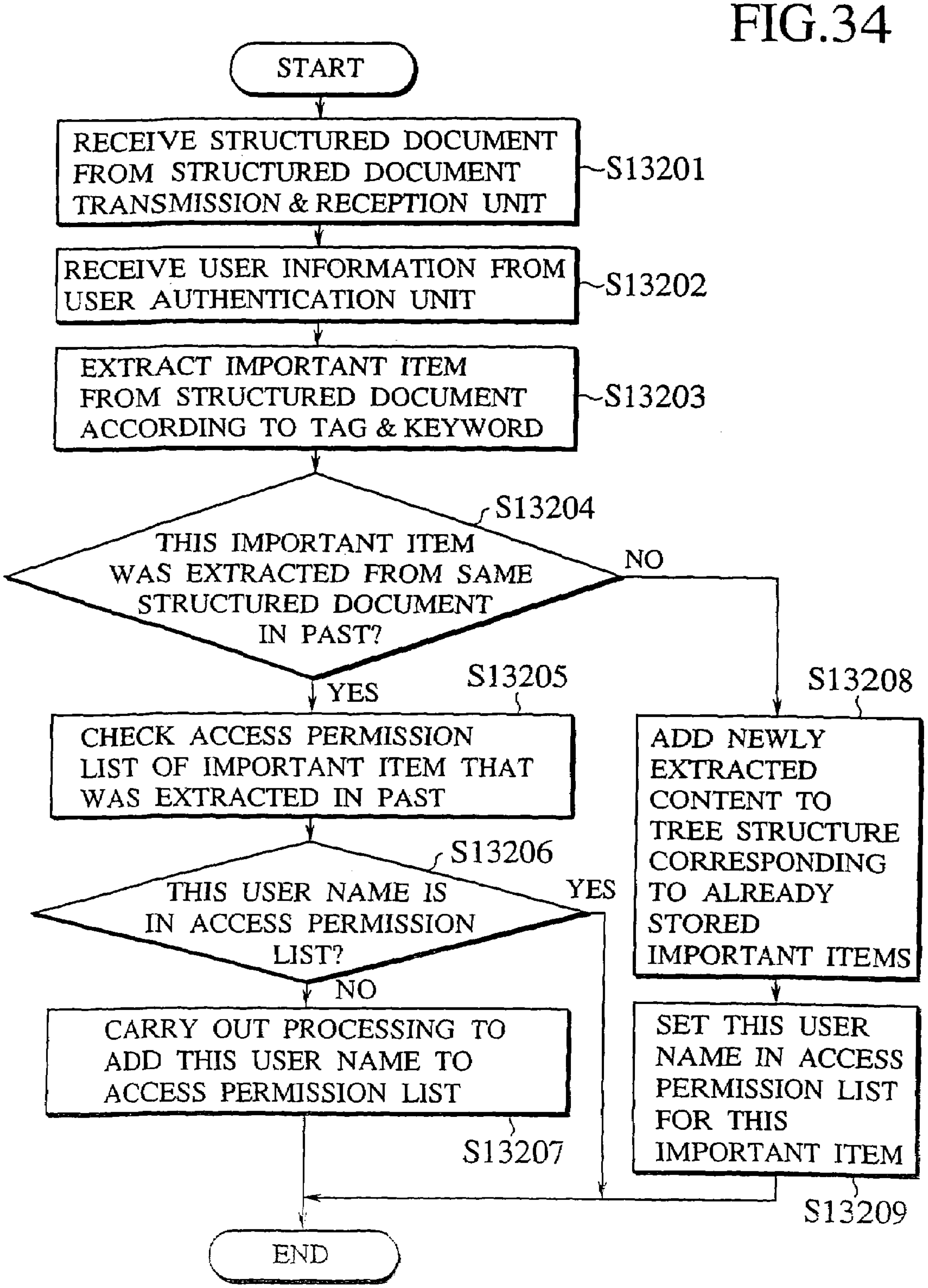
FIG. 34 is a flow chart for another exemplary operation of a document important item extraction device according to the embodiment 3-4 of the present invention.

Next, the operation of the important item extraction unit 13005 in the case of extracting the important item will be described. FIG. 34 shows an exemplary procedure for this operation of the important item extraction unit 13005. Note that the following algorithm assumes the operation which handles individual requests and their responses as separate ones for respective users without handling a plurality of requests and their responses simultaneously. It is also assumed that the extracted important items are stored in a format shown in FIG. 35.

First, the structured document is received from the structured document transmission and reception unit 13006 (step S13201).

Then, the user information of the user who requested this structured document is obtained from the user authentication unit 13002 (step S13202).

Then, the important item is extracted from the structured document, using the tags and keywords that are set up in advance (step S13203).

At this point, whether the extracted important item was extracted from the identical structured document in the past or not is checked (step S13204).

In the case where the identical important item was extracted from the identical structured document in the past, the access permission list of that important item at a time of extracting it in the past is checked (step S13205). Namely, the user name of the user who requested this structured document and the user name contained in the access permission list of that important item are compared.

If the user name of this requesting user is not contained in that access permission list (step S13206), the necessary processing such as adding the user name of this requesting user to that access permission list is carried out (step S13207). Note that there are many variations for the manner of updating the access permission list here depending on the format of the access permission list, etc.

If the user name of this requesting user is contained in that access permission list (step S13206), this user is already accessible to that important item so that the processing is terminated.

On the other hand, in the case the important item extracted this time was not extracted from the identical structured document in the past, the important item that is newly extracted this time is added to the already stored important items that are constituting the tree structure (step S13208), this user name is set to the access permission list for this important item (step S13209), and the processing is terminated.

Note that the processing in the case where a plurality of users set the identical extraction condition and these plurality of users receive the identical structured document can be realized by repeating the above algorithm as many times as the number of important items to be extracted for each user.

Next, several variations for the format of the access permission list will be described.

First, the access permission list in the format shown in FIG. 27 will be described.

In this case, <owner> and <permitted users> of the access permission list of that important item are checked at the step S13205, and if the user name of this requesting user is not contained in both <owner> and <permitted users>, the user name of this requesting user is added to <permitted users> of the access permission list for that important item at the step S13207.

Next, the access permission list in the format shown in FIG. 35 will be described.

Figure 35:
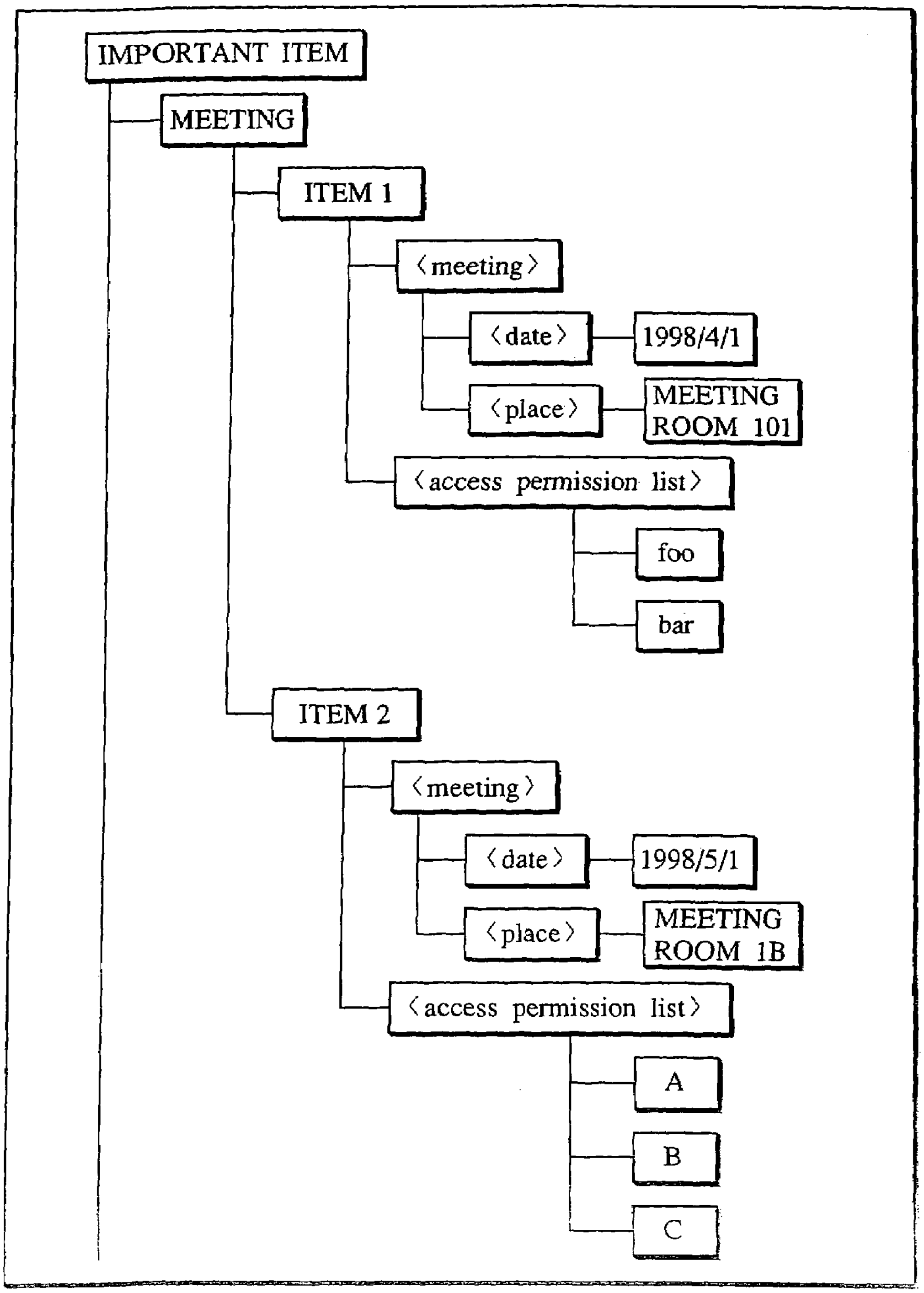
FIG. 35 is a diagram showing another exemplary format of extracted important items and access permission lists according to the present invention.

In FIG. 35, the structures of <owner> and <permitted users> are not provided in the access permission list, and all the relevant users are attached immediately below <access permission list> as the owners.

In this case, the access permission list of that important item is checked at the step S13205, and if the user name of this requesting user is not contained, the user name of this requesting user is added to the access permission list of that important item at the step S13207.

Figure 36:
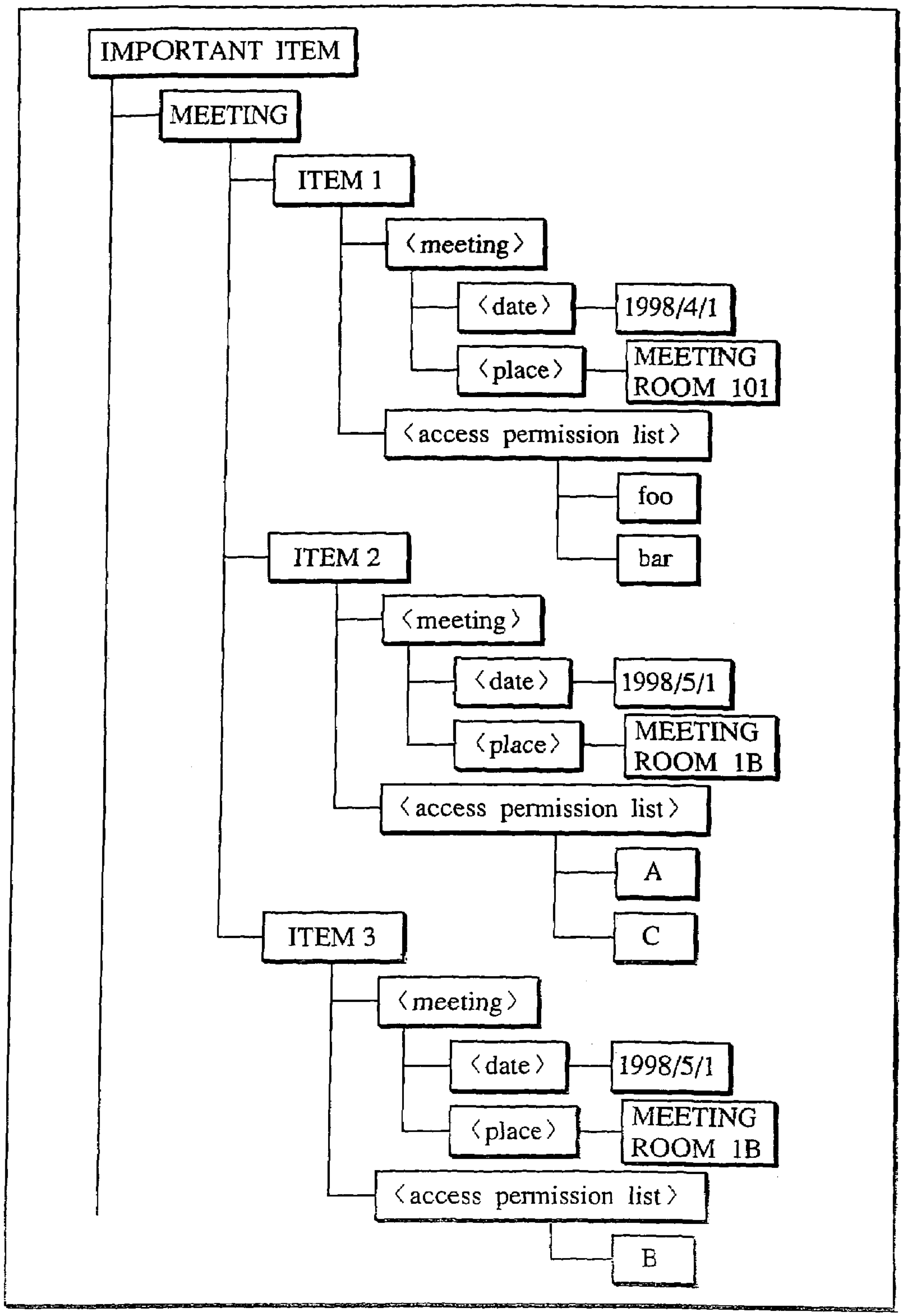
FIG. 36 is a diagram showing another exemplary format of extracted important items and access permission lists according to the present invention.

Note here that, when a plurality of users share the identical extracted important items and one or more users among these plurality of users wish to edit the stored important items, it is preferable to make as many copies of these important items as the number of users who wish to edit and then edit these copies. For example, in FIG. 35, the item 2 has been shared by the users A, B and C, and when the user B wishes to edit the important items at this point, the user B is deleted from the access permission list of the item 2 and an item 3 is newly produced by copying the important items of the item 2, and the user B is added to the access permission list of the item 3, as shown in FIG. 36.

Next, the other exemplary formats of the access permission list will be described.

Figure 37:
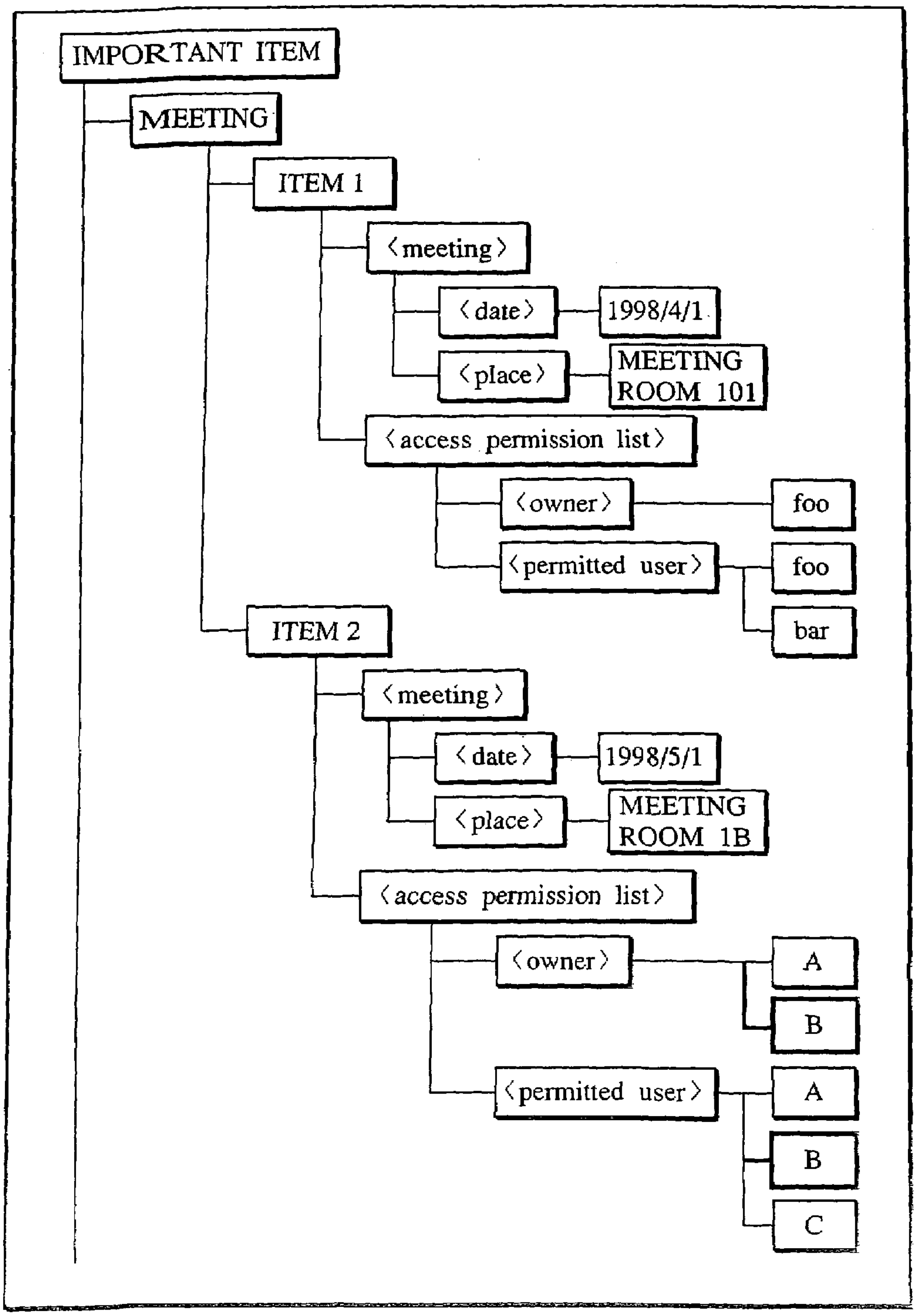
FIG. 37 is a diagram showing another exemplary format of extracted important items and access permission lists according to the present invention.
Figure 38:
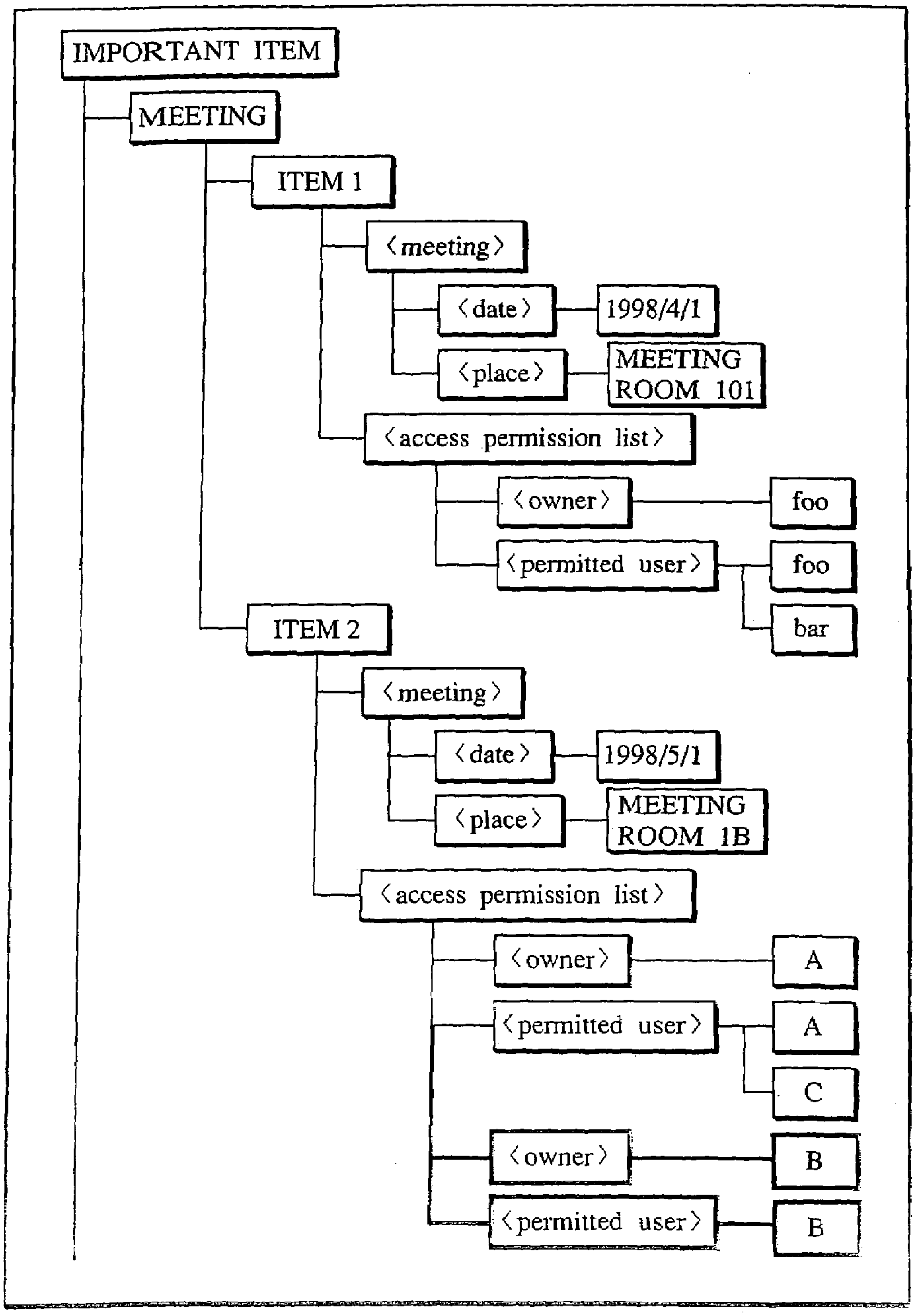
FIG. 38 is a diagram showing another exemplary format of extracted important items and access permission lists according to the present invention.

In the above, the access permission mechanism such as that shown in FIG. 27 or FIG. 35 has been incorporated in order to share the extracted identical important item, but this mechanism can also be realized as shown in FIG. 37 or FIG. 38.

FIG. 37 shows an example in which the list of permitted users is added to the extracted identical important item similarly as in the case of FIG. 27, and at that point, not only the user who extracted that important item for the first time but also the user who extracted the identical important item later on are added to the owner section. In this way, all the users who extracted the identical important item can be set as the owners of that important item so that they can edit the list of the access permitted users with respect to that important item.

FIG. 37 shows an exemplary storage state in the case where the user A extracted the important item from some structured document first and then the user B extracted the identical important item from the identical structured document, and bold lines in FIG. 37 indicate the changed portions.

Note that, in the case of editing that important item, it is preferable to make a copy of the important item and then edit that copy as shown in FIG. 36, regardless of which user is going to edit that important item.

Next, FIG. 38 shows an example in which the whole structure formed by the owner and the permitted users is increased instead of adding the user to the owner section, with respect to the extracted identical important item. FIG. 38 shows an exemplary storage state in the case where the user A extracted the important item from some structured document first and then the user B extracted the identical important item from the identical structured document similarly as FIG. 37, and bold lines in FIG. 38 indicate the changed portions.

Note that, in the case of editing that important item, it is preferable to make a copy of the important item and then edit that copy as shown in FIG. 36.

Here, the operation algorithm of the document important item extraction device 13000 in the case where the user issues the access request with respect to the stored important item and the operation algorithm of the document important item extraction device 13000 in the case where the user requests the addition, deletion or change of the access permission information regarding the important item are basically the same as in the embodiment 3-3 so that their description will not be repeated.

Note that, in the examples of FIG. 27, FIG. 37 and FIG. 38, it is also possible to define the access request with respect to the important item more minutely such as a request for viewing alone, a request for editing as well, and so on, so as to carry out more refined access control such as that in which the editing is permitted only to the user who is registered as <owner> in that access permission list while only the viewing is permitted to the users who are registered as <permitted users>, similarly as in the embodiment 3-3.

Note also that, in the examples of FIG. 27, FIG. 37 and FIG. 38, the right to change the access permission list may be given either to the user who is registered as <owner> in that access permission list alone, or to all the users who are registered as <owner> or <permitted users> in that access permission list, similarly as in the embodiment 3-3.

Also, in the change of the access permission list, the addition of the other users may be permitted only to <permitted users> of that access permission list, or to both <permitted users> and <owner> of that access permission list.

It is also possible to eliminate the distinction between <owner> and <permitted users> in the access permission list, such that the user who issued the request for the structured document which resulted in the extraction of that important item and the users who are permitted later on can be registered collectively. In such a case, the right to change can be given to all the users who are registered in the access permission list.

It is also noted that the format of the access permission list is not limited to those shown in FIG. 27, FIG. 35, FIG. 37 and FIG. 38 and there can be many variations in this regard.

The document important item extraction device 13000 can be formed by a CPU, a memory device, and a communication device similarly as the computer, for example, and its functions can be realized by executing the programs describing the operations of the elements 13001 to 13008 that constitute the document important item extraction device 13000 on the CPU.

Also, each one or a part of the elements 13001 to 13008 that constitute the document important item extraction device 13000 can be formed by a CPU, a memory device and a communication device, and its functions can be realized by executing the programs describing its operations on the CPU, such that the document important item extraction device 13000 is constructed as a collection of these constituent elements.

As described, according to this embodiment 3-4, by specifying keywords or tags of the structured document that are considered important by the user in advance for each user who utilizes the document important item extraction device, it is possible for the document important item extraction device to extract the important items from the received structured document on behalf of the user, so that time and effort required for the user can be reduced considerably.

Also, by attaching the access permission information to the extracted important item, it becomes possible to share just necessary and sufficient amounts of the important items among the users.

Also, by providing a function for enabling the user to add, delete or change the access permission information of the stored important item in response to the request of the user, it becomes possible to appropriately share the different important items among the users easily, so that time and effort required for the user in order to share the important items can be reduced considerably.

Also, by sharing the important items, an efficient utilization of the memory device provided in the document important item extraction device becomes possible.

According to the third embodiment described above, the document important item extraction device automatically extracts and stores the important items to be extracted that are specified by the user from the structured documents, and the extracted important items are stored separately for different users so that it becomes easier to read out or retrieve the important items whose storing is specified the specific user. Also, each stored important item has the access permission list so that the stored important items can be shared among a plurality of users easily, and the memory device can be utilized efficiently.

Note that it is also possible to modify the third embodiment (each one of the embodiments 3-1 to 3-4) by adding the function regarding the attaching items as described in the second embodiment.

It is to be noted that the above described embodiments according to the present invention may be conveniently implemented in forms of software programs for realizing the operations of the document important item extraction device, as will be apparent to those skilled in the computer art. Appropriate software coding can readily be prepared by skilled programmers based on the teachings of the present disclosure, as will be apparent to those skilled in the software art.

In particular, the document important item extraction device as described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A data relay device, comprising:

a document obtaining unit configured to obtain a structured document provided by a server device according to a document request received from a client device through a communication path, the structured document having a structure represented by tags in the structured document;

an extraction and storing unit configured to automatically extract at least one specific portion from the structured document by utilizing the tags representing the structure of the structured document according to prescribed extraction criteria specified in advance and indicating at least one specific tag that labels said at least one specific portion to be extracted, and store said at least one specific portion into a database specific to the client device such that said at least one specific portion stored in the database is subsequently accessible by the client device; and a transfer unit configured to transfer the structured document obtained by the document obtaining unit to the client device, by adding an information to a part of the structured document from which said at least one specific portion is extracted, so as to indicate to a user that said at least one specific portion has been extracted from said part of the structured document.

2. The data relay device of claim 1, wherein the extraction and storing unit also stores an identification information of a user who issued the document request at the client device in correspondence to said at least one specific portion.

3. The data relay device of claim 1, further comprising:

a search unit configured to receive a database access request from the client device and search through the database according to the database access request.

4. The data relay device of claim 1, wherein the extraction and storing unit extracts said at least one specific portion in units of the tags, and the database is a structured database having an internal structure given by a plurality of specific portions that are separately extracted from a plurality of structured documents.

5. The data relay device of claim 1, wherein when a plurality of specific portions extracted from one structured document are to be stored into the database, the extraction and storing unit also produces and stores a link information indicating mutual relationship among the plurality of specific portions.

6. The data relay device of claim 1, wherein the prescribed extraction criteria specifies a tag to be contained in a part of the structured document that is to be extracted as a specific portion, a document type definition (DTD) information that defines allowed tags that are allowed to be used in the structured document and a hierarchical relationship among the allowed tags to be referred in relation to the structured document is specified in advance, and the tag to be specified by the prescribed extraction criteria is set to be a tag contained in the specified DTD information.

7. The data relay device of claim 1, wherein the prescribed extraction criteria specifies a tag to be contained in a part of the structured document that is to be extracted as a specific portion, and the extraction and storing unit extracts said at least one specific portion by using synonyms of the tag specified by the prescribed extraction criteria which are obtained from a synonym database.

8. The data relay device of claim 1, further comprising:

a unit configured to receive a request for specifying, adding, changing or deleting some of the prescribed extraction criteria from the user system, and newly register, add, change or delete said some of the prescribed extraction criteria according to the request.

9. The data relay device of claim 1, further comprising:

a unit configured to change some of the prescribed extraction criteria according to a command for changing said some of the prescribed extraction criteria, when said command is entered by a user upon displaying the structured document at the user system.

10. The data relay device of claim 1, wherein the extraction and storing unit also generates an attaching information related to the at least one specific portion according to a prescribed generation criteria specified in advance, and stores the attaching information in correspondence to said at least one specific portion.

11. The data relay device of claim 10, wherein the extraction and storing unit extracts said at least one specific portion in units of the tags while generating the attaching information as a structured data, and the database is a structured database having an internal structure given by a plurality of specific portions that are separately extracted from a plurality of structured documents and corresponding attaching information.

12. The data relay device of claim 1, wherein the extraction and storing unit stores said at least one specific portion in correspondence to an identification information of a user who issued the document request.

13. The data relay device of claim 12, further comprising:

a unit configured to store an access control information indicating those users who are permitted to access each stored specific portion in correspondence to each stored specific portion in the database; and a unit configured to judge whether one user who requests an access to one stored specific portion is permitted to access said one stored specific portion or not according the access control information stored in correspondence to said one stored specific portion, and send said one stored specific portion to said one user when it is judged that said one user is permitted to access said one stored specific portion.

14. The data relay device of claim 13, wherein the extraction and storing unit extracts said at least one specific portion in units of the tags, the database is a structured database having an internal structure given by a plurality of specific portions that are separately extracted from a plurality of structured documents, and the access control information is provided for each stored specific portion in a form of a structured data with a content including an identification information of a user who is an owner of each stored specific portion and a list of identification information of users who are permitted to access each stored specific portion.

15. The data relay device of claim 13, further comprising:

a unit configured to receive a content change request for one access control information from some user, judge whether said some user has a right to change a content of said one access control information according to said one access control information, and change the content of said one access control information according to the content change request when it is judged that said some user has the right to change the content of said one access control information.

16. The data relay device of claim 13, wherein when the database already stores an identical specific portion as said at least one specific portion that was extracted from an identical structured document, the extraction and storing unit does not newly store said at least one specific portion into the database but adds an identification information of the user who issued the document request into the access control information corresponding to the identical specific portion stored in the database, so as to make the identical specific portion accessible to the user who issued the document request.

17. The data relay device of claim 16, wherein when the database already stores the identical specific portion as said at least one specific portion that was extracted from an identical structured document and the access control information corresponding to the identical specific portion already indicates that the user who issued the document request is accessible to the identical specific portion, the extraction and storing unit neither newly stores said at least one specific portion into the database nor adds the identification information of the user who issued the document request into the access control information corresponding to the identical specific portion stored in the database, and just transfers the structured document to the user system.

18. The data relay device of claim 16, wherein the extraction and storing unit extracts said at least one specific portion in units of the tags, the database is a structured database having an internal structure given by a plurality of specific portions that are separately extracted from a plurality of structured documents, the access control information is provided for each stored specific portion in a form of a structured data with a content including an identification information of a user who is an owner of each stored specific portion and a list of identification information of users who are permitted to access each stored specific portion, and the extraction and storing unit adds the identification information of the user who issued the document request into the access control information corresponding to the identical specific portion stored in the database as one of the identification information of users who are permitted to access the identical specific portion.

19. The data relay device of claim 16, wherein the extraction and storing unit extracts said at least one specific portion in units of the tags, the database is a structured database having an internal structure given by a plurality of specific portions that are separately extracted from a plurality of structured documents, the access control information is provided for each stored specific portion in a form of a structured data with a content including an identification information of a user who is an owner of each stored specific portion and a list of identification information of users who are permitted to access each stored specific portion, and the extraction and storing unit adds the identification information of the user who issued the document request into the access control information corresponding to the identical specific portion stored in the database by creating a new access control information that indicates the identification information of the user who issued the document request as an identification information of a user who is an owner of the identical specific portion and stores the new access control information in correspondence to the identical specific portion.

20. The data relay device of claim 16, wherein the extraction and storing unit extracts said at least one specific portion in units of the tags, the database is a structured database having an internal structure given by a plurality of specific portions that are separately extracted from a plurality of structured documents, the access control information is provided for each stored specific portion in a form of a structured data with a content including a list of identification information of users who are permitted to access each stored specific portion, and the extraction and storing unit adds the identification information of the user who issued the document request into the access control information corresponding to the identical specific portion stored in the database.

21. The data relay device of claim 16, further comprising:

a unit configured to receive an editing request for some stored specific portion from some user, copy data of said some stored specific portion to generate another specific portion having an identical content as said some stored specific portion if the access control information corresponding to said some stored specific portion indicates a plurality of users as accessible to said some stored specific portion, create a new access control information containing an identification information of said some user such that said some user is permitted to edit said another specific portion, and store said another specific portion and the new access control information in correspondence in the database.

22. The data relay device of claim 1, wherein the document obtaining unit obtains the structured document from one of a plurality of server devices which are accessible from the user system according to the document request.

23. A client device, comprising:

a document obtaining unit configured to obtain a structured document provided by a server device through a communication path, according to a document request made by a user, the structured document having a structure represented by tags in the structured document;

an extraction and storing unit configured to extract at least one specific portion from the structured document by utilizing the tags representing the structure of the structured document according to prescribed extraction criteria specified in advance and indicating at least one specific tag that labels said at least one specific portion to be extracted, and store said at least one specific portion into a database specific to the client device such that said at least one specific portion stored in the database is subsequently accessible by the client device; and a display unit configured to display the structured document obtained by the document obtaining unit to the user, by adding an information to a part of the structured document from which said at least one specific portion is extracted, so as to indicate to a user that said at least one specific portion has been extracted from said part of the structured document.

24. A computer usable medium having computer readable program codes embodied therein for causing a computer to function as a data relay device, the computer readable program codes include:

a first computer readable program code for causing said computer to obtain a structured document provided by a server device according to a document request received from a client device through a communication path, the structured document having a structure represented by tags in the structured document;

a second computer readable program code for causing said computer to automatically extract at least one specific portion from the structured document by utilizing the tags representing the structure of the structured document according to prescribed extraction criteria specified in advance and indicating at least one specific tag that labels said at least one specific portion to be extracted, and store said at least one specific portion into a database specific to the client device such that said at least one specific portion stored in the database is subsequently accessible by the client device; and a third computer readable program code for causing said computer to transfer the structured document obtained by the first computer readable program code to the client device, by adding an information to a part of the structured document from which said at least one specific portion is extracted, so as to indicate to a user that said at least one specific portion has been extracted from said part of the structured document.

25. A computer usable medium having computer readable program codes embodied therein for causing a computer to function as a client device, the computer readable program codes include:

a first computer readable program code for causing said computer to obtain a structured document provided by a server device through a communication path, according to a document request made by a user, the structured document having a structure represented by tags in the structured document;

a second computer readable program code for causing said computer to automatically extract at least one specific portion from the structured document by utilizing the tags representing the structure of the structured document according to prescribed extraction criteria specified in advance and indicating at least one specific tag that labels said at least one specific portion to be extracted, and store said at least one specific portion into a database specific to the client device such that said at least one specific portion stored in the database is subsequently accessible by the client device; and a third computer readable program code for causing said computer to display the structured document obtained by the first computer readable program code to the user, by adding an information to a part of the structured document from which said at least one specific portion is extracted, so as to indicate to a user that said at least one specific portion has been extracted from said part of the structured document.

* * * * *

UNITED STATES PATENT AND TRADEMARK OFFICE

CERTIFICATE OF CORRECTION

PATENT NO. : 7,103,604 B2 Page 1 of 1
APPLICATION NO. : 11/220841
DATED : September 5, 2006
INVENTOR(S) : Maeda et al.

It is certified that error appears in the above-identified patent and that said Letters Patent is hereby corrected as shown below:

On the title page, Item (45), the Terminal Disclaimer has been omitted. Item (45) should read:

-- (45) Date of Patent: * Sep. 5, 2006

[*] Notice: Subject to any disclaimer, the term of this patent is extended or adjusted under 35 U.S.C. 154(b) by 0 days.

This patent is subject to a terminal disclaimer. --

Signed and Sealed this

Fifth Day of December, 2006

JON W. DUDAS
*Director of the United States Patent and Trademark Office*